US011700864B2

(12) United States Patent
Jetton et al.

(10) Patent No.: US 11,700,864 B2
(45) Date of Patent: Jul. 18, 2023

(54) METHODS FOR PREPARATION OF GELATIN-BASED PRODUCTS

(71) Applicant: Jevo IP, LLC, Los Angeles, CA (US)

(72) Inventors: Jeffrey R. Jetton, Portland, OR (US); Tyler L. Williams, Portland, OR (US); Stan A. Levitsky, Portland, OR (US)

(73) Assignee: JEVO IP, LLC, Los Angeles, CA (US)

( * ) Notice: Subject to any disclaimer, the term of this patent is extended or adjusted under 35 U.S.C. 154(b) by 209 days.

(21) Appl. No.: 17/025,603

(22) Filed: Sep. 18, 2020

(65) Prior Publication Data

US 2021/0000134 A1   Jan. 7, 2021

Related U.S. Application Data

(62) Division of application No. 15/882,991, filed on Jan. 29, 2018, now Pat. No. 10,842,168.
(Continued)

(51) Int. Cl.
*A23J 3/06* (2006.01)
*A23L 29/281* (2016.01)
(Continued)

(52) U.S. Cl.
CPC .............. *A23J 3/06* (2013.01); *A23L 29/284* (2016.08); *B01F 23/511* (2022.01); *B01F 23/54* (2022.01); *B01F 23/59* (2022.01); *B01F 25/316* (2022.01); *B01F 27/80* (2022.01); *B01F 35/186* (2022.01); *B01F 35/2209* (2022.01);
(Continued)

(58) Field of Classification Search
CPC ......... A23J 3/06; A23L 29/284; B01F 3/1228; B01F 3/1214; B01F 3/1271; B01F 5/0496; B01F 7/16; B01F 15/00967; B01F 15/00831
See application file for complete search history.

(56) References Cited

U.S. PATENT DOCUMENTS 3,743,714 A   7/1973   Deutsch
9,439,450 B2  9/2016   Jetton et al.
(Continued)

FOREIGN PATENT DOCUMENTS

JP   2007319108 A   12/2007
WO  2011084119 A1   7/2011
(Continued)

OTHER PUBLICATIONS

ISA Korean Intellectual Property Office, International Search Report and Written Opinion Issued in Application No. PCT/US2018/015796, dated May 8, 2018, WIPO, 12 pages.
(Continued)

*Primary Examiner* — Anthony J Weier
(74) *Attorney, Agent, or Firm* — McCoy Russell LLP

(57) ABSTRACT

A device for preparing a gelatin-based product may include a mix tank, a mix pod that is fluidly coupled to the mix tank via a pod spike, and a hot water tank, where the hot water tank is coupled to the mix pod via the pod spike. In at least one example, the pod spike may include an outer tube and an inner tube. In one or more examples, the pod spike of the device may include a hub, where a first end of the outer tube is coupled to the hub. Further, in some examples, a first end of the inner tube may also be coupled to the hub.

12 Claims, 31 Drawing Sheets

Related U.S. Application Data

(60) Provisional application No. 62/451,617, filed on Jan. 27, 2017.

(51) Int. Cl.
| | | |
|---|---|---|
| *B01F 3/12* | (2006.01) | |
| *B01F 15/00* | (2006.01) | |
| *B01F 5/04* | (2006.01) | |
| *C12G 3/005* | (2019.01) | |
| *B01F 7/16* | (2006.01) | |
| *C12G 3/04* | (2019.01) | |
| *B01F 23/50* | (2022.01) | |
| *B01F 25/316* | (2022.01) | |
| *B01F 27/80* | (2022.01) | |
| *B01F 35/51* | (2022.01) | |
| *B01F 35/00* | (2022.01) | |
| *B01F 35/22* | (2022.01) | |

(52) U.S. Cl.
CPC .............. *B01F 35/51* (2022.01); *C12G 3/005* (2013.01); *C12G 3/04* (2013.01); *B01F 23/565* (2022.01); *B01F 23/581* (2022.01)

(56) References Cited

U.S. PATENT DOCUMENTS

| | | |
|---|---|---|
| 10,251,417 B2 | 4/2019 | Jetton et al. |
| 10,842,168 B2 * | 11/2020 | Jetton ................... B01F 25/316 |
| 2004/0197458 A1 | 10/2004 | Nuckles et al. |
| 2013/0340629 A1 | 12/2013 | Jetton et al. |
| 2016/0309763 A1 | 10/2016 | Jetton et al. |
| 2016/0345769 A1 | 10/2016 | Jetton et al. |
| 2017/0086492 A1 | 3/2017 | Jetton et al. |
| 2017/0251709 A1 | 9/2017 | Jetton et al. |
| 2017/0280750 A1 * | 10/2017 | Arnaud ................... A23L 27/72 |
| 2019/0008196 A1 | 1/2019 | Jetton et al. |

FOREIGN PATENT DOCUMENTS

| | | |
|---|---|---|
| WO | 2015100386 A1 | 7/2015 |
| WO | 2016099625 A1 | 6/2016 |
| WO | 2018231650 A1 | 12/2018 |

OTHER PUBLICATIONS

European Patent Office, Extended European Search Report Issued in Application No. 18745028.3, dated Nov. 24, 2020, Germany, 7 pages.

* cited by examiner

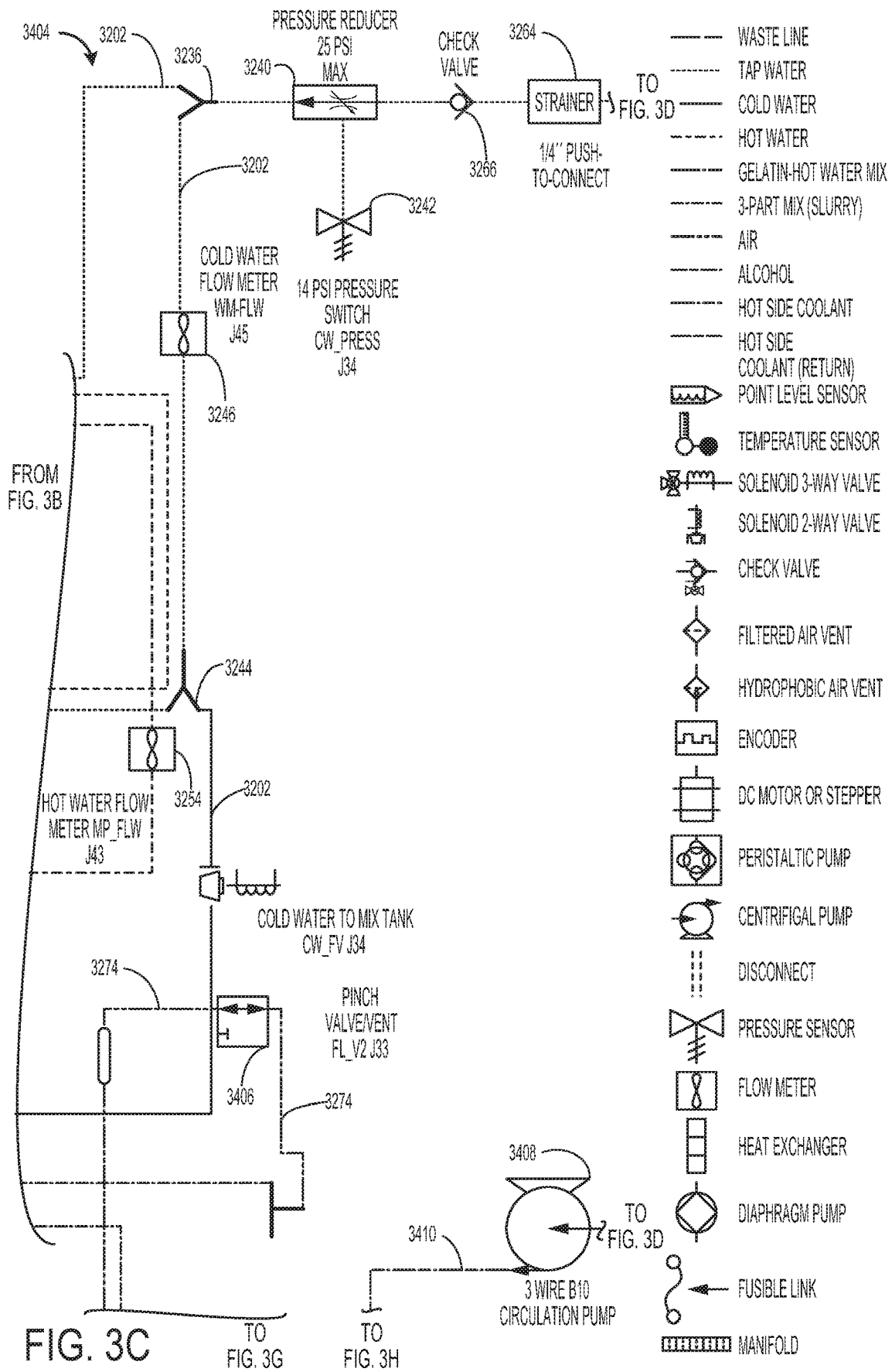

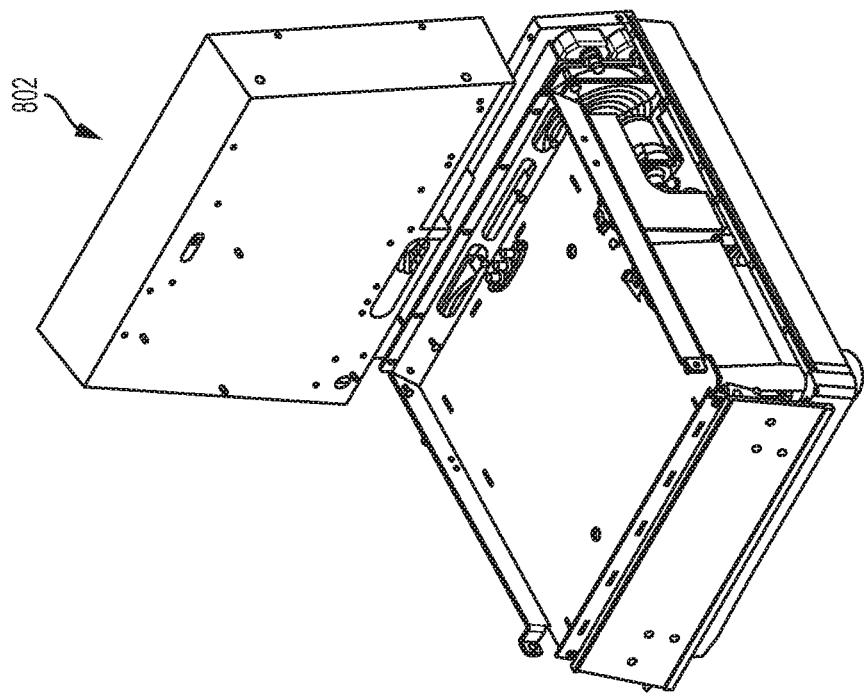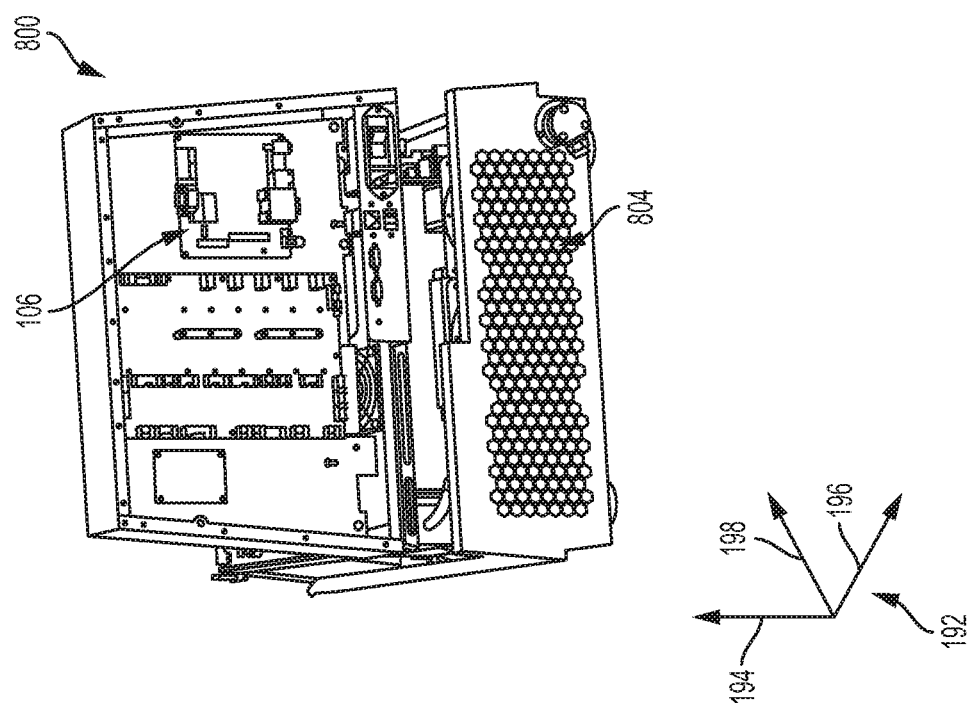
FIG. 8

FIG. 9
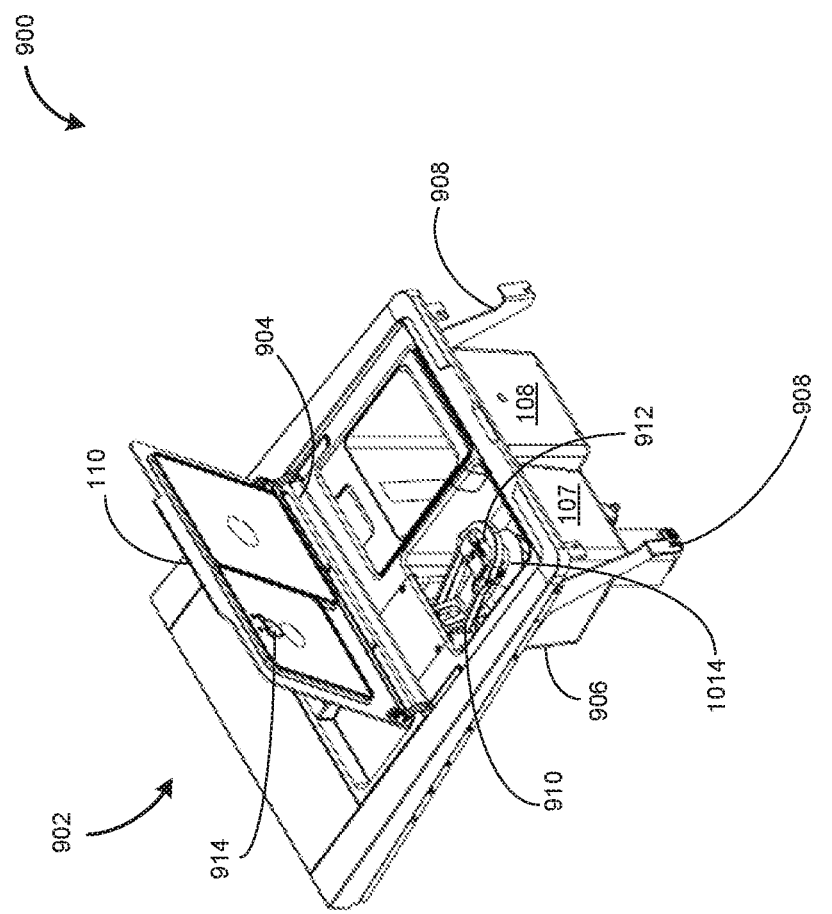
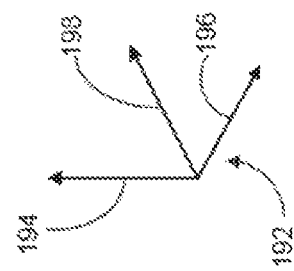

FIG. 10A
FIG. 10B
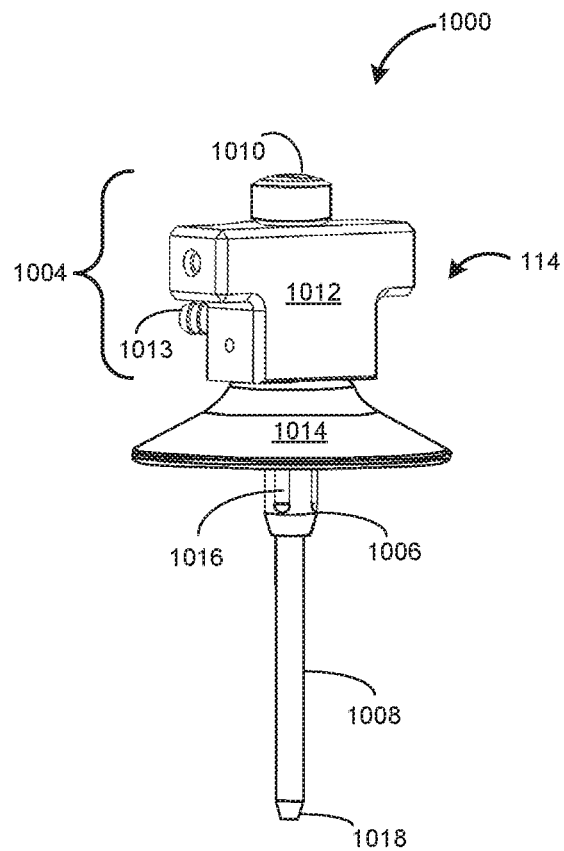
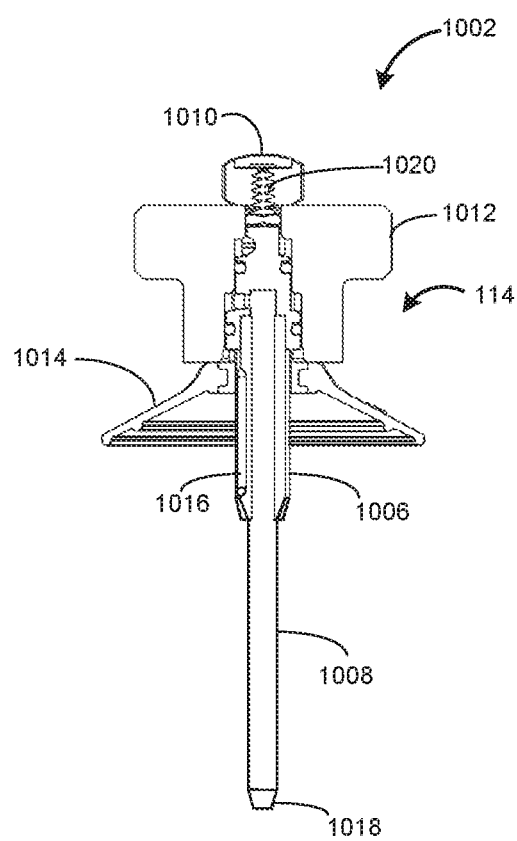
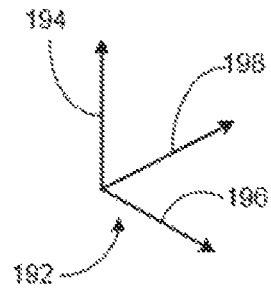
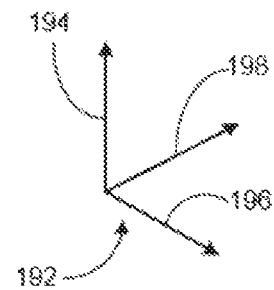

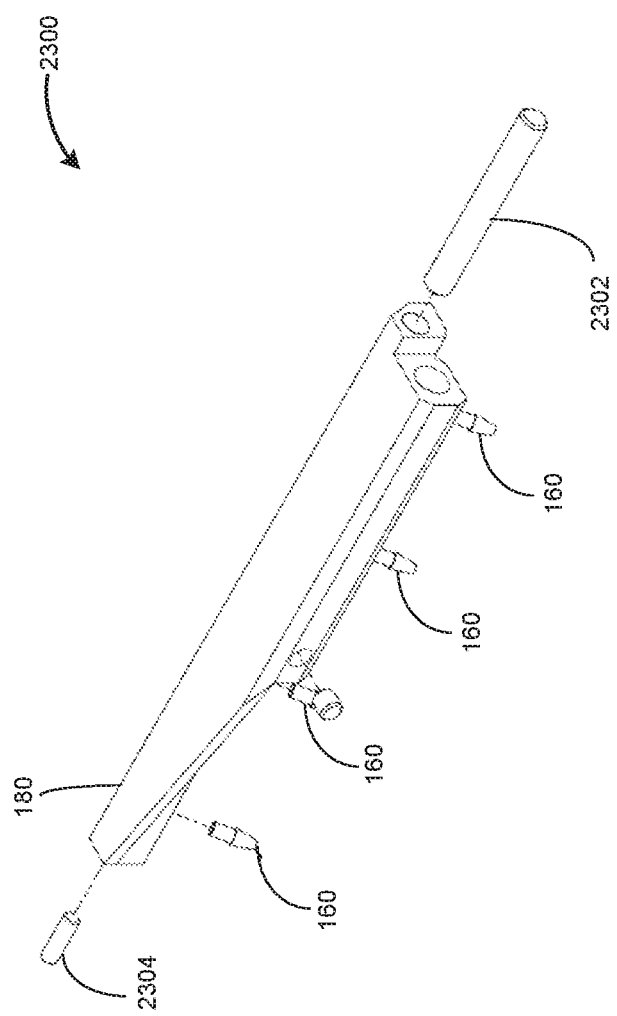
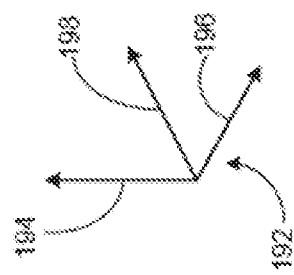
FIG. 11

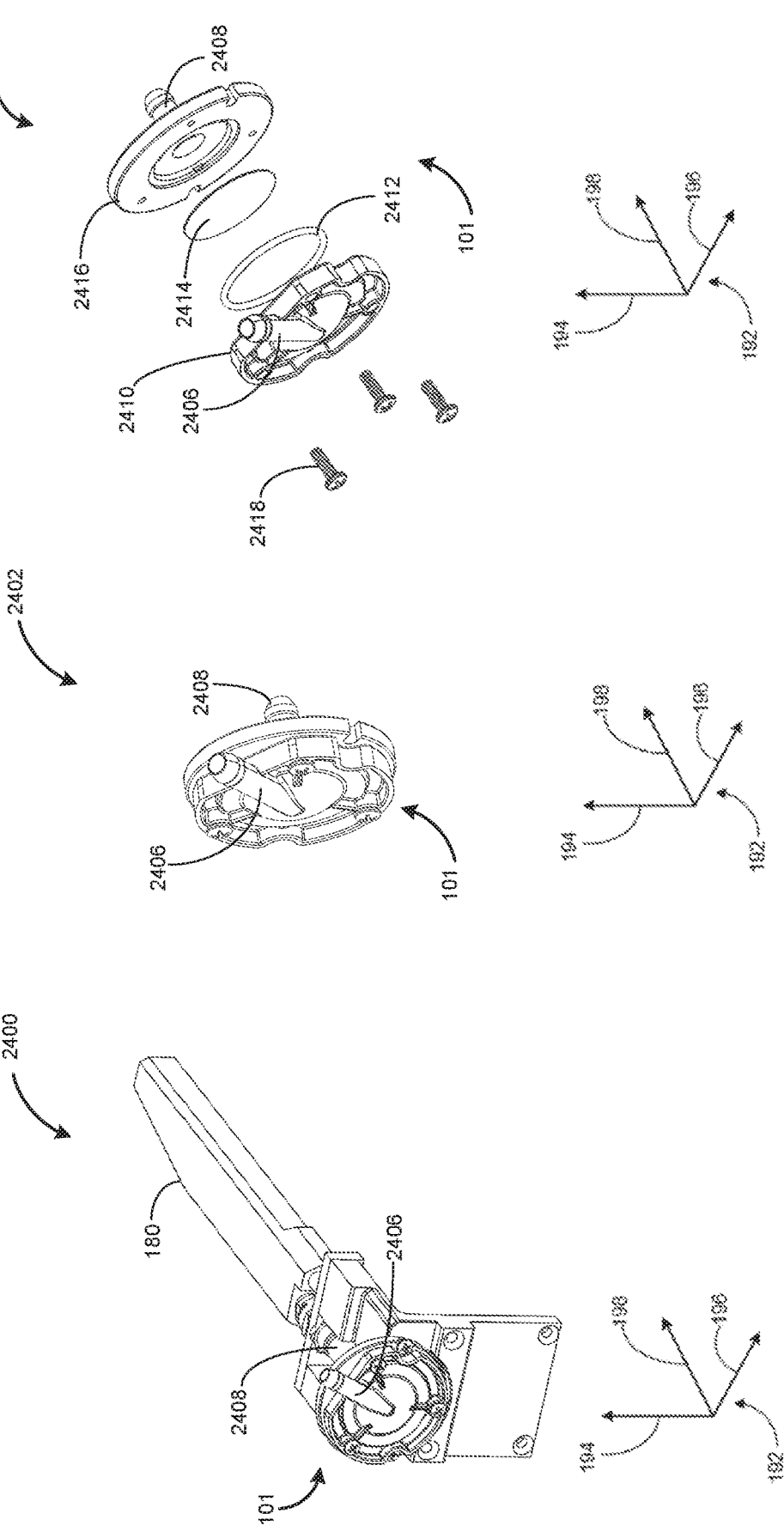

METHODS FOR PREPARATION OF GELATIN-BASED PRODUCTS

CROSS REFERENCE TO RELATED APPLICATIONS

This application is a divisional of U.S. application Ser. No. 15/882,991, entitled "DEVICE AND METHODS FOR PREPARATION OF GELATIN-BASED PRODUCTS," filed Jan. 29, 2018 U.S. Pat. No. 10,842,168. U.S. application Ser. No. 15/882,991 claims priority to U.S. Provisional Application No. 62/451,617, filed Jan. 27, 2017. The entire contents of each of the above applications is hereby incorporated by reference in its entirety for all purposes.

BACKGROUND AND SUMMARY

Gelatin-based food products are food products made with gelatin, a substance commonly used as a gelling agent in food, pharmaceuticals, and cosmetic manufacturing. Gelatin-based food products can be made by combining plain gelatin with other ingredients or by using a premixed powder blend of gelatin with additives. The powdered blend may be dissolved in hot water and then chilled for a period of time to allow the product to set (e.g., gel). Fully prepared gelatin food products are sold in a variety of forms, ranging from large decorative shapes to individual serving cups. Certain gelatin food products are often referred to by the generic term, jello.

A popular recipe of a gelatin-based product calls for the addition of an alcoholic beverage (e.g., rum or vodka) to the gelatin mix, to create alcoholic gelatin-based food products (often referred to by the term, jello shots). When packaged individually into individual serving sizes or cups, these products may be referred to as gelatin-based shots. These products are often made and sold in bars, restaurants, night clubs, resorts, and other entertainment venues. The production of gelatin-based products may take a significant amount of time and manual energy. For example, from start to finish, making a single batch of gelatin-based food products may take four hours or more. This time may include a time to set or gel the product, as well as preparation and clean-up time. In particular, the gel product may be sticky, making it difficult to clean equipment used to prepare the gel product. Serving large amounts of gelatin-based food products may require substantial kitchen and refrigeration space to be used for preparation and housing until the gelatin-based shots are served and sold. Additionally, manually preparing the gelatin-based shots with multiple pieces of equipment may increase the likelihood of contaminating the shots and/or result in an inconsistent end product (e.g., some batches may turn out better than others).

While manually preparing gelatin-based products may lead to the above problems, automating the production of gelatin-based products presents even more challenges. In particular, the gelling characteristic of gelatin-based products creates many problems when using a device to automate gelatin-product production. For example gelatin-based products gel during certain conditions, such as certain temperature conditions. As such, if the temperature throughout the entire gelatin-based product is not controlled to be maintained above a gelling temperature point, for example, the gelatin-based product may at least partially set and stick to components of the device. One approach to prevent gelling within the device may be to include heating elements and pumps. However, there conditions where the heating elements and pumps may not function may be problematic. For example, if a power failure occurs while the device is producing a gelatin-based product, the gelatin-based product may set and stick to components of the device. This sticking may cause portions of the device to clog, such as passages conveying the gelatin-based product, nozzles, or pumps, and in some cases may cause the device to no longer function.

In one example, the issues described above may at least be partially addressed by a device for preparing a gelatin-based product. In one representation, a device for preparing a gelatin-based product may comprise a mix tank, the mix tank connected to a hot water tank, a mix pod (also referred to herein as a pod), an alcohol reservoir, and a dispensing manifold. The device may further include a dispensing strainer, where the dispensing strainer is positioned in a passage connecting the mix tank and the dispensing manifold. The mix tank may also be referred to herein as a mixing chamber.

In at least one example, the mix tank may mix fluids using a mixing paddle and a motor to drive the mixing paddle. The fluids that are mixed in the mix tank may be conveyed to the mix tank by pumping the fluids through passages. In one example, the fluids may include alcohol and a gelatin slurry. For example, the above-mentioned mix pod may mix gelatin and water to make the gelatin slurry, and this gelatin slurry may be conveyed from the mix pod to the mix tank. However, in other examples, the gelatin slurry and alcohol may be mixed directly in the mix pod.

In at least one example, the mix tank may further receive alcohol from the alcohol reservoir, and the gelatin slurry may be mixed with the alcohol. An amount of one or more of the fluids conveyed to the mix tank for mixing may be monitored so that an amount of alcohol and an amount of gelatin slurry conveyed to the mix tank may be controlled. Additionally, an amount of the gelatin-based mixture conveyed from the mix tank to the dispensing manifold may be monitored. For example, flow meters may be included in the device to measure the movement of fluids throughout the device such as hot and cold water, alcohol, and gelatin-based mixtures. Further, in at least on example conveyed metering pumps may be used to convey fluids. For example, metering pumps may be used to meter alcohol.

The resulting gelatin-based mixture from the mix tank may be conveyed from the mix tank to a dispensing manifold, and the dispensing manifold may dispense the gelatin-based mixture received from the mix tank to at least one fluid vessel. Additionally or alternatively, a passage connecting the mix tank to the dispensing manifold may include a dispensing strainer positioned therein.

The position of the dispensing strainer in the passage that connects the mixer tank to the dispensing manifold may be advantageous, as the dispensing strainer being positioned upstream of the dispensing manifold and in line with the passage from the mixer tank may prevent "gummies" from forming and clogging the dispensing manifold. These gummies may be formed due to clumping that may occur during mixing of the gelatin mixture or due to premature setting of the gelatin mixture, for example.

Additionally, including a dispensing strainer that is positioned as described above may simplify cleaning of the device, as gelatin gummies may be caught in the dispensing strainer and prevent build-up of the gelatin-based mixture from forming on the inner walls of passages conveying the gelatin-based mixture. Thus, cleaning of the device may primarily involve cleaning the dispensing strainer, and an amount of cleaning required for the inside walls of passages conveying the gelatin mixture may be reduced.

In at least one embodiment, the device may further include a waste disposal system. For example, the waste disposal system may be connected to a drawer assembly, where the drawer assembly contains the at least one fluid vessel into which the dispensing manifold distributes the gelatin-based mixture.

The mixer tank may be connected to a hot water tank, and hot water may be conveyed from the hot water tank to the mixer tank for mixing of the gelatin-based mixture. The hot water tank may heat water contained therein to a set temperature point and maintain the temperature of the water contained in the hot water tank at the set temperature point. The set temperature point may be a temperature that is hot enough for the water to be conveyed from the hot water tank to the mixer tank and still be at a temperature high enough for preparing the gelatin-based mixture.

In at least one example, the device may additionally or alternatively include a chilling block for cooling a temperature of the gelatin-based mixture in the mixer tank, where the chilling block is only connected to the mixer tank. The chiller block may be used as both a thermal battery and a heat exchanger. Such cooling of the gelatin-based mixture in the mixture tank via the chilling block may help to control a temperature of the gelatin-based mixture. Thus, the gelatin-based mixture may be dispensed into the at least one fluid vessel at a temperature that may expedite the setting process of the gelatin-based mixture. Additionally, in at least one example, the chilling block may enable control of the gelatin-based mixture to maintain the gelatin-based mixture at a temperature that is high enough to prevent gummies from forming in components of the device while conveying the gelatin-based mixture and low enough to expedite the setting process of the gelatin-based mixture upon dispensing the gelatin-based mixture into the at least one fluid vessel.

Additionally or alternatively, the device may include a chiller plate that cools the gelatin-based mixture that is dispensed into the at least one fluid vessel. In one example, the chiller plate only reduces a temperature in a drawer assembly containing the at least one fluid vessel. For example, the chiller plate may be positioned within an assembly that includes the at least one fluid vessel, so that the chiller plate may reduce a temperature of the gelatin-based mixture contained within the at least one fluid vessel.

The inclusion of a chiller plate in addition to the chiller block may be to enable additional cooling after the gelatin mixture is dispensed into the at least one fluid vessel following cooling of the gelatin-based mixture by the chilling block. Such additional cooling may expedite the setting process for the gelatin-based product.

It is noted that reference herein to a quick prep mode of operating the disclosed device may refer to preparing a gelatin-based product via the device where the gelatin and alcohol and/or water are not pre-chilled through a chiller block prior to being dispensed via a dispensing manifold. Rather, in a quick prep mode of operation, the gelatin-based product is only chilled following dispensing via the dispensing manifold. For example, the gelatin-based product may be chilled in an external refrigerator. Additionally or alternatively, a chilling assembly may chill the gelatin-based product within the device (e.g., in a drawer cooling assembly) after the product has been dispensed via the dispensing manifold.

Reference to a ready-to-eat mode herein may refer to a mode of operating the disclosed device that includes pre-chilling alcohol and/or water during production, pre-chilling a gelatin slurry and alcohol and/or water final product mixture prior to dispensing via the dispensing manifold. Additionally or alternatively, the pre-chilled product may be chilled following dispensing via the dispensing manifold. For example, the pre-chilled product may be further chilled within the device via a drawer cooling assembly.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Further, it is noted that the figures described herein below may include similar features. Thus, these features are labeled with the same reference numerals and may not be reintroduced.

BRIEF DESCRIPTION OF THE DRAWINGS

FIG. 3C shows a third partial view of the schematic flow diagram of the quick-prep and ready-to-eat device that produces a gelatin-based product in accordance with one or more embodiments of the present disclosure.

FIGS. 4-8 show various perspective views of a device that produces gelatin-based products, in accordance with one or more embodiments of the present disclosure.

FIG. 4 shows a first view of a device that produces gelatin-based products, in accordance with one or more embodiments of the present disclosure.

FIG. 5 shows a second view of the device that produces gelatin-based products, in accordance with one or more embodiments of the present disclosure.

FIG. 6 shows a third view of the device that produces gelatin-based products, in accordance with one or more embodiments of the present disclosure.

FIG. 7 shows a fourth view of the device that produces gelatin-based products, in accordance with one or more embodiments of the present disclosure.

FIG. 8 shows a fifth view of the device that produces gelatin-based products, in accordance with one or more embodiments of the present disclosure.

FIG. 9 shows a pod and pod spike assembly of the device that produces gelatin-based products, in accordance with one or more embodiments of the present disclosure.

FIG. 10A shows a first detailed view of the pod spike of the device that produces gelatin-based products, in accordance with one or more embodiments of the present disclosure.

FIG. 10B shows a cut-away view of the pod spike shown in FIG. 10A.

FIG. 11 shows a view of a dispensing manifold of the device that produces gelatin-based products, in accordance with one or more embodiments of the present disclosure.

FIG. 12A shows a first view of a dispensing strainer coupled to a dispensing manifold of the device that produces gelatin-based products, in accordance with one or more embodiments of the present disclosure.

FIG. 12B shows a second view of the dispensing strainer from FIG. 12A uncoupled from the dispensing manifold for viewing purposes.

FIG. 12C shows a third view of the dispensing strainer from FIGS. 12A and 12B, where the dispensing strainer is shown disassembled for viewing purposes.

FIGS. 13A-18 show flow charts for various example methods for operating the device that produces gelatin-based products, in accordance with one or more embodiments of the present disclosure.

FIG. 13A shows a flow chart for an example method for preparing a gelatin-based product in accordance with one or more embodiments of the present disclosure.

FIG. 14 shows a flow chart of an example method for tracking usage of the device for preparing gelatin-based shots in accordance with one or more embodiments of the present disclosure.

FIG. 15 shows a flow chart of an example method for analyzing usage data of a device for preparing gelatin-based shots in accordance with one or more embodiments of the present disclosure.

FIG. 16 shows a flow chart of a first example cleaning sequence in accordance with one or more embodiments of the present disclosure.

FIG. 17 shows a flow chart of a second example cleaning sequence in accordance with one or more embodiments of the present disclosure.

FIG. 18 shows a flow chart of a third example cleaning sequence in accordance with one or more embodiments of the present disclosure.

FIGS. 4-12 are drawn to scale. Other relative dimensions may be used.

DETAILED DESCRIPTION

Figure 1:
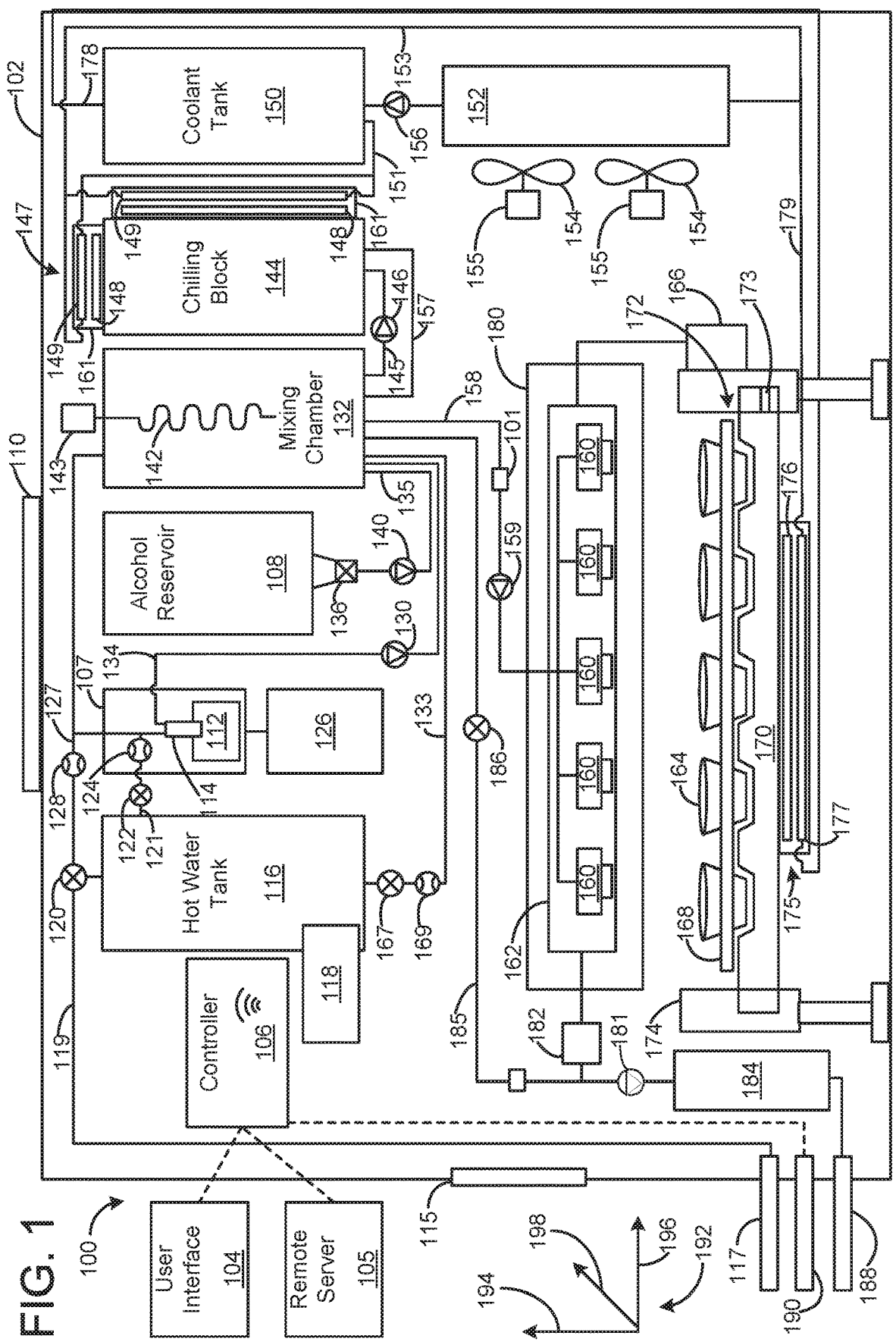
FIG. 1 shows a first example schematic block diagram of a device that produces a gelatin-based product, in accordance with one or more embodiments of the present disclosure.

The following description relates to systems and methods for the preparation of gelatin-based products. Specifically, gelatin-based products may be prepared using a single and contained device, such as the device shown in FIGS. 4-12. In one example, the gelatin-based products may include gelatin mixed with other ingredients. For example, a gelatin powder may be mixed with water and, optionally, alcohol to form a liquid gelatin mixture. The device shown in FIGS. 4-12 may be an automatic gelatin shot-making machine. Thus, the device may be configured to automatically make a consumable product containing gelatin. The device may include one or more water reservoirs and alcohol reservoirs, as well as a space (e.g., slot) for receiving a pod. The pod may contain dry ingredients including gelatin power and possibly additional dry additives (such as vitamins or additional flavoring). A specific amount of water may be added to the dry ingredients in the pod to dissolve the dry ingredients. The resulting mixture may then be pumped out of the pod and combined with additional water and/or alcohol in a mix tank. From the mix tank, the mixture may be directed through a chilling block of a chilling module where the mixture is cooled via one or more chilling devices. It is noted that reference to pumps herein may refer to metering pumps, in at least one example. For example, such metering pumps may be peristaltic pumps or alternative current (AC) solenoid-based metering pumps. After being cooled, the liquid gelatin mixture is routed to a plurality of dispensing heads of a dispensing manifold, where the mixture is dispensed into at least one fluid vessel. For example, the mixture may be dispensed into individual serving cups. The gelatin mixture may be further chilled in the cups to form set the gelatin-based mixture into a gelatinous and solid gelatin-based product. A shape of these cups may be varied in order to change the shape of the final gelled product.

The gelatin-based product within individual serving cups may be referred to herein as shots and thus the device may be referred to herein as a shot-making device. Processes for making the gelatin-based shots using the device and also for operating the device in different operational states are shown in FIGS. 13-18. For example, the device for preparing a gelatin-based product may be operated in a quick prep mode, where the gelatin-based product is in a liquid state upon completion of a production cycle. Thus, the gelatin-based product may in a liquid state upon completion of a cycle in the quick prep mode.

When operating the device for preparing the gelatin-based product in the quick prep mode, upon completion of the cycle producing the gelatin-based product in the quick prep mode, the gelatin-based product may be in a liquid or mostly liquid state, and the gelatin-based products may be placed in a different chamber that is outside of the device to set. For example, the gelatin-based product resulting from a quick prep cycle of the device may be placed in a refrigerator to cool the gelatin-based product produced via the quick prep cycle to set the gelatin-based product. The quick prep mode may be advantageous for quickly producing large quantities of the gelatin-based product, as a cooling process time of the gelatin-based product within the device may be reduced.

Additionally or alternatively, the gelatin-based product may be operated in a ready-to-eat mode, where the gelatin-based product is set during a production cycle. It is noted that reference to a gelatin-based product that is set is reference to a gelatin-based product that has gelled.

It is noted that in at least one example, the device for producing gelatin-based shots according to at least one example of the present disclosure may only be configured to operate in a quick-prep mode. Such examples where the device may only operate in a quick-prep mode may advantageously reduce an amount of energy required by the device as well as reduce packaging constraints within the device, as a chilling block may not be included. An example fluid diagram for an example device that may only be configured to operate in a quick-prep mode is shown at FIGS. 2A-2F.

Further, in at least one example, the device for producing gelatin-based shots may be configured to operate in both a quick-prep mode and a ready-to-eat mode. Such examples where the device for producing gelatin-based shots may be able to operate both the quick-prep mode and the ready-to-eat mode may beneficially enable flexibility in making either many gelatin-based shots that are removed from the device to set in another chiller (e.g., in a quick-prep mode) or making gelatin-based shots that are set and ready for consumption upon removal from the device (e.g., in a ready-to-eat mode). An example fluid diagram for an example device that may produce gelatin-based shots in both a quick-prep mode and a ready-to-eat mode may be found at FIGS. 3A-3H.

Once all the necessary ingredients are loaded into the device, all the steps for making a batch of gelatin-based shots are performed within the device. Thus, the mixing and chilling may be fully-contained within one device, as discussed above in reference to the ready-to-eat mode. In another example, the mixing may be fully-contained within one device, while the chilling may be done external to the device, as discussed above in reference to the quick prep mode. Further, the chilling may be performed more quickly with a chiller module of the device than conventional chilling methods for making gelatin-based shots, such as a refrigerator. By automating the shot-making process, shots may be made more efficiently, thereby saving a user's time and money. Additionally, the mixing and chilling process of the device ensures the consistency of the shots. In one example, businesses such as bars, night clubs, restaurants, hospitals, and/or resorts may utilize the device to more efficiently prepare gelatin-based shots for their customers. The figures may be described collectively for purposes of discussion.

FIG. 1 shows a schematic of an embodiment of a machine or device 100 for the preparation of gelatin-based food products. In particular, FIG. 1 is a two-dimensional schematic diagram showing components of the device 100 and how they are fluidly coupled to one another. As such, the actual sizes and relative positions of the components of the device 100 may be different than shown in FIG. 1. FIGS. 4-12, described further below, are three-dimensional schematics of the device 100 showing the relative sizes and positions of the components within the device. As such, the function of each component may be described with reference to FIG. 1 while the positioning of each component within the device may be described with reference to FIGS. 4-12. FIGS. 4-12 are drawn to approximately to scale. As such FIGS. 4-24 show the relative sizes and positioning of the components of the device 100.

Further, FIGS. 4-12 show an axis system 192 including a vertical axis 194, a horizontal axis 196, and a lateral axis 198. The axis system 192 may be used to reference the relative positioning of components of the device 100. For example, components may be referred to as "above" or "below" one another with respect to the vertical axis 194. Movement of components in the vertical direction refers to movement along the vertical axis 194, and movement of components in the horizontal direction refers to movement along the horizontal axis 196, and movement of components in the lateral direction refers to movements along the lateral axis 198. It is noted that vertical axis 194 points opposite a direction of gravity.

In one example, the device 100 may be referred to as a shot-making device. Generally, the device 100 is configured to prepare one or multiple single servings of a gelatin-based product. In one embodiment, the device 100 may be configured to prepare gelatin-based shots containing alcohol. In other embodiments, the device 100 may be configured to prepare gelatin-based shots containing non-alcoholic beverages such as fruit juice, energy drinks, and soft drinks. In further embodiments, the device 100 may be configured to prepare gelatin-based shots containing various consumable products such as fruit, vitamins, supplements, etc.

Turning to FIG. 1, a first embodiment of the shot-making device 100 is shown. The device 100 includes a device housing 102 and a user interface 104. A controller 106 within the housing 102 communicates with the user interface 104. In one example, the user interface 104 may be a touchscreen display coupled to an exterior of the housing 102. Specifically, the user interface 104 may be a graphical user interface used for the configuration, maintenance, and operation of the device 100. In one example, the user interface 104 may be coupled to a side of the exterior of the housing 102. Specifically, the user interface 104 may be positioned on a front face of the housing 102, above a slideable drawer (e.g., drawer 172) of the device 100.

The slideable drawer 172 may consist of a drawer, two bearing rails, a cup cooling block (tray 168), a chiller plate module 175, and a set of bearings. The bearing rails may include divots for bearings when the slideable drawer 172 is in a closed position. Such divots may enable the drawer 172 to sit lower so that the chiller plate module 175 may contact the cup cooling block and transfer heat away from the cup cooling block. The cup cooling block, also referred to as tray 168, may include a set of nests for retaining cups, and the cup cooling block may be positioned such that it is near or contacting the chiller plate module 175. The tray 168 may advantageously increase a surface area to perform heat exchange with the chiller plate module 175 for cooling a gelatin-based mixture that may be contained within fluid vessels 164 nested inside the tray. Thus, the configuration of the slideable drawer 172 may be particularly useful, so that the gelatin-based product held within the fluid vessels 164 may be quickly reduced in temperature to expedite a setting process of the gelatin-based product.

Additionally, in at least one example, the slideable drawer 172 may further include a sliding drawer closure to interlock the slideable drawer 172 with the remainder of the device 100, and proximity sensors may be used to determine whether the slideable drawer 172 is in a closed state or an open state. These features of the sliding drawer closure and the proximity sensors may be useful for preventing user error, which may occur if the slideable drawer 172 is ajar when operating the device 100, for example. In at least one example, the feature of the closure may hold the slideable drawer 172 in a position, such as a closed position, so that the slideable drawer 172 is aligned with the heads 160 of the dispensing manifold 180, so that the gelatin-based product is dispensed into the cups, while reducing overflow into the rest of the drawer. Furthermore, the proximity sensors may prevent user error by preventing operation of the device 100 until it is determined that the slideable drawer 172 is closed based on an output from the proximity sensors. The slideable drawer 172 may further include an interlocking feature to hold the tray 168 in place within the drawer 172 to ensure that the fluid vessels 164, which are held within the tray 168, are aligned with the heads 160 of the dispensing manifold 180. In at least one example, the dispensing manifold 180 may be removable for cleaning purposes.

In another example, rather than the user interface 104 being integral with the device housing 102, the user interface 104 may be a touchscreen display on a remotely located computer, tablet, or mobile device that communicates wirelessly with the controller 106. In yet another example, the user interface 104 may include a series of buttons positioned on the exterior of the housing 102. In this way, the user interface 104 may be electrically coupled and/or wirelessly coupled to the controller 106.

The device 100 may be wirelessly connected to a remote server 105 via a wireless network. Although a single remote server is shown in the example of FIG. 1, it should be appreciated that the device 100 may be wirelessly connected to two or more remote servers of a wireless network such as a cloud computing arrangement. Specifically, the controller 106 may include a communication module that may enable wireless communication between the controller 106 and the remote server 105. Wireless connectivity with the remote server 105 may be used to track usage of the device 100, device operating conditions, user preferences, shot consumption rates, alcohol consumption, etc. The remote server 105 may analyze the information received from the controller 106, and generate activity reports, usage reports, etc., that may then be sent to the device 100 and/or displayed to a user. Additionally, the remote server 105 may enable software updates of the user interface 104 and the controller 106 firmware. Also, in at least one embodiment, the remote server 105 may enable updating of recipes of the device 100. For example, updating the recipes may enable the device 100 to change operational sequences or volumes based on one or more of flavor, alcohol, sequence, and environmental factors.

Further the remote server 105 may utilize the received information to discern trends and/or patterns to formulate user preferences, predict future orders, and send alerts and/or notifications to the user. Additionally, the server 105 may analyze the information received from the controller 106 to diagnose and/or detect component failure and/or degradation. Further still, in at least one example, the device 100 may have failsafe processes to prevent conditions that may cause component failure or degradation. For example, software and hardware of the device may be utilized to protect the device 100 if it is detected that a temperature of the device 100 has exceeded a threshold. For example, software of the device may enable monitoring of the temperature of the device 100, so that if a temperature of the device is determined to be greater than a predetermined value, the controller 106 may turn off the device 100 or may turn off a functional block of the device, such as the hot water tank. In another example, hardware of the device 100 may include manually resettable thermostats that will trigger if a temperature threshold is exceeded to shut down the device 100. For example, the manually resettable thermostats may trigger responsive to a temperature threshold, where the temperature threshold is greater than a normal operating temperature of the device 100.

Additionally, in at least one example, the software and the hardware of the device 100 may be configured to provide compensation during component failure. For example, if a chilling block 144 of the device is not operating efficiently, and the chilling block 144 is unable to reduce a temperature of the gelatin-based mixture to a desired temperature within a desired timeframe, a temperature of the hot water supplied for mixing the gelatin-based mixture may be reduced to a temperature that is as low as possible while still being able to dissolve the gelatin powder.

The remote server 105 may send an alert to the user to clean a component of the device 100 when a failure of that component is detected. In other examples, the remote server 105 may send a notification to a user to place an order for additional pods and/or alcohol, based on a most recent order, user preferences, and based on the usage rates of the alcohol and/or gelatin powder containing pods.

Additionally, the remote server 105 may send updates to the controller 106. For example, the remote server 105 may send the controller updated alcohol and gelatin pod information, advertisements which may be tailored to the user based on the user preferences, updated control routines that may be executed by the controller 106, cleaning schedules, etc. In this way, operation of the device may be remotely tracked and monitored by the remote server 105.

In at least one example, the device 100 may further perform a diagnostic sequence upon the device 100 turning on to test components of the device 100 for failure. If any one or combination of the components of the device 100 are determined to be degraded or not functioning, then the device 100 may employ component compensation, as discussed above, to address the issues of degradation and/or provide an alert to indicate the component degradation or failure. In at least one example, this may include preventing operation of the device 100 if a component of the device is determined to not be functioning. For example, if a pump is not functioning and a request to produce gelatin-based products is made, the device may not allow such operation to occur and may provide an alert regarding failure of the pump. On the other hand, if a component is degraded that would not cause the gelatin-based product to set in the device, such as a degraded chilling module, then the device may allow operation of the device to produce gelatin-based products. For example, the device may provide an alert and still allow operation to produce gelatin-based products. Additionally, in an example where a chilling module may be degraded, other components may be adjusted to compensate for this degradation. For example, the gelatin-based product may have a prolonged chilling phase with a second chilling module to compensate for the first chilling module not functioning.

The device 100 may further include a power adapter 190 and/or connector for connecting the device 100 to a power source (e.g., a wall outlet). In other embodiments, the device 100 may include a battery and be battery operating. Controller 106 may receive electrical power from the power adapter 190. The controller 106 may distribute electrical power to various components of the device 100 such as pumps, motors, valves, sensors, and other electrically powered components of the device 100. Thus, the controller 106 may adjust operation of the various components of the device 100 by manipulating a voltage and/or current supplied to said components. For example, and as explained in greater detail below, the controller 106 may adjust operation of device components based on a type of gelatin mixture and/or alcohol admitted into the device 100.

The device 100 may operate in a plurality of modes such as a quick prep mode, a ready-to-eat mode, and a cleaning mode, where the quick prep mode and the ready-to-eat mode are both shot-making modes, and where the cleaning mode may include any one or combination of a deep cleaning mode, a user assisted deep cleaning mode, and a quick cleaning mode.

The deep cleaning mode may be a device self-cleaning mode, where the device uses water that is higher in temperature than in other cleaning modes (such as a quick cleaning mode) and where the device uses more water to clean out the device. The user assisted deep cleaning mode may include similar features as the deep cleaning mode, and may further include displaying a message to prompt a user to manually clean specific parts of the device. The quick cleaning mode may be use less water and/or water that is at a lower temperature than the deep cleaning mode to clean out the device. The cleaning modes of the device are especially important to ensure that the device functions, as gelling of the gelatin-based product within the device may lead to the device no longer functioning. For example, clogs may form in portions of the device that may require replacement of components of the device to fix.

In some examples, the user may select a desired mode via the user interface 104. Additionally or alternatively, the controller 106 may switch between modes based on current operating conditions. For example, the device 100 may run in the cleaning mode once the shots have been made and the shot-making mode has been terminated. In the shot-making mode, the device 100 may prepare a plurality of consumable, gelatin-based shots, which may include one or more of alcohol, vitamins, fruit, juices, etc. The cleaning mode may comprise flowing water or another cleaning fluid through the fluid lines and reservoirs of the device to clear residual gelatin mixture therefrom. Further, a user may remove various components of the device such as drawers and containers for cleaning thereof in a user assisted cleaning mode, as described above.

FIG. 1 shows how components of the device 100 are fluidically coupled to one another. First, a description of fluid flow through the device 100 in the shot-making mode is provided, followed by a description of fluid flow through the device 100 in the cleaning mode.

Inside the housing 102, the device 100 includes a pod receptacle (also referred to herein as a mix pod receptacle or a pod receptacle) 107, and one or more liquid reservoirs, such as alcohol reservoir 108. It should be appreciated that although in the example of FIG. 1 only one alcohol reservoir is shown, more than one alcohol reservoir may be included in the device 100. In some examples, the alcohol reservoir 108 and/or the pod receptacle may be permanently secured to the housing 102. However, in other examples, the alcohol reservoir 108 and/or the pod receptacle 107 may be removably coupled to the housing 102. A user may remove and/or access the alcohol reservoir 108 and pod receptacle 107 via a door 110 positioned on a wall (e.g., top wall) of the housing 102 directly above the alcohol reservoir 108 and pod receptacle 107. In one example, a level in the alcohol reservoir 108 may be monitored via a capacitive level sensor. Using a capacitive level sensor may be advantageous, as it allows the alcohol reservoir level to be monitored without using any cables or connections on the alcohol reservoir itself.

If a level in the alcohol reservoir 108 is less than a minimum level, an alert may be provided (e.g., illuminating a light, providing a sound, displaying a message) indicating that the alcohol reservoir needs to be replenished. Monitoring the level in the alcohol reservoir 108 may ensure that sufficient alcohol is available when operating the device 100 to make a desired gelatin-based product.

Before initiating the shot-making mode, a user may open the door 110 and fill the alcohol reservoir 108 with an alcoholic beverage or other consumable liquid. The user may additionally or alternatively load a pod (also referred to herein as pod) 112 into the pod receptacle 107. Loading of the pod 112 may comprise inserting the pod 112 into the pod receptacle 107, and then adjusting a pod spike 114 to penetrate the pod 112. In at least one embodiment, the mix pod 112 may be affixed to the pod receptacle 107 via magnet to hold the pod in place. In at least one example, the pod may comprise polypropylene.

In at least one example, the mix pod 112 may include a pod label. The pod label may beneficially provide a seal for the gelatin contents of the pod to maintain a shelf life of the gelatin contents, to protect against water/moisture ingress into the mix pod, to maintain the seal during the hot water mixing process, and to allow easy puncture by the pod spike.

In at least one example, the label creates a strong high temp seal by using the same or similar materials between the main pod structure and the first layer in the label. The label may comprise multiple layers. For example, the label of the mix pod may comprise three layers, including a first layer that utilizes a same plastic material as used for the pod, a second layer that comprises metalized foil, a third layer that comprise a clear sealing layer to protect the graphics that are printed on the foil layer. The particular layering to include the first layer as the same plastic material as the pod, the second layer being a metalized foil, and the third layer being a clear sealing layer may beneficially help to ensure that during puncturing of the label with the pod spike that the label seals itself around the pod spike, so that the water does not leak out of the mix pod as water is introduced into the mix pod.

In at least one example, the pod spike 114 may be affixed to the device in a removable manner Such attachment of the pod spike 114 in a removable manner may enable the easy removal for cleaning of the pod spike 114. Furthermore, device 100 may include a limit switch on the pod spike 114 to prevent the pod spike from activating until a pod spike assembly is pressed into the pod 112.

The pod spike 114 is attached within a wall of the pod receptacle 107 and is not attached to a door 110 of the device 100. The pod receptacle 107 may be configured (e.g., sized and/or shaped) to receive one or more pods. In some examples, the pod 112 and pod receptacle 107 may include mating features adapted to interface with one another to physically secure the pod 112 and pod receptacle 107. After inserting the pod 112 into the pod receptacle 107, the user may then adjust the position of a pod spike 114 to an engaged position, which may comprise puncturing the pod 112 with the pod spike 114. Thus, the user may push the pod spike 114 through a wall of the pod 112 (e.g., top wall of the pod 112), such that the pod spike 114 extends into the interior of the pod 112. The engaged position of the pod spike 114 therefore, may be a position where the pod spike 114 extends into the interior of the pod 112.

The pod 112 may be a container containing dry ingredients such as gelatin powder. In one example, the pod 112 may be a rigid container. In another example, the pod 112 may have a shape such as rectangular, square, or cylindrical. Additionally, the pod 112 may be single use (e.g., only used for one batch of shots).

In examples where more than one alcohol reservoir 108 is included in the device 100, each of the alcohol reservoirs may contain a different type of alcohol. In other examples, the alcohol reservoir 108 may contain non-alcoholic liquids such as fruit juice, energy drinks, and soft drink. Further, liquids or dissolved consumable products such as vitamins and supplements, may be deposited into the alcohol reservoir 108. The alcohol reservoir 108 may be covered by the door 110 and may be sealed at all openings or ports such that the alcohol within the reservoirs may not be contaminated. In one example, the alcohol reservoir 108 may comprise a rectangular cross-section and may be made of a material able to contact food products such as food grade plastic.

Before or after loading the pod 112 and/or filling the alcohol reservoir 108, a user may be prompted via the user interface 104 to identify the pod type and/or alcohol type of the pod 112 and alcohol, respectively, in the device 100. The pod type may include one or more of a manufacturer, flavor, size, product identification number, serial number, etc., of the pod 112. Similarly, the alcohol type may include one or more of a liquor type, brand, manufacturer, product identification number, etc., of the alcohol in the alcohol reservoir 108. In at least one example, the alcohol reservoir 108 may be a removable tank with a conical check valve to prevent leaking upon removal from the device. Thus, if the alcohol reservoir contains residual fluid when it is removed, the conical check valve may prevent leaking from occurring.

A request may be presented to the user on the user interface 104 for the user to identify the pod type and/or alcohol type. In one example, the device 100 may include a product identification barcode scanner 115 for identifying the consumable pod and/or alcohol types. The scanner 115 may be one of a laser, LED, pen-type, RFID, etc., type scanner. The scanner 115 may be positioned on an interior surface of a wall (e.g., front wall) of the device 100. In this way, a user may hold the pod 112 and/or alcohol bottle near the scanner 115, exterior to the housing 102, and the scanner 115 may identify the pod and/or alcohol type based on a barcode or other identifying label of the pod 112 and/or alcohol bottle. Each pod 112 may therefore include an electronic indicator, identifier tag, or other electronic label (e.g., microchip) readable by the scanner 115. Consumable data contained within the electronic identifier tag may then be transferred to the controller 106 from the scanner 115. In one example, consumable data may include one or more of a number of shots to be made from the pod 112, a flavor of contents (e.g., dry ingredients) within the pod 112, an expiration date of the contents within the consumable pod 112, a manufacturing data of the pod 112, and/or a manufacturer of the consumable pod 112.

In another example, the user may select the pod type and/or alcohol type from a list of consumable pods and/or alcohol types, presented to the user via the user interface 104. For example, a catalog or library of consumable pods and/or alcohols may be stored in memory of the controller 106. The user may search the catalog based on a manufacturer, liquor type, etc., via the user interface 104. Further, the user may search a most recent list of alcohols and/or pods used in the device 100.

Further, based on the type of pod and/or alcohol identified by the user or scanner 115, the controller 106 may look up product information for the pod 112 and/or alcohol, specific to the pod and/or alcohol type. Thus, the controller 106 may store product information for each type of pod 112 and/or alcohol in non-transitory memory, such as in a look-up table. The product information for the pod 112 and/or alcohol may therefore be accessed from the look-up table based on the identified pod and/or alcohol type. The pod product information may include the manufacturer, pod size, flavor, gelatin power amount, etc., of the pod 112. Similarly, the alcohol product information may include the manufacturer, liquor type, alcohol concentration, flavor, etc., of the alcohol.

After the pod 112 has been loaded, and one or more consumables have been inserted into the alcohol reservoir 108, the user may initiate the shot-making process via one or more buttons or touch screens included on the device 100, such as via user interface 104. In some examples, the shot-making process initiated may be a quick prep mode shot-making process. In other examples, the shot-making process initiated may be a ready-to-eat mode shot-making process. In examples where the device may perform either a quick prep mode or a ready-to-eat mode, initiating the shot-making process may include receiving a user input to select either operating in a quick prep mode or operating in a ready-to-eat mode.

However, in other examples, the device may only be able to operate in one of the quick prep mode. For example, if the device is only able to operate in the quick prep mode, initiating shot-making may not include receiving a user input to specify that the shot-making process occurs in the quick prep mode. Instead, in examples where the device is only able to operate in the quick prep mode, initiating shot-making may only include receiving a user input indicating to start a shot-making cycle.

If the device is able to operate in the ready-to-eat mode, however, the device may also be able to operate in the quick prep mode.

In other examples, the controller 106 may initiate the shot-making process in response to one or more initiation criteria being satisfied. For example, the one or more initiation criteria may be satisfied when there is an indication that the pod 112 has been loaded into the pod receptacle 107, one or more consumables have been inserted into the alcohol reservoir 108, and the door 110 is closed. Responsive to determining that the one or more initiation criteria are satisfied, the controller 106 may automatically initiate the shot-making process. In such examples where the shot-making process is automatically initiated, the device may operate in a mode used in an immediately previous cycle.

For example, if the mode that the device was operated in the immediately previous cycle was a quick prep mode, the device may automatically initiate the shot-making process in the quick prep mode responsive to determining that the above criteria have been met. Similarly, if the mode that the device was operated in the immediately previous cycle was a ready-to-eat mode, then the device may automatically initiate the shot-making process in the ready-to-eat mode responsive to determining that the initiation criteria are satisfied.

In examples where the device 100 only operates in one mode (e.g., a quick prep mode), the device 100 may automatically initiate the shot-making process responsive to initiation criteria being satisfied in the only mode in which it operates. For example, if the device 100 only operates in the quick prep mode, the device 100 may only automatically initiate the shot-making process in the quick prep mode responsive to initiation criteria being satisfied. The device 100 may include various sensors for detecting current operating conditions of the alcohol reservoir 108, door 110, and pod 112. For example, the device 100 may include a flow meter or fluid level sensor for determining an amount of alcohol in the alcohol reservoir. Further, a position sensor may be included within the door 110 for estimating a current position of the door 110.

In still another example, in response to initiation criteria being satisfied, the device 100 may require selection of a mode in which to operate the device 100. For example, in embodiments where the device 100 may operate in either the quick prep mode or the ready-to-eat mode, following detection that initiation criteria have been satisfied, such as the initiation criteria discussed above, the quick prep mode or the ready-to-eat mode must be selected prior to starting production of the shots. Selection of the quick prep mode or the ready-to-eat mode may be achieved via receiving a user input. For example, responsive to determining that the initiation criteria are satisfied, the device 100 may provide a display prompting a user to select either the quick prep mode or the ready-to-eat mode, the device 100 may receive a user input selecting either the quick prep mode or the ready-to-eat mode, and then following receiving selection of either the quick prep mode or the ready-to-eat mode, the device 100 may produce shots in the selected mode. The user input may be received via a user interface 104, as described above.

The shot-making process may comprise a first mixing phase where the gelatin powder in the pod 112 is mixed with hot water, a second mixing phase where alcohol and/or additional water is added to the mixture, a first chilling phase where the mixture is cooled to a first threshold temperature, a dispensing phase, where the mixture is dispensed into one or more serving cups. Additionally or alternatively, the shot-making process may include a second chilling phase where the dispensed mixture is cooled and hardened.

To begin the shot-making process, water from a hot water tank or a plurality of hot water tanks 116 may be introduced into the pod 112. It is noted that in examples where there may be a plurality of hot water tanks 116, these hot water tanks may be positioned in close proximity to one another within the device 100. Further, in examples where there may be a plurality of hot water tanks 116, at least one of the hot water tanks may be used as a reserve hot water tank to clean out the device 100 in case of a failure of the device, such as a power failure or other issues that may cause the device to abort producing gelatin-based products partway into a production cycle. In examples where the device 100 only includes one hot water tank 116, however, this one hot water tank may be used to clean out the device 100 in case of failure of the device, such as failure of the device that causes production of the gelatin-based products to be aborted partway through a production cycle. Responsive to a failure event such as described above, the hot water tank may flush the passages and/or components of the device out with hot water to clean the device. Such a failsafe cleaning operation may prevent gelatin-based product from setting and potentially breaking the device, even though the production cycle was aborted prior to finishing production of the gelatin-based products. Further, in at least one example, a failover sensor may be positioned proximal to the hot water tank, and, responsive to determining that the device is not connected to a water source based on a flow sensor output, a prompt may be provided via a display of the device requesting connection to a water source.

Thus, the shot-making process may begin with the first mixing phase, where water is added to the pod 112 and mixed with the dry gelatin powder contained within the pod 112. The hot water tank 116 may include a heater 118 for heating water included in the tank 116. Tank 116 may receive water from a water source via a water inlet port 117 which may be integrated into the housing 102 for receiving water from a secondary source. In one example, the secondary water source may be a larger water reservoir external to the device 100. In another example, the secondary water source may be tap water. Water may be supplied to the hot water tank 116 from the water inlet port 117 via a first water line 119. In some examples, a first valve 120 may be positioned in the first water line 119 for regulating an amount of water supplied to the hot water tank 116. Further a closable vent or valve may be included in the hot water tank 116, an in an event where the hot water tank 116 is over filled, the vent or valve may allow the hot water tank 116 to release excess water. This excess water may drain to a drain tank 184. First water line 119 may therefore be coupled on a first end to the water inlet port 117 and on an opposite second end to the hot water tank 116.

In the description herein valves may in some examples be passive valves such as wax thermostatic valves that adjust position and flow there-through in response to changes in operating conditions. However, in other examples, one or more of the valves in the device 100 may be electrically actable valves, where the position of the valves may be adjusted by an actuator of the valve based on signals received from the controller 106. In this way, the controller 106 may send signals to the actuator of the valve to adjust the position of the valve. The actuator may be mechanically coupled to the valve. In this way, electrical signals (e.g., voltage and/or current) received from the controller 106 may be converted into mechanical movement of the valves.

Valves may be binary valves that may be adjusted between open first positions and closed second positions. In other examples, one or more of the valves may be continuously variable vales and may be adjusted to the open first position, closed second position, and any position therebetween. In the closed second position, substantially no fluid may flow through the valves, and an amount of fluid flowing through the valves may increase as the valve deflects towards a more open position, away from the closed second position, where an opening formed by the valve may increase as the valve is adjusted towards a more open position. In yet further examples, the valves may be three-way valves.

Returning to the description of the hot water tank 116, the heater 118 may heat water in the water tank 116 to a threshold or desired temperature. Specifically, the controller 106 may be in electrical communication with the heater 118, and may adjust operation of the heater 118 (e.g., controller 106 may adjust a voltage and/or current supplied to the heater 118) to heat the water in the water tank 116 to the desired temperature. The desired temperature may be a temperature that causes dry ingredients in the pod 112 to dissolve. In some examples, the desired temperature may be approximately 212° F. However, in other examples, the desired temperature may be a range of temperatures between 150° F. and 212° F. In yet further examples, the controller may adjust and/or set the desired hot water temperature based on the pod and/or alcohol type. The temperature of the water in the tank 116 may be estimated based on outputs from a thermocouple or suitable temperature sensor coupled to the tank 116.

The hot water tank 116 may include a fluid level sensor for estimating an amount of water in the tank 116. The controller 106 may regulate an amount of water flowing to tank 116 by adjusting of the valve 120 based on the estimated amount of water in the tank 116. Thus, the controller 106 may regulate water flow into the tank 116 to maintain a desired amount of water in the hot water tank 116.

When the water in the hot water tank reaches the desired temperature and the shot-making process is initiated, the controller may adjust a second valve 122 coupled in a second water line 121 between the hot water tank 116 and the pod 112 towards a more open position. Thus, water from the hot water tank 116 may flow through the second water line 121 in response to opening of the second valve 122. Second water line 121 may fluidically couple the hot water tank 116 and pod 112. Specifically, the second water line 121 may be coupled one a first end to the hot water tank 116, and on an opposite second end to the pod spike 114, for delivering water from the tank 116 to the pod spike 114. A first flow meter 124 may be positioned in the water line 121 for limiting an amount of hot water supplied to the pod 112. The first flow meter 124 may track the amount of water passing through the second water line 121 and into the pod 112, and may cause the valve 122 to close once the required volume of water has been metered to the pod 112. The amount of hot water supplied to the pod 112 may be adjusted (e.g., by the controller 106) based on the pod type. For example, more hot water may be supplied for larger pods 112 containing more gelatin power. The amount of hot water supplied to the tank 116 may be adjusted by manipulating the position of the valve 122, and/or by regulating an amount of time the valve 122 is held open.

The pod spike 114 receives hot water from the tank 116, and directs the hot water into the pod 112. Thus, the gelatin powder included in the pod 112 mixes with the hot water and dissolves. The water and gelatin mixture may be referred to herein as a first liquid gelatin mixture. To increase the commingling of the water and gelatin powder, a mixing motor 126 may be physically coupled to the pod receptacle 107. The pod receptacle 107 may be rotated and/or oscillated by the motor 126. In one example the motor 126 may be a stepper motor. The motor 126 may be turned on for a duration (e.g., by the controller 106) to mix the water and gelatin powder. In some examples, the duration may be a preset value or range of values, and in other examples, the duration may be determined by the controller 106 based on the pod and/or alcohol type. Additionally, in some examples, hot water may be circulated through the pod spike 114 in order to clean the pod spike.

In some examples, the motor 126 may be turned on once the temperature of the water in the water tank 116 reaches the desired temperature. Additionally or alternatively, the motor 126 may be turned on in response to a determination that a pod 112 has been loaded in the pod receptacle 107. In yet further examples, the motor 126 may be turned on once the valve 122 is opened and water from the water tank 116 is flowing into the pod 112. The motor 126 may rotate the pod receptacle 107 according to a pre-determined agitation profile to mix contents of the pod 112 with the heated liquid (e.g. water) received from the hot water tank 116. Mixing may occur for duration until all the fluid and dry ingredients are fully dissolved. In alternate embodiments, the pod may also be configured to receive easily dissolved consumables such as supplements or vitamins. As such the consumables may be liquefied in the pod 112 through the mixing process and mixed with the dry and fluid ingredients in the pod 112.

In some examples, water from the water inlet port 117 may be directly routed to the pod 112 without passing through the hot water tank 116 via a third water line 127. Third water line 127 may be fluidically coupled to the first water line 119 and the pod spike 114 for delivering cooler water from the water inlet port 117 to the pod 112. Thus, the water flowing through third water line 127 may be at a lower temperature than both the water in the water tank 116, and the water flowing from the tank 116 to the pod 112 via the second water line 121. A second flow meter 128 may be positioned within the third water line 127 for limiting an amount of water flowing to the pod spike 114 and pod 112. Flow meter 128 may be the same and/or similar to flow meter 124 described above.

Once the first liquid gelatin mixture is mixed (e.g., the gelatin powder is dissolved in the water), the gelatin mixture may be pumped out of the pod 112 through the pod spike 114, via a first pump 130 towards a mix tank 132 to begin the second mixing phase. The pump 130 may be coupled in a first liquid gelatin mixture line 134. The first liquid gelatin mixture line 134 may be coupled on a first end to the pod spike 114, and on an opposite second end to the mix tank 132. In one example the first pump 130 may be a peristaltic pump. The first liquid gelatin mixture mixes with a secondary liquid in the mix tank 132, where the secondary liquid may comprise one or more of alcohol and/or water or other consumable liquid. Thus a desired amount of the secondary liquid may be mixed with the first liquid gelatin mixture in the mix tank 132. The mix tank 132 may mix the fluids received in the mix tank 132 via a mixing paddle and motor.

Alternatively, however, the pod 112 may also be used as a mix tank, rather than a separate mix tank 132 being included. In such examples where the pod 112 may also be used as the mix tank, the pod 112 may receive the secondary liquid. Thus, the pod 112 may receive water, such as hot water from one or more hot water tanks 116 and alcohol from the alcohol reservoir 108. Such examples where the pod 112 may also be used as the mix tank may be advantageous, as the mix tank, a passage from the pod to the mix tank, and a pump to pump the liquid from the pod to the mix tank may be eliminated, thus making the device more compact.

Alcohol from the alcohol reservoir 108 may be pumped to the mix tank 132 via an alcohol line 135. Specifically, the alcohol line 135 may be coupled to the alcohol reservoir 108 on a first end and to the mix tank 132 on an opposite second end for flowing alcohol from the reservoir 108 to the mix tank 132. The alcohol line 135 includes a valve 136 a second alcohol pump 140. The valve 136 may be positioned proximate to a bottom face of the alcohol reservoir 108, for example, the valve 136 may be coupled to the bottom face of the alcohol reservoir 108. Controller 106 may adjust the position of the valve 136 by adjusting a current and/or voltage supplied to an actuator of the valve 136. Alcohol may be supplied to the mix tank 132 by opening the valve 136 and powering on the pump 140. Second alcohol pump 140 may in one example be a peristaltic pump. Pump 140, therefore pumps alcohol from the alcohol reservoir 108 to the mix tank 132, to mix with the first liquid gelatin mixture.

Further, alcohol pump 140 may be used to track alcohol consumption. Thus, the alcohol pump 140 may be used to estimate an amount of alcohol in the alcohol reservoir 108, based on an amount of alcohol exiting the alcohol reservoir 108 via the alcohol pump 140. In this way, the controller 106 may monitor an amount of alcohol in the alcohol reservoir 108, based on alcohol flow rates through the alcohol pump 140. When the alcohol volume in the alcohol reservoir 108 decreases below a threshold, the controller 106 may generate a notification to a user to refill the alcohol reservoir 108 and may present the notification to the user on the user interface 104. In this way, a user may be alerted when alcohol levels in the alcohol reservoir 108 are low, and additional alcohol needs to be added to the alcohol reservoir 108. However, in other examples, alcohol level monitoring may not be carried out.

Alcohol from the alcohol reservoir 108 may be delivered to the mix tank 132 before, during and/or after the first liquid gelatin mixture is delivered to the mix tank 132 via line 134. The timing and amount of alcohol delivered to the mix tank 132 may be adjusted by one or more of manipulating the position of the valve 136, adjusting an amount of time the valve 136 is held open, adjusting a speed of the pump 140, and adjusting an amount of time the pump 140 is turned on. Thus, the valve 136 is adjusted and the pump 140 is turned on to deliver a desired amount of alcohol to the mix tank 132.

In some examples, the desired amount of alcohol may be a pre-set amount, or may be in a pre-set range of values. In other examples, the desired amount of alcohol may be adjusted based on a number of shots to be made. In yet further examples, the desired amount of alcohol may be determined and/or adjusted based on the type of pod and/or type of alcohol. The desired amount of alcohol may further be adjusted based on an amount of powder and/or dry ingredient in the pod 112 as determined based on the pod product information, and/or a size of the pod 112. In still further examples, the desired amount of alcohol to be supplied to the mix tank 132 may be adjusted based on a desired alcohol content of the shots. For example, a user may input and/or select a desired alcohol concentration for the shots via the user interface 104. The controller 106 may determine a desired amount of alcohol required to achieve the desired alcohol concentration based on the alcohol concentration of the alcohol in the alcohol reservoir 108, and an estimated volume of the first liquid gelatin mixture. Thus, the alcohol concentration of the shots may be user-adjustable.

The mix tank 132, therefore receives the first liquid gelatin mixture from the pod 112, and in some examples may additionally receive alcohol from the alcohol reservoir 108. As such, the first liquid gelatin mixture and the alcohol mix in the mix tank 132 to form a second liquid gelatin mixture. The mix tank 132 includes a mixing element 142 to increase commingling of the first liquid gelatin mixture and the alcohol. In some example the mixing element 142 may be a passive mechanical device that mixes the alcohol and the first liquid gelatin mixture as they enter the mix tank 132. However, in other examples, the mixing element 142 may an actively controlled device, and may be coupled to an actuator 143. The actuator 143 may be controlled based on signals received from the controller 106, for rotating and/or adjusting the mixing element 142. The actuator 143 may powered on until the alcohol and first liquid gelatin mixture are mixed and form a second liquid gelatin mixture. Actuator 143 may also be referred to herein as motor 143.

In other examples, cold water from the water inlet port 117 may be mixed with the first liquid gelatin mixture in the mix tank 132. Thus, colder water from the water inlet port 117 may be directly routed to the mix tank 132 without passing through the hot water tank 116. As such, the mix tank 132 may be fluidically coupled to the water inlet port 117 via a water line such as line 127. Thus, water flowing into the mix tank 132 from the inlet port 117 may be at a lower temperature than first liquid gelatin mixture. Additionally or alternatively, hot water from the hot water tank 116 may be routed to the mix tank 132 to mix with the first liquid gelatin mixture. Thus, the mix tank 132 may be fluidically coupled to the hot water tank 116 via a water line 133. A valve 167 positioned in the water line 133 may regulate an amount of water flowing from the hot water tank 116 to the mix tank 132. The water line 133 may additionally include a flow meter 169. Flow meter 169 may be the same or similar to flow meter 124 described above.

Water from one or more of the hot water tank 116 and/or inlet port 117 may be delivered to the mix tank 132 before, during and/or after the first liquid gelatin mixture is delivered to the mix tank 132 via line 134. The timing and amount of water delivered to the mix tank 132 may be adjusted to deliver a desired amount of water. Further, the relative amount of water delivered to the mix tank 132 from the hot water tank 116 and inlet port 117 may be adjusted to achieve a desired temperature of water.

The desired amount of water may be a pre-set amount, or may be in a pre-set range of values. In other examples, the desired amount of water to be added to the mix tank 132 may be adjusted based on a number of shots to be made. In yet further examples, the desired amount of water may be determined and/or adjusted based on the type of pod and/or type of alcohol. The desired amount of water may further be adjusted based on an amount of powder and/or dry ingredient in the pod 112 as determined based on the pod product information, and/or a size of the pod 112. In still further examples, the desired amount of water to be supplied to the mix tank 132 may be adjusted based on a desired alcohol content of the shots.

Further, the desired amount of water may be adjusted based on a volume of alcohol delivered to the mix tank 132 from the alcohol reservoir 108. In some examples, substantially no alcohol may be delivered from the alcohol reservoir 108 to the mix tank 132. Thus, in some examples, a user may desire to make non-alcoholic shots, and as such, alcohol may not be added to the first liquid gelatin mixture. Thus, in some examples, only water may be added to the first liquid gelatin mixture in the mix tank 132 to form the second liquid gelatin mixture. Thus, in some examples, the second liquid gelatin mixture may not include alcohol.

The amount of water provided to the mix tank 132 may therefore be adjusted based on an amount of alcohol provided to the mix tank 132. Together, the alcohol volume and water volume provided to the mix tank 132 may be adjusted to achieve a desired liquid volume. Thus, a desired amount of secondary liquid, which may be a combination of one or more of alcohol and water, is added to the first liquid mixture in the mix tank 132. The desired amount of secondary liquid to be added to the first liquid mixture in the mix tank 132 to form the second liquid gelatin mixture may be approximately 25 fluid ounces. However, the desired amount may be greater or less than 25 fluid ounces depending on a desired number of shots to be made, size of the shots, etc. An amount of water to be added to the mix tank 132 may depend on the amount of alcohol added to the mix tank 132, and thus may vary from 10-25 fluid ounces. However, in other examples less than 10 fluid ounces of water may be added to the mix tank 132. In some examples, substantially no water may be added to the mix tank 132. In yet further examples, more than 25 fluid ounces of water may be added to the mix tank 132. Additionally or alternatively, the mix tank 132 may include an embedded manifold cover to permit hot and cold water to be sprayed into the mix tank 132 for cleaning and foam reduction.

Thus, during the second mixing phase, alcohol from the alcohol reservoir 108 and/or water from one or more of the hot water tank 116 and water inlet port 117 may be mixed with the first liquid gelatin mixture in the mix tank 132. In some examples, the first liquid gelatin mixture and the alcohol may be held in the mix tank 132 for duration. After the duration, and/or once the first liquid gelatin mixture and the alcohol are mixed, the second liquid gelatin mixture is pumped out of the mix tank 132 towards a chilling block 144 of a first chilling module 147 to begin the first chilling phase. The chilling block 144 may be used as both a thermal battery and a heat exchanger. However, in at least one example, the chilling block 144 may be biased to operate as a heat exchanger. In examples where the device 100 includes both the chilling block 144 and a second chilling module 175, the device 100 may have both first chilling and second chilling capabilities. Thus, in examples where the device 100 includes both the chilling block 144 and the second chilling module 175, the first chilling phase may be a first chilling phase of two chilling phases. However, in at least on example, the device 100 may have a thermal capacity that is high enough or a rate of heat exchange that is fast enough to only need the first chilling phase. Thus, in such cases, a device 100 may only have one chilling phase that is carried out by the chilling block 144, and the device may not use a second chilling phase performed by the second chilling module 175. Operating the device 100 in such a manner may be advantageous for reducing an amount of energy used, for example. Further, in examples where the chilling block 144 has a high enough thermal capacity or where a rate of heat exchange is fast enough not to need a second chilling phase, the second chilling module 175 may not be included in the device 100. Examples where the device 100 may not include the second chilling module 175 may be advantageous for making the device 100 more compact and more energy efficient, for example. Chilling via one or both a first chilling phase and a second chilling phase may expedite a process for producing the gelatin-based products.

In other examples, the first gelatin mixture and/or alcohol may continually be circulated between the mix tank 132 and the chilling block 144. Put another way, mixture contained in the mix tank 132 may be removed from the mix tank 132, conveyed through the first chilling module 147, and recirculated back into the mix tank 132. Thus, the first chilling phase may comprise flowing the second liquid gelatin mixture through the chilling block 144 of the first chilling module 147 to cool the gelatin mixture. The second liquid gelatin mixture may be pumped through a second liquid gelatin mixture line 145 by a third pump 146 coupled in the second liquid gelatin mixture line 145. The second liquid gelatin mixture line 145 may be coupled on a first end to the mix tank 132 and on an opposite second end to the chilling block 144 for flowing the second liquid gelatin mixture there-between. Pump 146 may be a peristaltic pump. Other types of pumps may be possible, however. For example pump 146 may be an alternative current (AC) solenoid-based metering pump.

The chilling block 144 may be included as part of the first chilling module 147 that cools (e.g., remove heat from) the second liquid gelatin mixture via one or more first heat exchangers 149. The first chilling module 147 thus comprises the chilling block 144 and the one or more first heat exchangers 149. Further, in some examples, the first chilling module 147 may additionally include one or more first thermoelectric device 148. For example, the first thermoelectric device 148 may comprise Peltier chips. The thermoelectric device 148 may also be referred to herein as chilling device 148 and/or cooling device 148. The thermoelectric device 148 are thermoelectric converter elements that create a temperature differential between their electrodes when an electric current is supplied thereto. The thermoelectric device 148 may receive electric current from controller 106. Thus, a "hot side" and "cold side" may be developed within the devices 148 in response to the supplied electric current, with the "hot side" being at a higher temperature than the "cold side." The thermoelectric device 148 may be orientated and supplied with current such that their "cold sides" all face and/or physically contact a conduit or surface containing the second liquid gelatin mixture, and the "hot sides" face and/or physically contact one or more of the heat exchangers 149. Thus, the "cold sides" may be positioned more proximate to a conduit or reservoir containing the second liquid gelatin mixture and the "hot sides" may be positioned more proximate to one or more of the heat exchangers 149. As such, the thermoelectric device 148 may be positioned between one or more of the heat exchangers 149 and a conduit or reservoir containing the second liquid gelatin mixture.

As shown in the example of FIG. 1, the heat exchangers 149 may be coupled to walls of the chilling block 144, on an exterior of the chilling block 144. Specifically, each of the heat exchangers 149 may be coupled to a different wall of the chilling block 144. Thus, in some examples, the chilling module 147 may include exactly three heat exchangers 149. However, in other examples, more or less than three heat exchangers 149 may be included in the chilling module 147.

In examples where the thermoelectric devices 148 are included in the chilling module 147, the devices 148 may be included between the chilling block 144 and the heat exchangers 149. The thermoelectric device 148 may be coupled to walls of the chilling block 144 for removing heat from the second liquid gelatin mixture within the chilling block 144 via conduction. Thus, the thermoelectric device 148 may be in face-sharing and/or physical contact with the exterior surfaces of the walls of the chilling block 144. Specifically, the "cold sides" of the thermoelectric device 148 be facing and/or in physical contact with the walls of the chilling block 144. Further, the "hot sides" may face away from the chilling block 144 and towards one or more liquid heat exchangers 149. Specifically, the "hot sides" of the thermoelectric device 148 may be in physical contact with one or more of the heat exchangers 149. The "cold sides" of the thermoelectric device 148 draw heat from the chilling block 144, and thus cool the second liquid gelatin mixture contained within the chilling block 144.

Further, in some examples, each of the heat exchangers 149 may be coupled directly to a thermoelectric device 148, and may integrally form a heat exchange assembly 161. The heat exchange assembly 161 may therefore comprise one of the heat exchangers 149 and a thermoelectric device 148. In some examples, the heat exchange assembly 161 may be constructed from a thermally conductive material such as aluminum.

However, in other examples, it should be appreciated that one or more of the heat exchangers 149 and/or the thermoelectric device 148 may be included within the chilling block 144. Specifically, the chilling block 144 may include one or more conduits for carrying the second liquid gelatin mixture. The one or more conduits may include a plurality of turns to increase the length of the fluid path through the chilling block 144. As such, the surface area of the conduits may be increased, and the amount of heat transfer (e.g., cooling) between the second liquid gelatin mixture and the heat exchangers 149 may be increased. The heat exchangers 149 may be included on one or more sides of the conduits to increase heat transfer there-between. Further, the thermoelectric device 148 may be positioned between the heat exchangers 149 and the conduits carrying the liquid gelatin mixture.

Coolant from a coolant tank 150 may circulate through the liquid heat exchangers 149 and absorb heat from the "hot sides" of the thermoelectric device 148. In other examples, where the thermoelectric devices 148 are not included in the chilling module 147, the heat exchangers 149 absorb heat directly from the second liquid gelatin mixture in the chilling block 144. In this way, by circulating coolant through the heat exchangers 149, the temperature of the thermoelectric device 148 may be kept below the temperature of the second liquid gelatin mixture in the chilling block 144. Further, the second liquid gelatin mixture may be cooled to a lower temperature than would be obtained if the heat exchangers 149 were not included. Coolant may be supplied to the heat exchangers 149 via one or more first coolant supply lines 151. As the coolant flows through the heat exchangers 149 it may be warmed. Thus, after flowing through the heat exchangers 149, the coolant may be directed through a coolant return line 153 to a radiator 152 to be cooled.

The radiator 152 may be an air cooled radiator, where heat from the coolant may be transferred to ambient air. Specifically, one or more radiator fans 154 may be included to blow air through the radiator 152, increasing heat transfer from the coolant in the radiator to the ambient air flowing therethrough. Thus, the temperature of the coolant may be reduced by the air blown from the radiator fans 154. Radiator fans 154 may be powered via respective actuators 155. The actuators 155 may be electric motors and may receive electrical power from the controller 106. The controller 106 may therefore adjust an amount of cooling of the coolant by adjusting operation of the fans 154 via the actuators 155. Thus, the actuators 155 may be physically coupled to the radiator fans 154 for rotating the radiator fans based on electrical signals received from the controller 106.

Coolant may be pumped through the coolant lines 151 and 153 via a pump 156. The pump 156 may be an electric pump. In some examples, the pump may be a centrifugal pump. Although the pump 156 is shown in the example of FIG. 1 to be coupled between the radiator 152 and the coolant tank 150, it should be appreciated that in other examples, the pump 156 may be positioned in an alternate position in either of the coolant lines 151 and 153. For example, the pump 156 may be positioned in the coolant line 151 between the coolant tank 150 and the heat exchangers 149. In other examples, the pump 156 may be positioned between the heat exchangers 149 and the radiator 152. After flowing through the radiator 152 and being cooled, coolant may return to the coolant tank 150.

It should be appreciated that although a thermoelectric cooling system is shown in the example of FIG. 1, other refrigeration or cooling systems may be used to cool the second liquid gelatin mixture, in other embodiments. For example, a refrigeration system including a compressor and a condenser may be utilized to cool coolant, and circulate the cold coolant through the heat exchangers 149 to absorb heat directly from the second liquid gelatin mixture without the use of the thermoelectric device 148. Thus, vapor-absorption and/or vapor compression refrigeration cycles may be utilized to cool the second liquid gelatin mixture. Further, the heat exchangers 149 may be configured as one or more of liquid to liquid, liquid to air, air to liquid, and air to air heat exchangers. Thus, the coolant flowing through the heat exchangers 149 may be in the form of liquid or vapor. The heat exchangers 149 may further comprise one or more of a shell and tube heat exchanger, plate heat exchanger, regenerative heat exchanger, adiabatic wheel heat exchanger, etc.

From the chilling block 144, the second liquid gelatin mixture may return to the mix tank 132 after having been cooled by the chilling block 144 of the chilling module 147. In some examples, the second liquid gelatin mixture may be continually pumped between the mix tank 132 and the chilling block 144 by the pump 146 for a duration or until the second liquid gelatin mixture has reached a first threshold temperature. Thus, the chilling module 147 may cool the second liquid gelatin mixture to a first threshold temperature. Further, in at least one example, the chilling block 144 may only be connected to the mix tank 132.

In other examples, the second liquid gelatin mixture may be pumped to chilling block 144, and may remain in the chilling block 144 for a duration or until it has reached the threshold temperature. Thus, the pump 146 may be turned on to pump the second liquid gelatin mixture from the mix tank 132 to the chilling block 144. Then the pump 146 may be turned off once the second liquid gelatin mixture is contained within the chilling block 144. Then after the duration and/or when the second liquid gelatin mixture has reached the first threshold temperature, the second liquid gelatin mixture may be pumped back to the mix tank 132 from the chilling block 144. Thus, the pump 146 may be turned back on to pump the second liquid gelatin mixture from the chilling block 144 back to the mix tank 132.

The first threshold temperature that the second liquid gelatin mixture may be cooled to by the chilling module 147 to may be approximately 40° F. However, in other examples, the first threshold temperature may be a range of temperatures between 30° F. and 50° F. The mix tank 132 and/or chilling block 144 may comprise a temperature sensor for estimating the temperature of the second liquid gelatin mixture included therein. Thus, the controller 106 may control operation of the pump 146 to continue pumping coolant between the mix tank 132 and chilling block 144 to cool the second liquid gelatin mixture based on signals received from the temperature sensor, until the second liquid gelatin mixture reaches the threshold temperature.

The second liquid gelatin mixture may be pumped back to the mix tank 132 via the pump 146. In some examples, the second liquid gelatin mixture may return to the mix tank 132 via a third gelatin mixture line 157. The third gelatin mixture line 157 may be coupled on a first end to the chilling block 144 and on an opposite second end to the mix tank 132. Further, the second liquid gelatin mixture may remain in the mix tank 132 until it is desired to dispense the mixture. In some examples, the first chilling phase may stop, and thus the second liquid gelatin mixture may stop being pumped between the mix tank 132 and chilling block 144, after duration, and after the duration the mixture may remain in the mix tank 132 until it is desired to dispense the mixture. However, in other examples, the first chilling phase may terminate and the second liquid gelatin mixture may stop being pumped between the mix tank 132 and chilling block 144 once the second liquid gelatin mixture has cooled to the first threshold temperature, and may remain in the mix tank 132 after it has reached the first threshold temperature until it is desired to dispense the mixture. In yet further examples, the second liquid gelatin mixture may continue to be pumped between the mix tank 132 and chilling block 144 until it is desired to dispense the mixture. For example it may be desired to dispense the mixture after the mixture has circulated through the chilling block 144 for a duration. Thus, the second liquid gelatin mixture may continue to be pumped between the mix tank 132 and chilling block 144 for a duration, and then once the duration expires, it may be desired to dispense the mixture, and as such, the pump 146 may continue to operate until all of the gelatin mixture has been dispensed from the mix tank 132 and chilling block 144. In another example it may be desired to dispense the mixture after the mixture has reached the first threshold temperature. Thus, the second liquid gelatin mixture may continue to be pumped between the mix tank 132 and chilling block 144 until the mixture reaches the first threshold temperature, and then once the mixture is cooled to the first threshold temperature, it may be desired to dispense the mixture, and as such, the pump 146 may continue to operate until all of the gelatin mixture has been dispensed from the mix tank 132 and chilling block 144. Thus, when the first chilling phase is complete, the dispensing of the shots may begin.

To dispense the second liquid gelatin mixture, a pump 159 may be turned on. The pump 159 may be a peristaltic pump. Controller 106 may turn on the pump 159 when it is desired to dispense the mixture, such as when the second liquid gelatin mixture has reached the threshold temperature, and/or after duration of pumping the second liquid gelatin mixture through the cooling module. Pump 159 may be positioned in a dispensing line 158 between the mix tank 132 and one or more dispensing heads 160. The dispensing line 158 may be coupled on a first end to the mix tank 132 and on an opposite second end to one or more dispensing heads 160. In examples where the mix tank 132 may not be included, and the all the mixing may occur in the pod 112, the dispensing line 158 may instead be coupled on a first end to the pod 112 and on an opposite second end to one or more dispensing heads 160.

In at least one example, the dispensing line 158 may include a dispensing strainer 101. Dispensing strainer 101 may be positioned upstream of the dispensing manifold 180, in the dispensing line 158 that connects the mix tank 132 to the dispensing manifold 180. The dispensing strainer 101 may be prevent gummies from forming in the device that may clog the dispensing manifold 180. Specifically, the dispensing strainer 101 may filter the second liquid gelatin mixture that is being conveyed from the mix tank 132 and the dispensing manifold 180. Such inclusion of a dispensing strainer 101 may be especially advantageous during operation of the device 100 in a ready-to-eat mode, where the gelatin-based product may be more prone to developing clumping as the gelatin-based product may be cooled near a setting temperature prior to being conveyed to the dispense manifold during the quick prep operation mode. Further, the dispensing strainer 101 may facilitate cleaning of the device 100, as the dispensing strainer 101 may catch the gelatin-based product that is beginning to clump and may reduce an amount of build-up on components conveying this gelatin-based product.

In FIG. 1, the dispensing strainer 101 is shown positioned in dispensing line 158 between the mix tank 132 and the pump 159. Such positioning may be advantageous for preventing both the pump 159 and the dispensing manifold 180 from clogging, as gummies that may be formed in the in gelatin-based product may be filtered out by the dispensing strainer 101 upstream of both the pump 159 and the dispensing manifold.

However, in other embodiments, the dispensing strainer 101 may be positioned downstream of the pump 159 in the dispensing line 158. Such positioning of the dispensing strainer 101 to be between the pump 159 and the dispensing manifold 180 may be more effective at preventing clogging of the dispensing manifold 180 than positioning the dispensing strainer 101 further upstream of the dispense manifold 180, as the gelatin-based product may be conveyed a shorter distance between the dispensing strainer 101 and the dispensing manifold 180, thus reducing a likelihood of gummies from forming in the gelatin-based product as it is conveyed between the dispensing strainer 101 and the dispensing manifold 180.

The dispensing strainer may advantageously stop clogging of the dispensing manifold tips, also referred to herein as nozzles or heads. Clogging causes unevenness in cup fill and prevents proper cleaning. The dispensing strainer may be placed anywhere between the dispense pump and the dispensing manifold. In at least one example, the dispensing strainer may be positioned immediately adjacent to the dispensing manifold, which may help to better prevent the formation of congealed gelatin pieces (also referred to as gummies) from passing into the dispensing manifold tips than other positions of the dispensing strainer. If the dispensing strainer is not present, small pieces of congealed gelatin (gummies) may pass into the dispensing manifold tips and block or restrict the tips during the dispense process. This issue may be particularly problematic in the "ready-to-eat" sequence since the gelatin is beginning to set as it is being dispensed into the cups. The dispensing strainer as developed has a visible port and a 90 degree flow turn to accommodate the packaging space within the device.

In some examples, the dispensing heads 160 of the dispensing manifold 180 may be fluidically coupled to the mix tank 132 via a common fluid connection. However, in other examples, each of the dispensing heads 160 may include discrete fluid connections to the line 158. In such examples, an amount of fluid flowing to each of the dispensing heads 160 may be regulated via one or more valves (not shown in FIG. 1). Thus, the pump 159, pumps the second liquid gelatin mixture from the mix tank 132, through the dispensing line 158 to each of the dispensing heads 160.

The dispensing manifold may be fixed or moving with multiple dispensing heads 160. The dispensing heads 160 may be included in a dispensing manifold 180 positioned vertically above a plurality of cups 164. The dispensing manifold 180 may be operated to evenly distribute the liquid it receives across each dispense nozzle (dispensing heads 160) for distribution of the liquid into the cups 164. Additionally, in at least one example, the dispensing manifold 180 may be detachable in order to simplify cleaning of the dispensing manifold 180. For example, the dispensing manifold 180 may be detachable through a quick disconnect mechanism. In at least one example, the dispensing manifold 180 may be removable by opening the drawer 172, making the dispensing manifold 180 easily accessible for removal. The dispensing manifold 180 is fluidically coupled to the mix tank 132. The dispensing manifold 180 is indirectly fluidically coupled to the chilling block 144. Thus, the dispensing heads 160 may be configured to dispense the second liquid gelatin mixture into the cups 164. Cups 164 may also be referred to herein as fluid vessels 164 or shots 164. In some examples, the dispensing heads 160 may be slots included within a moveable sheet 162 of the dispensing manifold 180, and as such, the dispensing heads 160 may also be referred to herein as dispensing slots 160.

In some examples, the dispensing heads 160 may remain in a relatively fixed position while the mixture is being dispensed into the cups 164. Thus, the dispensing heads 160 may only move when switching between the cleaning mode and the dispensing mode. In such examples, the number of cups 164 may be approximately the same as the number of dispensing heads 160. Thus, the device may include approximately 20 cups. However, in other examples, more or fewer than 20 cups 164 may be included in the device 100. Further, the dispensing manifold 180 may include holes on a bottom wall for dispensing the gelatin mixture into the cups 164. Thus, the gelatin mixture may drop into the cups 164 from the dispensing heads 160 via the holes in the dispensing manifold 180.

However, in other examples, the dispensing heads 160 may be translated via a motor 166 to which the dispensing heads 160 are physically coupled. The motor 166 may translate the dispensing heads 160 horizontally. The controller 106 may adjust the position of the dispensing heads 160 via actuation of the motor 166. As such, the controller 106 may translate the dispensing heads 160 to a desired position. The dispensing heads 160 may for example extend along a length of the dispensing manifold 180 along the lateral axis 198.

The cups 164 may be arranged in columns extending along a width of a tray 168 in which the cups 164 are held, in a direction of the lateral axis 198, and rows extending along the length of the tray 168, in a direction of the horizontal axis 196 (e.g., in an array). The tray 168 may serve as a cup cooling block, as the tray 168 in which the cups 164 are held may be in contact or close proximity with the chiller plate module 175. Thus, each of the dispensing heads 160 may be aligned over each cup in a row or column of cups in the tray 168. After filling a row or column, the dispensing heads 160 may stop dispensing the gelatin mixture, and may be moved horizontally by the motor 166, until they are vertically positioned over the next row or column of cups 164. Once over an unfilled row or column or cups 164, the dispensing heads 160 may resume dispensing the gelatin mixture. The motor 166 may continue to translate the dispensing heads 160 in this manner until all of the cups 164 are filled with the gelatin mixture. In some examples, the amount of gelatin dispensed into the cups 164 may be varied and may not be uniform. The amount of gelatin mixture dispensed by the dispensing heads 160 may be controlled by the pump 159 based on electrical power provided to the pump 159 by the controller 106. In at least one example, tray 168 may be shaped to be stackable with another identical tray. Such shaping of tray 168 may be especially advantageous if producing a high volume of gelatin-based shots, as these trays 168 may be easily stacked and stored in an external chilling device (e.g., an external refrigerator).

It should also be appreciated that in some examples, pump 146 and pump 159 may pump the second liquid gelatin mixture between the mix tank 132 and the chilling block 144. A valve, such as a three-way valve, may then be adjusted to direct the gelatin mixture towards the dispensing heads 160. Thus, the valve may be adjusted to flow fluid from the mix tank 132 or chilling block 144 to the dispensing heads 160 when it is desired to dispense the mixture. Thus, both of the pumps 146 and 159 may provide a motive force to pump the second liquid gelatin mixture between the mix tank 132 and the chilling block 144 to cool the mixture, and between the mix tank 132 and the dispensing heads 160 when dispensing the mixture. Thus, in some examples, both of the pumps 146 and 159 may remain on during the first chilling of the mixture by flowing the mixture between the mix tank 132 and chilling block 144, and the dispensing of the mixture.

Tray 168 holds the cups 164 and restricts relative movement of the cups 164. In some examples, the cups 164 may be removably coupled to the tray 168. However, in other examples, the cups 164 may be permanently secured to the tray 168. The tray 168 may be held in a retainer 170. Together, the tray 168, cups 164, and retainer 170 may comprise a drawer 172. The drawer 172 including the tray 168, retainer, 170, and cups 164 may be removably coupled to the device 100. Specifically, the drawer 172 may be accessed via a door, and may slide in and out of the housing 102.

Retainer 170 may be coupled to a drawer mount 174 that may be built into the housing 102. Further, retainer 170 may be slidable into and out of the device 100 when a door (not shown in FIG. 1) is opened. Specifically, retainer 170 may slide along a groove in the drawer mount 174. The door may be a door (e.g., door 214 shown in FIG. 2 positioned in the front face of the housing 102, in front of the tray 168, as shown in FIG. 2. For example, a user may open the door and then slide the drawer 172 including the retainer 170 and tray 168, out from the inside of the device 100, thereby revealing the tray 168 to the user. The user may then load cups 164 into the tray 168, and load the tray 168 on the retainer 170. The retainer 170 may include a number of slots for receiving the cups 164. Thus, the slots may be sized similarly to the cups such that one cup fits within each slot. After loading the required number of cups, the user may move the drawer 172 back inside of the device 100 and underneath the dispensing heads 160 of the dispensing manifold 180, and close the door. The user may also load the cups 164 with fruit, vitamins, supplements, or other consumable products to be mixed with the second liquid gelatin mixture from the dispensing line 158.

As described above, the cups 164 may be sized to fit within slots of the tray 168. In one example, the cups and corresponding tray slots may have an oval cross-section. The diameters of the cross-sections of the cups 164 may increase towards an opening of the cups 164. The diameter of the cross-section of the cups 164 proximate the opening of the cups 164 may be slightly larger than the diameters of the slots in the tray 168. Thus, the cups 164 may extend partially through the slots in the tray 168, such that the cups 164 may still be supported by the tray 168 at their tops. The recesses in the retainer 170 may be sized accordingly to receive the portion of the cups 164 extending through the tray 168. In alternate embodiments, the cups and corresponding slots may have a different cross-section (e.g., circular or square) with a different size. For example, the cross-section of the cups may be circular.

Once the second liquid gelatin mixture has been dispensed into the cups 164, a temperature of the mixture may be measured via a temperature sensor such as temperature sensor 173. The temperature of the mixture as estimated based on outputs from the temperature sensor 173 may be used by the controller 106 to set a countdown timer for a second shot chilling phase, also referred to herein as shot hardening phase. In another example, the countdown timer for the second shot chilling phase may have a pre-set duration that is not based on temperature, and as such temperature sensor 173 may not be included.

During the second chilling phase, the second liquid gelatin mixture in the cups 164 may be cooled via a second chilling module 175, also referred to as the chiller plate module 175, to harden (e.g., solidify) the mixture. The second chilling module 175 may be configured using Peltier thermoelectric chips, a heat exchanger, and a chiller plate, for example. Further, the second chilling module 175 may be positioned below the drawer 172 to cool a gelatin-based mixture that is dispensed into the fluid vessels 164. As described above, the second chilling phase may run for a duration and/or until the mixture in the cups 164 has reached a second threshold temperature, the second threshold temperature being less than the first threshold temperature. The second threshold temperature may represent a temperature at which the shots are hardened. Thus, the second chilling phase may end when the shots are hardened and ready for consumption. Once the second chilling phase ends, the shot-making phase may be complete.

Though the device 100 is described as including both the second chilling module 175 and the chilling block 144, in at least one embodiment device 100 may only include the second chilling module 175 for chilling the gelatin-based mixture. Thus, in such an embodiment, device 100 may only include a chiller plate module 175. Further, in embodiments in which device 100 may only include the chiller plate module 175 (i.e., second chilling module 175), there may only be one chilling phase which occurs via the chiller plate module 175, to cool the gelatin-based product has been dispensed into the at least one cup.

Use of a chiller plate module, whether it be in combination with a chiller block 144 as described above or whether the chiller plate module is the only cooling module used, may be advantageous for preventing clogging in the device 100. In particular, gelatin-based products may be more susceptible to forming clumps (gummies) at lower temperatures. Thus, dispensing a gelatin-based product at low temperature may put the dispensing manifold 180 and heads 160 at risk for clogging. However, by including a chiller plate module 175 as described above, where the chiller plate module 175 is positioned below the drawer 172 containing the fluid vessels 164 that receive the gelatin-based mixture from the dispensing device 180, the gelatin-based mixture may be dispensed into the fluid vessels 164 at a temperature high enough to reduce the risk of gummies, and then the gelatin-based mixture may be cooled. Thus, the advantage of quickly being able to produce set gelatin-based products may be achieved while reducing a risk of clogging in the device 100. Further, dispensing the gelatin-based mixture at a lower temperature may inhibit a gelling speed of the gelatin mix in some examples. Thus, via the chiller plate module 175, the gelatin-based mixture may be dispensed at relatively higher temperatures into the fluid vessels 164, and then chilled via the chiller plate module 175, enabling higher speed setting times for the gelatin-based mixture.

As shown in the example of FIG. 1 and as briefly mentioned above, the chilling module 175 may be positioned below the drawer 172. Specifically, the chilling module 175 may be physically coupled to a bottom surface of the retainer 170, in some examples. However, in other examples, the chilling module 175 may be physically coupled to a stationary surface below the drawer 172 that is not coupled to the drawer 172. Thus, the chilling module 175 may remain stationary when the drawer 172 slides into and out of the device housing 102. The second chilling module 175 may the same and/or similar to the first chilling module 149 described above. As such, the second chilling module 175 may comprise one or more heat exchangers 177, which may be the same or similar to heat exchangers 149 described above. Further, the second chilling module 175 may comprise one or more thermoelectric devices 176 which may be the same or similar to thermoelectric device 148 described above.

The "cold side" of the thermoelectric devices 176 may be positioned such that it faces and/or physically contact the bottom surface of the drawer 172. As such, the "warm side" may be positioned such that it faces away from the bottom surface of the drawer 172, and towards the heat exchangers 177. Thus, the thermoelectric devices 176 may be positioned between the drawer 172 and the heat exchangers 177.

The heat exchangers 177 of the second chilling module 174 may receive coolant from the coolant tank 150 via a coolant inlet line 178. After flowing through the one or more heat exchangers 177, coolant may be routed to the radiator 152 via a coolant outlet line 179. In some examples, pump 156 may pump coolant through the heat exchangers of the first chilling module 147 and the second chilling module 175. Thus, the pump 156 may circulate coolant between the coolant tank 150, radiator 152, and both the first and second chilling modules 149 and 175. However, in other examples, a second coolant pump may be included to pump coolant through the coolant lines 178 and 179, and the second chilling module 175. Thus, in some examples, each of the chilling modules 147 and 175 may include their own pump for circulating coolant between the chilling modules and the coolant tank 150 and radiator 152.

In this way, the second chilling module 175 may be used to accelerate the speed of gelling (e.g., setting) the gelatin-based shots. In one example, the shots may be gelled (e.g., cured and solidified) within 10 minutes. In other examples, the chilling module 175 may gel the shots in a time less than or greater than 10 minutes. Further, since the chilling module 175 may be a water bath chiller, the fluid dispensed within the cups 164 may remain above a freezing point temperature, thereby preventing freezing of the shots. In another embodiment, the chilling module 175 may not be included in the device 100. For example, a remote chiller module, similar to the chilling module 175 may be located exterior to the device 100 and not within the device 100. Further, in another example, neither the chilling block 144 nor the chilling module 175 may be included in the device 100, and production of the gelatin-based products via the device 100 may rely entirely upon a remote chiller, such as an external refrigerator, for example. Such use of a remote chiller module may be utilized in a quick prep mode, for example.

Once the shots are hardened and ready for consumption, the shot-making process ends. The user interface 104 may include a progress bar indicating the time remaining in the chilling and/or shot-making process. The user interface 104 may also include a light or another type of indicator that indicates when the shots are complete and ready for consumption or removal from the drawer 172 for further cooling in a remote chiller module. Thus, the user may be notified when the shot-making process is completed, and the shots are ready for consumption. A user may remove the shots 164 from the device housing 102 by sliding out the drawer 172.

In some examples, the device 100 may automatically run in the cleaning mode after the shot-making mode ends. However, in other examples, the cleaning mode may be initiated by the user via selections presented on the user interface 104. During the cleaning mode, water or another cleaning fluid may be purged through one or more of the lines 134, 145, 157, and 159, through which the first and second liquid gelatin mixtures flowed through during the shot-making mode. Further, the water or cleaning fluid may be routed through one or more of the pod spike 114, the pod receptacle 107, mix tank 132, chilling block 144, and dispensing heads 160. By running water through the various lines, reservoirs, and components of the device 100 through which the liquid gelatin mixtures flowed during the shot-making mode, residual gelatin mixture may be removed from the device 100. Thus, an amount of gelatin mixture remaining in the lines and components of the device 100 between separate shot-making modes may be reduced by flowing water through the lines and components of the device 100.

Thus, during the cleaning mode, fluid flow through the device 100 may be similar to that during the shot-making mode. For example, water from one or more of the hot water tank 116 and/or inlet port 117 may be directed through the line 121 and into the pod 112 via the pod spike 114. Further, pump 130 may be turned on, and fluid from the pod 112 may be routed to the mix tank 132. Pump 146 may be turned on, and fluid in the mix tank 132 may be circulated between the mix tank 132 and the chilling block 144. Further, pump 159 may be turned on, and fluid from one or more of the mix tank 132 and chilling block 144 may be routed towards the dispensing heads 160.

However, during the cleaning mode, a motor 182 may adjust the position of the dispensing heads 160 to move them from the dispensing first position to a second position. The dispensing heads 160 may be in the dispensing first position during the shot-making process, where in the dispensing first position, the dispensing heads 160 may be aligned over holes in the bottom of the dispensing manifold 180, such that fluid from the dispensing heads 160 passes into the cups 164. Thus, the dispensing heads 160 may be in fluidic communication with the cups 164 in the first position. However, in the second position, the dispensing heads 160 may be translated relative to the dispensing manifold 180, such that they are not aligned over the holes in the manifold. As such, in the second position, the dispensing heads 160 may not be in fluidic communication with the cups 164.

In the second position of the dispensing heads 160, fluid entering the dispensing heads 160 may be directed to a drain tank 184, also referred to as a waste tray 184, which collects waste fluid from the device 100. A waste pump 181 may be activated to direct fluid to the drain tank 184 in at least one embodiment. In some embodiments, the waste pump 181 may be activated via thermistors of the device 100. For example, if a temperature is greater than a threshold temperature, a thermistor of the device 100 may cause the waste pump 181 to activate, draining the components of the device. This may be advantageous, to reset the system, as the system may also shut down responsive to the temperature threshold for activating the thermistors being exceeded.

In another example, the waste pump 181 may be activated following a shot-making cycle or during a cleaning cycle to ensure that excess fluid is drained from the other components of device 100. Additionally or alternatively, the waste pump 181 may be operated at regular intervals or may be operated responsive to a user input indicating that draining is desired.

The dispensing heads may be fluidically coupled to the drain tank 184 in the second position. In this way, the dispensing heads 160 may be selectively fluidically coupled to either the cups 164 or drain tank 184 by moving the dispensing heads 160 between the first and second positions. The drain tank 184 may hold drained fluid and dispense the waste fluid to drain port 188. The drain port 188 may be in fluidic communication with an external fluid drain for draining fluid from the device 100. The drain tank 184 may additionally be fluidly coupled to the mix tank 132 via a drain line 185 and may receive fluid from the mix tank 132 during the cleaning mode. In at least one example, the cleaning mode may be triggered responsive to the device determining that there was a power failure.

For example, during a power failure (loss of power to the device 100), the device 100, the device 100 may then operate via a backup battery, and activate the waste pump 181 to drain the system and perform a quick clean. In at least one example, the quick clean that is responsive to a power failure may include closing a vent or a valve to allow water line pressure to propel hot water out of the hot water tank and clean the lines of the device, such as the lines connecting conveying the gelatin-based mixture throughout the device. Additionally, the hot water may be conveyed through the dispensing manifold and manifold nozzles. The hot water flushed through the system in response to a failure event may be directed to a drain tray 184, in at least one example.

Then, upon connecting the device 100 to a power source for a first time following the power failure, the device 100 may be programmed to automatically trigger a deep clean. Specifically, a valve 186 positioned in the drain line 185 may regulate an amount of fluid drained from the mix tank 132 to the drain tank 184. For example, the valve 186 may be closed during the shot-making mode, and opened during the cleaning mode. In some examples, the drain tank 184 (i.e., waste tray 184) may be removably coupled to the housing 102. In this way, a user may remove the drain tank 184, to empty and/or clean the tank 184. Additionally, the waste tray 184 may include a thermistor to determine whether the liquid collected is hot or cold. For example, a hot liquid may be hot water and a cold liquid may be cold water that is collected in the waste tray.

In some examples, the motor 182 may be physically coupled to the sheet 162 of the dispensing manifold 180 for moving the sheet 162 and dispensing heads 160 between the first and second positions. For example, the motor 182 may actuate a cam to translate rotational motion of the motor 182 into linear displacement of the sheet 162 and dispensing heads 160. However, in other examples, a valve, such as a three-way valve, positioned between the dispensing heads 160, drain tank 184, and cups 164 may be adjusted to regulate flow from the dispensing heads 160 to either the cups 164 or the drain tank 184 instead of the motor 182.

As explained above, the controller 106 may include wireless connectivity and/or a LAN connection. As such, the controller 106 may communicate with one or more external devices, such as remote server 105 through the wireless connection and/or the LAN connection. Thus, the controller 106 may utilize cloud computing to both store and retrieve digital information such as user inputs and preferences, advertisements, alcohol and pod information, etc. As an example, the remote server 105 may monitor the functioning of the device 100 through the wireless connection. Specifically, the remote server 105 may track a number of gelatin-based shots and flavors of the gelatin-based shots produced each day by the device 100. Further, the wireless connection may transfer health and functionality data from the controller 106 of the device 100 such as if there are any errors in the device 100 and whether or not the device is working properly. For example, if an error or some sort of degradation is indicated, the controller 106 of the device 100 may notify the remote computer. The device 100 may then be serviced in order to repair any degraded components of the device 100.

The controller 106 may also send and receive a variety of signals to and from various components of the device 100. For example, the controller 106 may receive signals from inputs via the user interface 104 (e.g., alcohol selection, shot type confirmation, start/stop signals, etc.). Specifically, the controller 106 may prompt the user to select a type of alcohol and/or type of pod before initiating the shot-making process. A user may select an alcohol type and/or pod type from a list presented to the user via the user interface 104. However, if the alcohol type and/or pod type is not included in the list presented to the user, the user may scan the alcohol bottle and/or pod via the scanner 115.

Further, the controller 106 may receive signals from various countdown timers, from the heater 118, from one or more temperature sensors (e.g., the temperature sensor 173), from various flow meters, etc. For example, the various flow meters may be used to measure a movement of hot and cold water. The controller 106 may send signals to components of the device 100 such as one or more valves or valve actuators (e.g., valve 167, valve 122, etc.), one or more pumps (e.g., pump 140, pump 146, pump 156, etc.), and one or more motors (e.g., motor 166, motor 182, motor 143, etc.)

The user interface 104 may include additional buttons or controls for selecting shot-making parameters such as the desired number of shots and desired type of alcohol, type of pod, desired alcohol concentration, etc. Additional indicators may be present on the user interface 104 such as a "shots spoiled" indication when the shots are no longer safe for consumption. Further, various warning indications may be included on the user interface 104 to indicate degradation of system components or low levels of one or more of the fluid reservoirs (e.g., the water or alcohol reservoirs). In some embodiments, the user interface 104 may display fluid levels of each of the water and alcohol reservoirs.

The device 100 may be sized to easily fit on the counter of a bar or restaurant, for example, without taking up a large amount of space. For example, in some embodiments the device 100 has a width of approximately 14 inches, a depth of approximately 18 inches, and a height of less than approximately 20 inches, although other sizes are possible. The user interface 104 may be approximately seven inches measured along a diagonal of the face of the user interface 104. In other examples, the user interface may have a diagonal measurement less than or greater than seven inches.

Additional sensors to those discussed above may be present in the device 100. For example, the hot water tank 116 and alcohol reservoir 108 may each include a fluid level sensor for determining the fluid level of the respective reservoir. Further, additional temperature and/or pressure sensors may be included to maintain the fluids at required temperatures and to detect potential component degradation such as pump degradation or clogging in the flow passages.

In at least one example, the device may further include a power management system in the form of instructions stored in non-transitory memory of the controller of the device. The power management system may optimize a usage of power for sub-systems that consume power. In a case of device 100, for example, the three primary sub-systems that consume power are the hot water tank heating element, the chiller block thermoelectric chips, and the chiller drawer thermoelectric chips. All of the primary sub-systems may be controlled with pulse width modulation via the power management system and may have dynamic caps based on a current mode or state of the primary sub-system. Each of the machine modes or states are categorized and programmed with caps to limit power consumption so that the machine can be operated using a standard wall electrical outlet. Furthermore, the power management system may balance an order and timing of operations to ensure that power consumption limits are not exceeded. For example, during a ready-to-eat production cycle, the water may be pre-heated for mixing in the mix pod and the coolant liquids and/or a chiller block are cooled prior to routing hot water to the mix pod for mixing. In one example, heat that may be dissipated during a cooling of the coolant liquids may be leveraged to heat pre-heat the water to be used for mixing. Even in examples where the dissipated heat may not be utilized for pre-heating of the water, however, it is still advantageous to pre-heat the water and pre-chill the coolant liquids and cool the chiller block prior to beginning a mixing process. This is not least because, once actual mixing begins and pumps are operated, a power consumption limit may be exceeded if the system is still attempting to cool the coolant liquids and chiller block.

Moving now to FIGS. 2A-2F and FIGS. 3A-3H, these figures show schematic flow diagrams of the device according to at least one embodiment of the present disclosure. In particular, FIGS. 2A-2F show views of a schematic flow diagram of a quick-prep device used to prepare a gelatin-based product, in accordance with one or more embodiments of the present disclosure. FIGS. 3A-3H show views of a schematic flow diagram of a quick-prep and ready-to-eat device used to prepare a gelatin-based product in accordance with one or more embodiments of the present disclosure. The pumps, mixers, and valves may be controlled via a controller of the device.

Figure 2A:
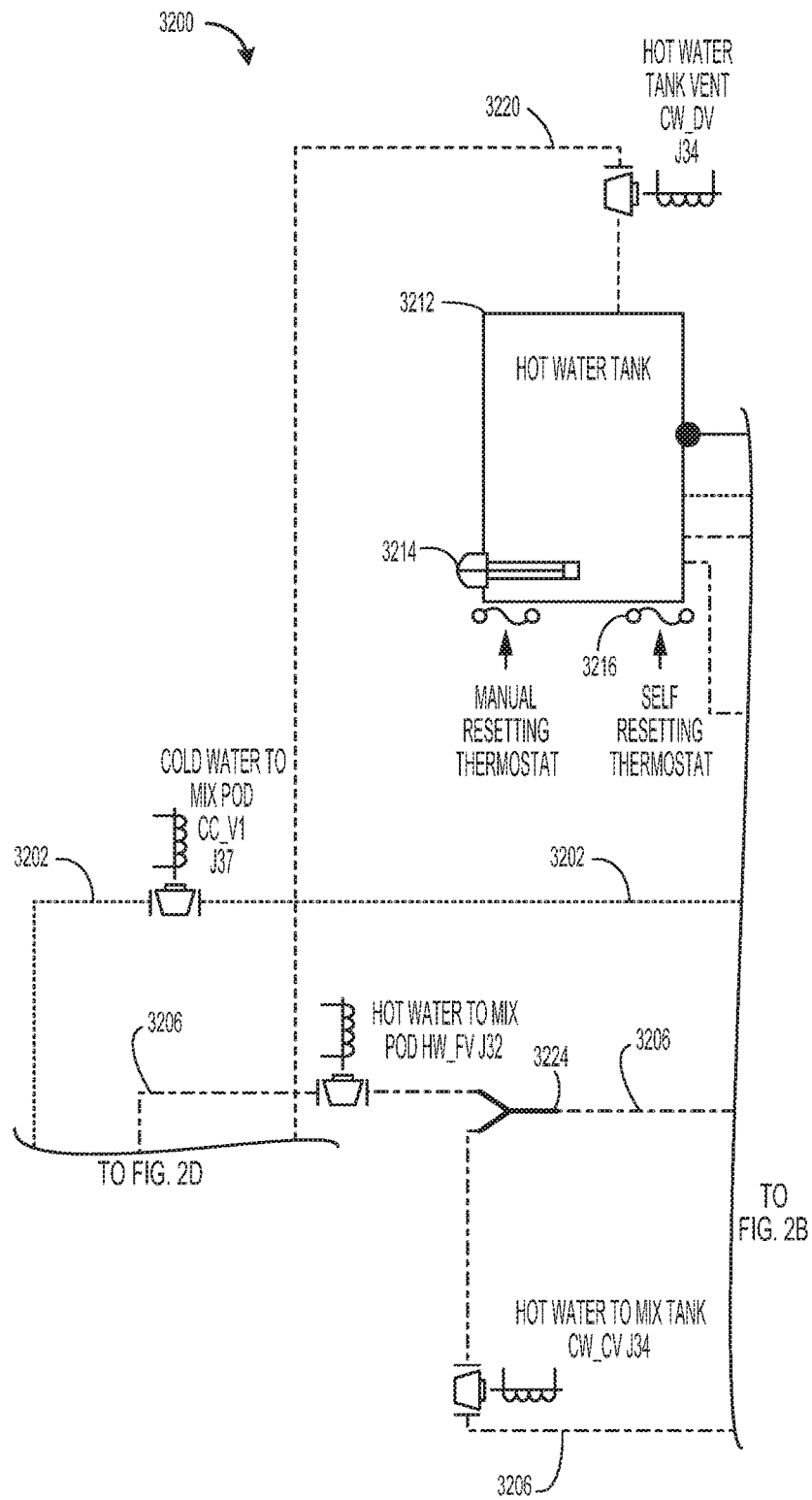
FIG. 2A shows a first partial view of a schematic flow diagram of a quick-prep device that produces a gelatin-based product, in accordance with one or more embodiments of the present disclosure.

Turning to FIG. 2A, FIG. 2A shows a first partial view of a schematic flow diagram of a quick-prep device that produces a gelatin-based product 3200 in accordance with at least one embodiment of the present disclosure. As shown in FIG. 2A, a key has been included for reference. Furthermore, as indicated in FIG. 2A, the cold water passage 3202 may flow cold water to a mix pod. A cold water passage 3202 connects to a water source at a first end (water source shown in FIG. 2C) and to a mix pod at a second end of the cold water passage 3202 that is opposite the first end.

In addition to the cold water passage 3202, a hot water passage 3206 may be included. Similar to the tap water passage, the hot water passage 3206 may also comprise a plurality of valves. For example, a hot water passage 3206 is positioned upstream of the same mix pod Y-valve that the tap water passage feeds into, and the mix pod Y-valve may be controlled to adjust a flow of cold water and hot water into the mix pod Y-valve.

The hot water passage 3206 may connect to a hot water tank 3212 at a first end of the hot water passage 3206. Water introduced into the hot water tank 3212 may be from the water source that supplies the cold water passage 3202. The hot water tank 3212 may comprise a manual resetting thermostat 3214 and a self-resetting thermostat 3216 in order to prevent over heating of the hot water tank 3212. Moreover, a hot water tank vent 3218 may be included in order to prevent over pressurizing the hot water tank 3212.

For example, a hot water tank vent may open responsive to a hot water tank 3212 exceeding a threshold temperature and/or a threshold pressure to prevent over pressurizing the hot water tank 3212. In particular, in a case of an event where a temperature of the hot water tank 3212 exceeds a threshold temperature or where a pressure of the hot water tank 3212 exceeds a threshold temperature, the hot water tank vent may open into a hot water tank overflow passage 3220. The hot water tank overflow passage 3220 eventually flows hot water and steam from the hot water tank out to a waste drain (waste drain is shown at FIG. 2E).

The hot water passage 3206 further comprises a hot water Y-valve 3224. The hot water Y-valve 3224 may be positioned within the hot water passage 3206 and controlled via a controller to direct a hot water flow. In particular, the hot water Y-valve 3224 may either direct a hot water flow to a mix pod, a mix tank, or to both the mix pod and the mix tank.

Figure 2B:
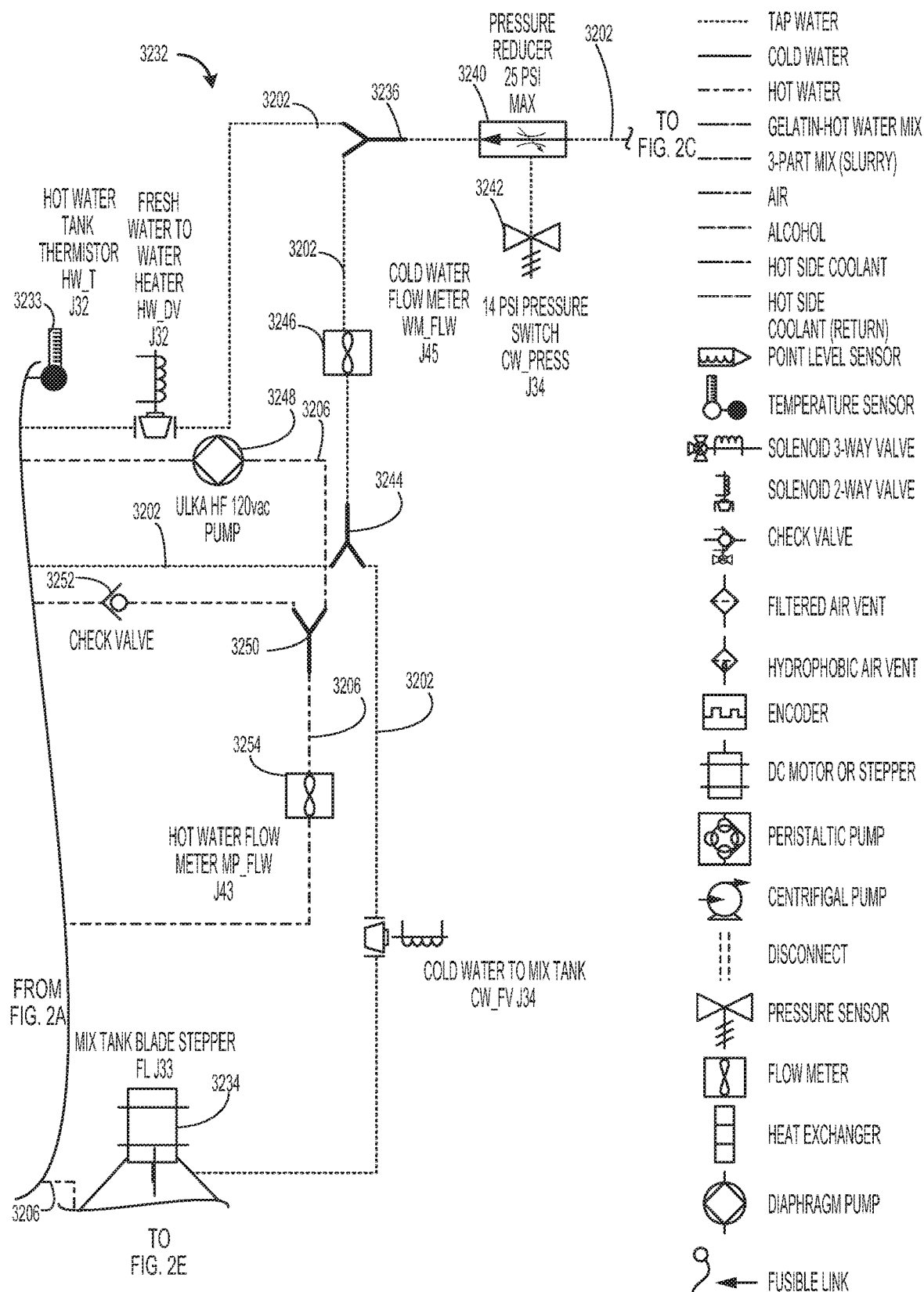
FIG. 2B shows a second partial view of the schematic flow diagram of the quick-prep device that produces a gelatin-based product, in accordance with one or more embodiments of the present disclosure.

Turning now to FIG. 2B, FIG. 2B show a second partial view of the fluid flow schematic diagram of a quick-prep device that produces a gelatin-based product 3232 in accordance with at least one embodiment of the present disclosure. As shown in FIG. 2B, the hot water passage 3206 continues from FIG. 2A and flows into mix tank 3234. Moreover, cold water passage 3202 also flows into the mix tank 3234. In particular, water from a water source (shown in FIG. 2C) is flowed through a pressure reducer 3240 to reduce a pressure of the water if needed. A pressure sensor 3242 may communicate with the pressure reducer 3240 to monitor a pressure of water flowing through the pressure reducer 3240. Once a pressure of the water is at a desired pressure following pressure reducer 3240, the water is then flowed through a water source Y-valve 3236, where the water source Y-valve 3236 directs a flow of water to either a hot water tank 3212 for heating or to a cold water flow path.

When flowing the water to the cold water flow path, the Y-valve 3236 directs a flow of water through a flow meter 3246 and to a cold water flow path Y-valve 3244. The cold flow path Y-valve 3244 may direct the water flow downstream of the flow meter 3246 to one or both of the mix tank 3234 and a mix pod.

Regarding water that is flowed via a cold water passage 3202 to the hot water tank, such water may be heated in the hot water tank and then pumped out of the hot water tank and through a hot water passage 3206 via pump 3248. As shown, the hot water tank may include a temperature sensor 3233 to monitor a temperature of the water within the hot water tank. The hot water from the hot water tank is then flowed through a hot water tank Y-valve 3250. After flowing hot water to the hot water tank Y-valve 3250, the hot water tank Y-valve 3250 is controlled to either direct the hot water flow through a check valve 3252 before being flowed back into the hot water tank or to direct the hot water flow past a flow meter 3254 and to hot water Y-valve 3224 for further direction to either the mix tank or the mix pod.

Figure 2C:
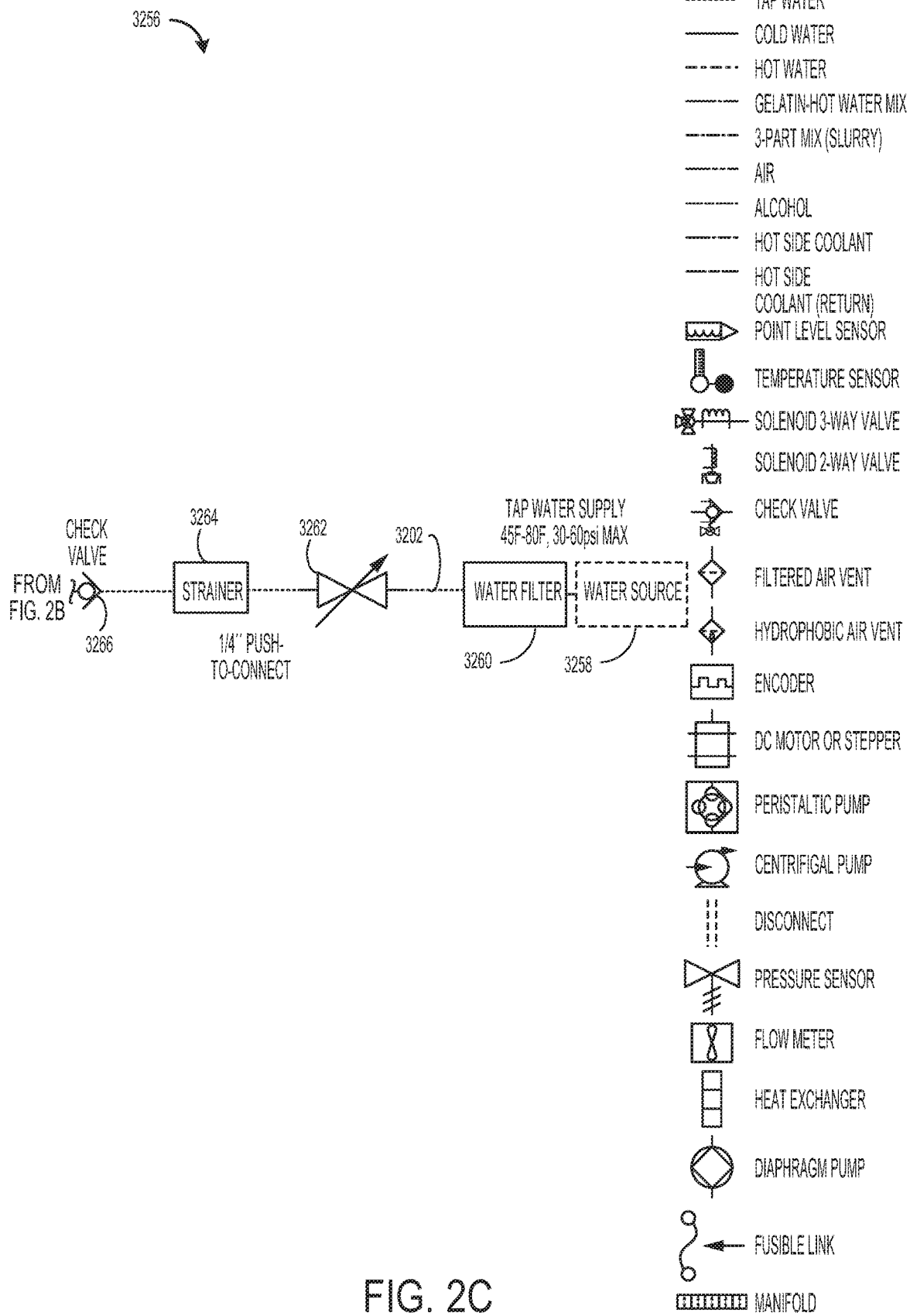
FIG. 2C shows a third partial view of the schematic flow diagram of the quick-prep device that produces a gelatin-based product, in accordance with one or more embodiments of the present disclosure.

Turning now to FIG. 2C, FIG. 2C shows a third partial view of the fluid flow schematic diagram of a quick-prep device that produces a gelatin-based product 3256 in accordance with at least one embodiment of the present disclosure. As shown in FIG. 2C, a water source 3258 of the cold water flows water through a water filter 3260. The water source may be an external water source to the device such as a water tank. The device may be directly coupled to the water source 3258 to enable operation of the device. Water from the water source 3258 may be flowed to water filter 3260 via cold water passage 3202. Following flow of the water through the water filter 3260, the water may then be flowed through a cut-off valve 3262, and then through strainer 3264. After flowing the water through the strainer 3264, the water may then be flowed through check valve 3266 before being flowed to pressure reducer 3240 (shown in FIG. 2B).

Figure 2D:
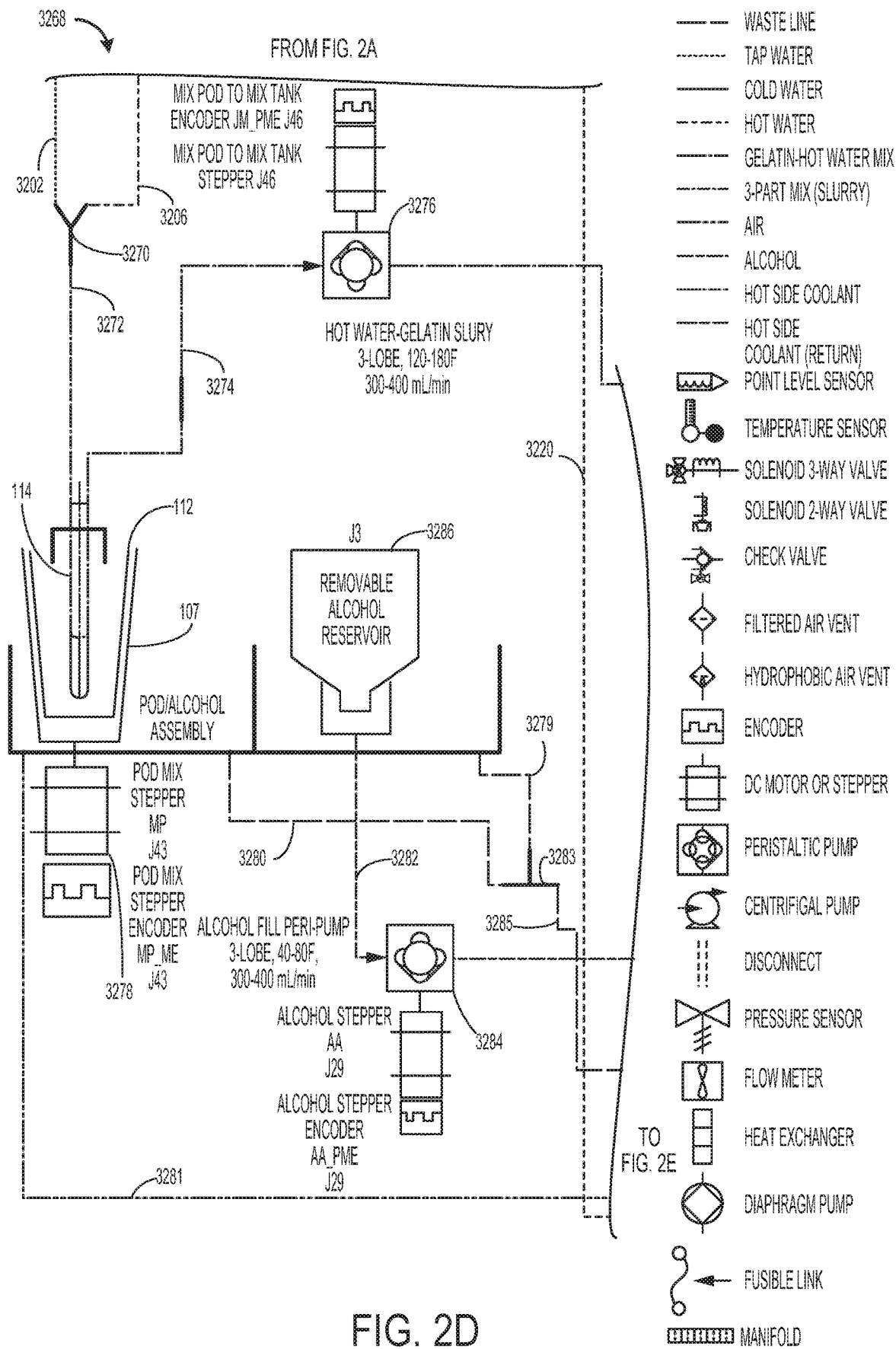
FIG. 2D shows a fourth partial view of the schematic flow diagram of the quick-prep device that produces a gelatin-based product, in accordance with one or more embodiments of the present disclosure.
Figure 2E:
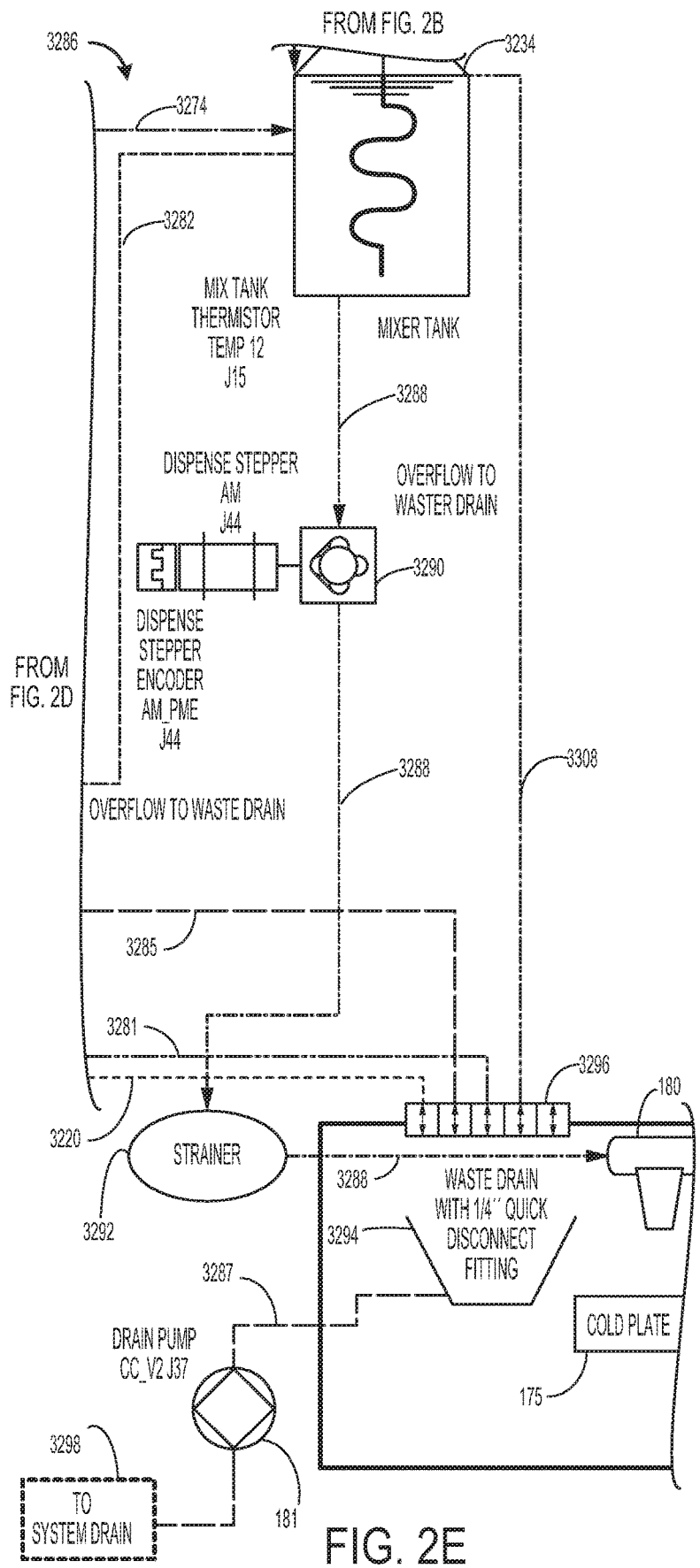
FIG. 2E shows a fifth partial view of the schematic flow diagram of the quick-prep device that produces a gelatin-based product, in accordance with one or more embodiments of the present disclosure.

Turning now to FIG. 2D, FIG. 2D shows a fourth partial view of the fluid flow schematic diagram of a quick-prep device that produces a gelatin-based product 3268 in accordance with at least one embodiment of the present disclosure. As shown in FIG. 2D, a pod receptacle 107 holding a mix pod 112 has a pod spike 114 positioned therein. The pod spike 114 may be connected to a water inlet passage 3272, where the water inlet passage 3272 flows water from downstream of a water inlet Y-valve 3272, through the pod spike 114, and into the mix pod 112. One or both of water from a cold water passage 3202 and a hot water passage 3206 may be flowed through the water inlet Y-valve 3270, through the pod spike 114, and into the mix pod 112 based upon a desired temperature of water to be introduced into the mix pod.

Following introducing water into the mix pod 112, the water may be agitated within the mix pod 112. For example, a mix pod 112 may be spun, shaken, or otherwise agitated via a mix pod drive 3278. Then, the water introduced into the mix pod 112 may be evacuated from the mix pod 112 via the pod spike by suctioning the water out of the mix pod 112 and through the pod spike 114. The suction may be generated via pump 3276. In a case where the mix pod contained a gelatin mixture, the introduction of water and agitation of the mix pod 112 may cause the gelatin mixture to become a gelatin slurry. Thus, evacuation of the mix pod 112 may be evacuation of a gelatin slurry from the mix pod through the pod spike 114. The gelatin slurry or water may be flowed through a gelatin slurry passage 3274 and into the mix tank for further mixing. Additionally, in at least example, alcohol from a removable alcohol reservoir 3286 may also be flowed through alcohol passage 3282 via pump 3284, and the alcohol from the removable alcohol reservoir 3286 may also be flowed to the mix tank. Further, alcohol overflow in the mix pod and alcohol assembly may be drained via alcohol waste passage 3279.

Turning now to FIG. 2E, FIG. 2E shows a fifth partial view of the fluid flow schematic diagram of a quick-prep device that produces a gelatin-based product 3268 in accordance with at least one embodiment of the present disclosure. As shown in FIG. 2E, alcohol passage 3282 may flow into mix tank 3234 and gelatin slurry passage 3274 may flow into mix tank 3234. The resulting mixture from the mix tank 3234 may be pumped via pump 3290 through a strainer 3292 and into a dispensing manifold 180 via final product passage 3288. Final product may mean that all of the ingredients that are to be added for producing the gelatin-based product have been mixed in together in the mix tank. For example, if there is to be alcohol in the gelatin-based product, then a final product would comprise the gelatin-based mixture, alcohol, and water. In another example where there may not be alcohol in the final gelatin-based product, the final product may be the result of the gelatin-based mixture and water or another liquid being mixed together. Additionally, as shown in FIG. 2E, waste, such as overflow from the hot water tank or overflow from the mix tank for example, may be flowed to a waste drain 3294 via waste manifold 3296. For example, mix tank overflow passage 3308, a first mix pod waste passage 3280, a second mix pod waste passage 3281, and an alcohol waste passages 3279, may all flow any one or more of water, gelatin slurry, or alcohol overflow to the waste drain 3298 (shown in FIG. 2D). In particular, alcohol waste passage 3279 and the first mix pod waste passage 3280 may converge at junction 3283 (shown in FIG. 2D) and then subsequently be flowed together via mixed waste passage 3285 to the waste drain 3294. The waste collected from these passages may be pumped from waste drain 3294 through waste exit passage 3287 via a drain pump 181 to a system drain 3298, in at least one example.

Figure 2F:
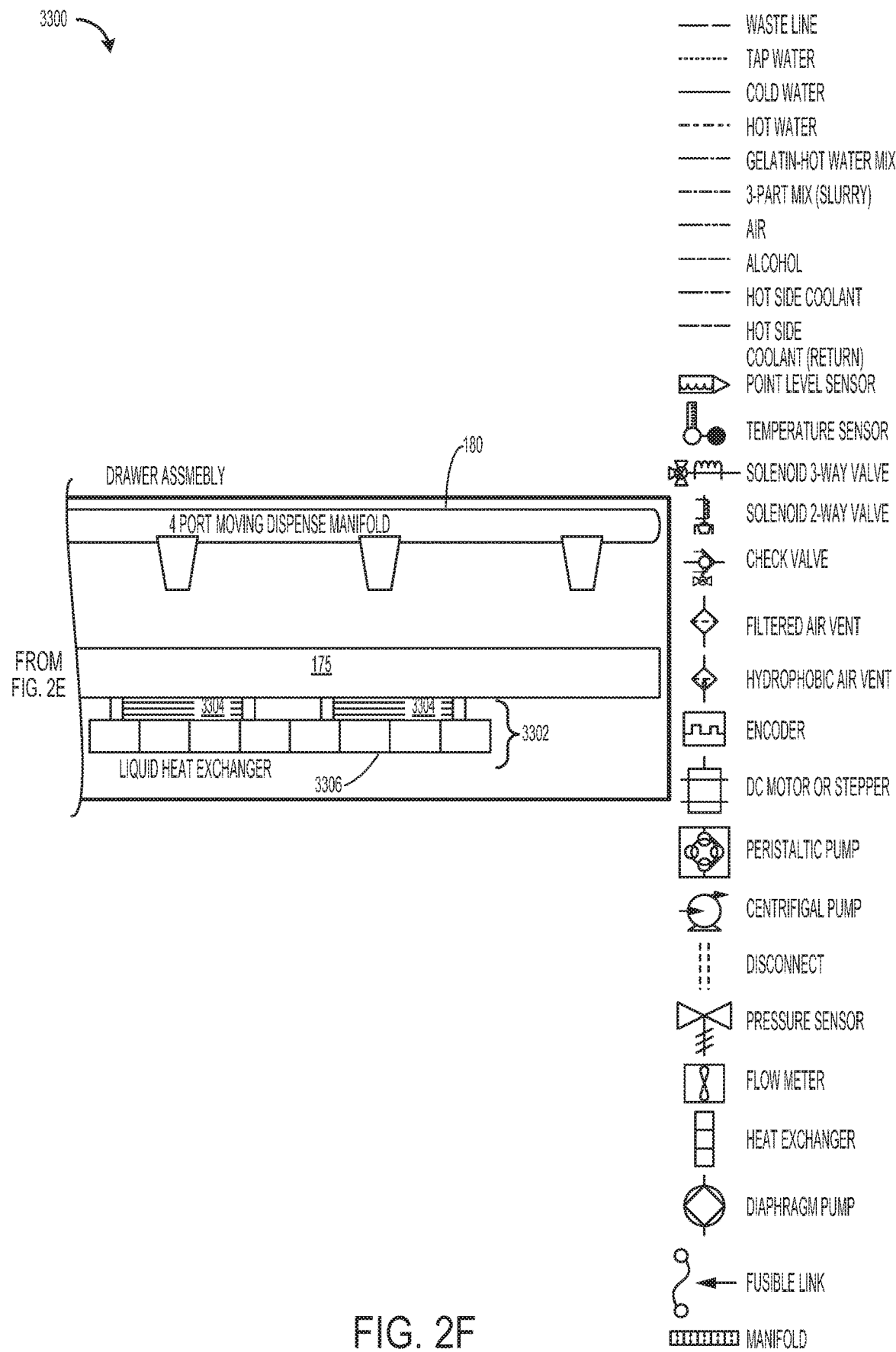
FIG. 2F shows a sixth partial view of the schematic flow diagram of the quick-prep device that produces a gelatin-based product, in accordance with one or more embodiments of the present disclosure.

Turning now to FIG. 2F, FIG. 2F shows a sixth partial view of the fluid flow schematic diagram of a quick-prep device that produces a gelatin-based product 3300 in accordance with at least one embodiment of the present disclosure. As shown in FIG. 2F, the dispensing manifold 180 may be positioned above a chilling plate 175. The chilling plate 175 may be positioned directly above a cooling assembly 3302, where the cooling assembly comprises thermoelectric chips 3304 and a liquid heat exchanger 3306. The advantage of such a configuration may be that, although not shown, cups for receiving a gelatin based final product from the dispensing manifold 180 may be positioned on top of the chilling plate 175, and the chilling plate 175 may cool the gelatin based final product so that it may gel or may be close to gelling.

Turning now to FIGS. 3A-3H, which show views of a schematic flow diagram of a quick-prep and ready-to-eat device that produces a gelatin-based product in accordance with one or more embodiments of the present disclosure. The fluid diagram shown in FIGS. 3A-3H is substantially similar to that shown in FIGS. 2A-2F, with the exception of the elements shown at FIGS. 3D and 3F-3H. Thus, elements that are the same may be referenced by the same reference numeral and may not be further discussed.

Moreover, discussion is focused on differences between the fluid flow of the quick-prep device in FIGS. 2A-2F compared to the fluid flow of device that may carry out both quick-prep and ready-to-eat modes shown in FIGS. 3D and 3F-3H.

Figure 3A:
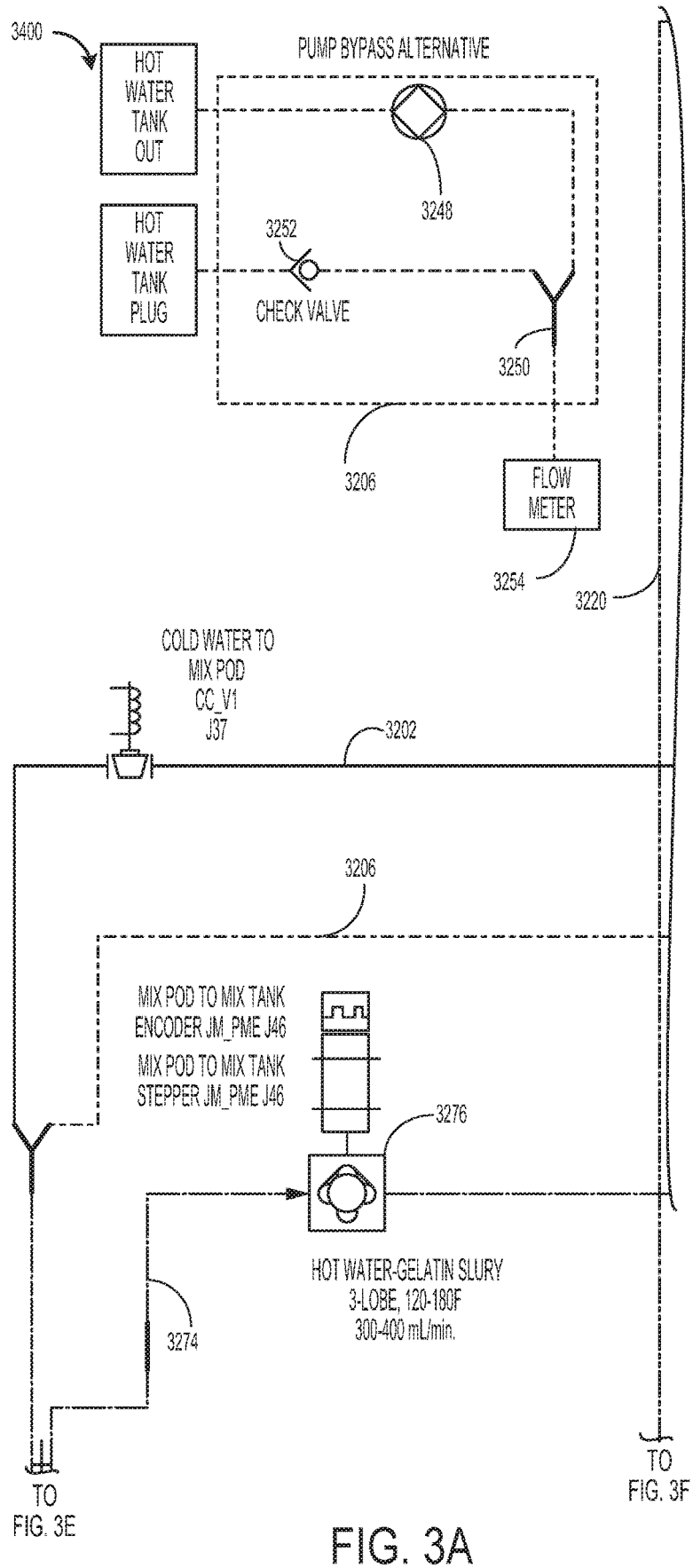
FIG. 3A shows a first partial view of a schematic flow diagram of a quick-prep and ready-to-eat device that produces a gelatin-based product in accordance with one or more embodiments of the present disclosure.
Figure 3B:
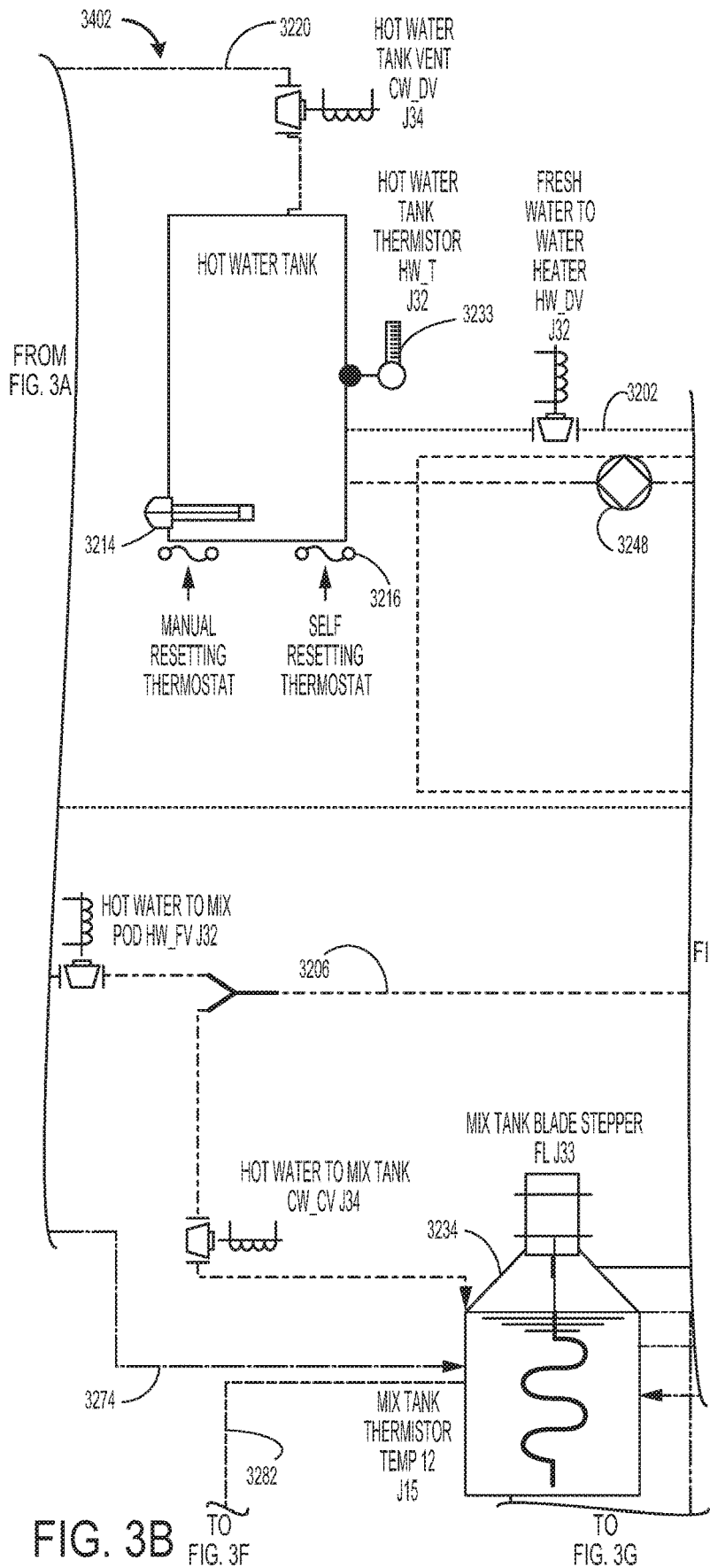
FIG. 3B shows a second partial view of the schematic flow diagram of the quick-prep and ready-to-eat device used that produces a gelatin-based product in accordance with one or more embodiments of the present disclosure.

Turning to FIG. 3A, FIG. 3A shows a first partial view of a schematic flow diagram of the quick-prep and ready-to-eat device that produces a gelatin-based product 3400 in accordance with one or more embodiments of the present disclosure. FIG. 3B shows a second partial view of the schematic flow diagram of the quick-prep and ready-to-eat device that produces a gelatin-based product 3402 in accordance with one or more embodiments of the present disclosure. Moving to FIG. 3C, FIG. 3C shows a third partial view of the schematic flow diagram of the quick-prep and ready-to-eat device that produces a gelatin-based product 3404 in accordance with one or more embodiments of the present disclosure. Though FIG. 3C is substantially similar to the flow diagram shown in FIGS. 2A-2F, the inclusion of both a pinch valve 3406 and a circulation pump 3408 differ from the flow diagram of FIGS. 2A-2F. Chiller block circulation pump 3408 may enable circulation of coolant through a chiller block radiator via a chiller block radiator coolant passage 3410. Further, a pinch valve 3406 may be included in the gelatin slurry passage 3274 as a part of the chiller block circuit to enable volume control of a gelatin slurry through the chiller block.

Figure 3D:
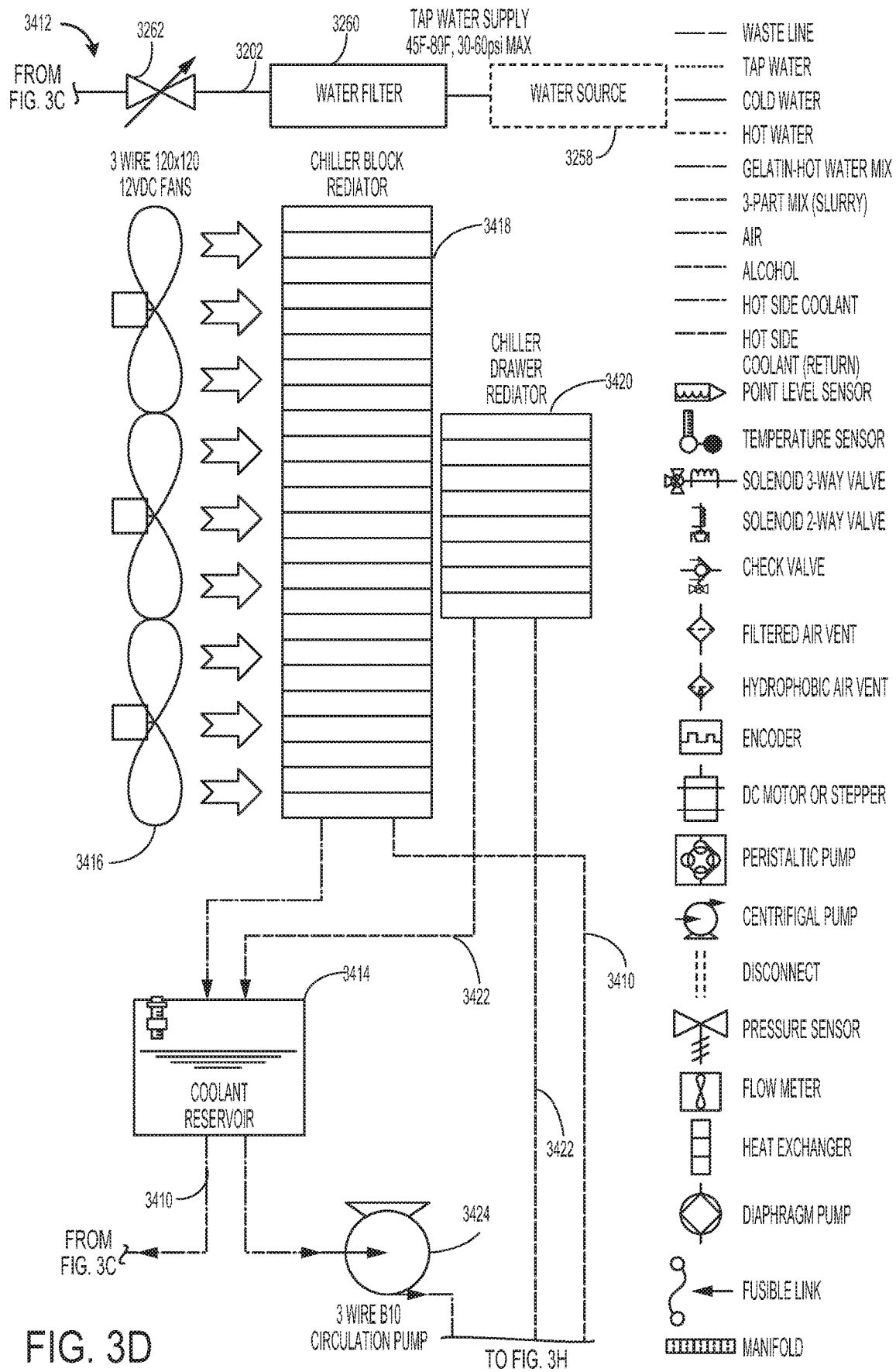
FIG. 3D shows a fourth partial view of the schematic flow diagram of the quick-prep and ready-to-eat device that produces a gelatin-based product in accordance with one or more embodiments of the present disclosure.

Turning now to FIG. 3D, FIG. 3D shows a fourth partial view of the schematic flow diagram of the quick-prep and ready-to-eat device that produces a gelatin-based product 3412 in accordance with one or more embodiments of the present disclosure. As shown in FIG. 3D, coolant is flowed through a chiller block radiator 3418, assisted by fans 3416 for cooling purposes, and then coolant is flowed through a coolant reservoir 3414 and to circulation pump 3408 (shown in FIG. 3C). Such coolant is then flowed through a chiller block (shown in FIG. 3H). A second cooling circuit for cooling a chiller drawer, including the cold plate in the chiller drawer, is formed at least in part by chiller drawer radiator 3420 which shares a coolant reservoir 3414 with the cooling circuit for the chiller block radiator. Coolant flowed through the chiller drawer radiator 3420 is flowed into a coolant reservoir 3414 and then pumped via chiller drawer circulation pump 3424 to a cooling assembly of the chiller drawer, as shown in FIG. 3H.

Figure 3E:
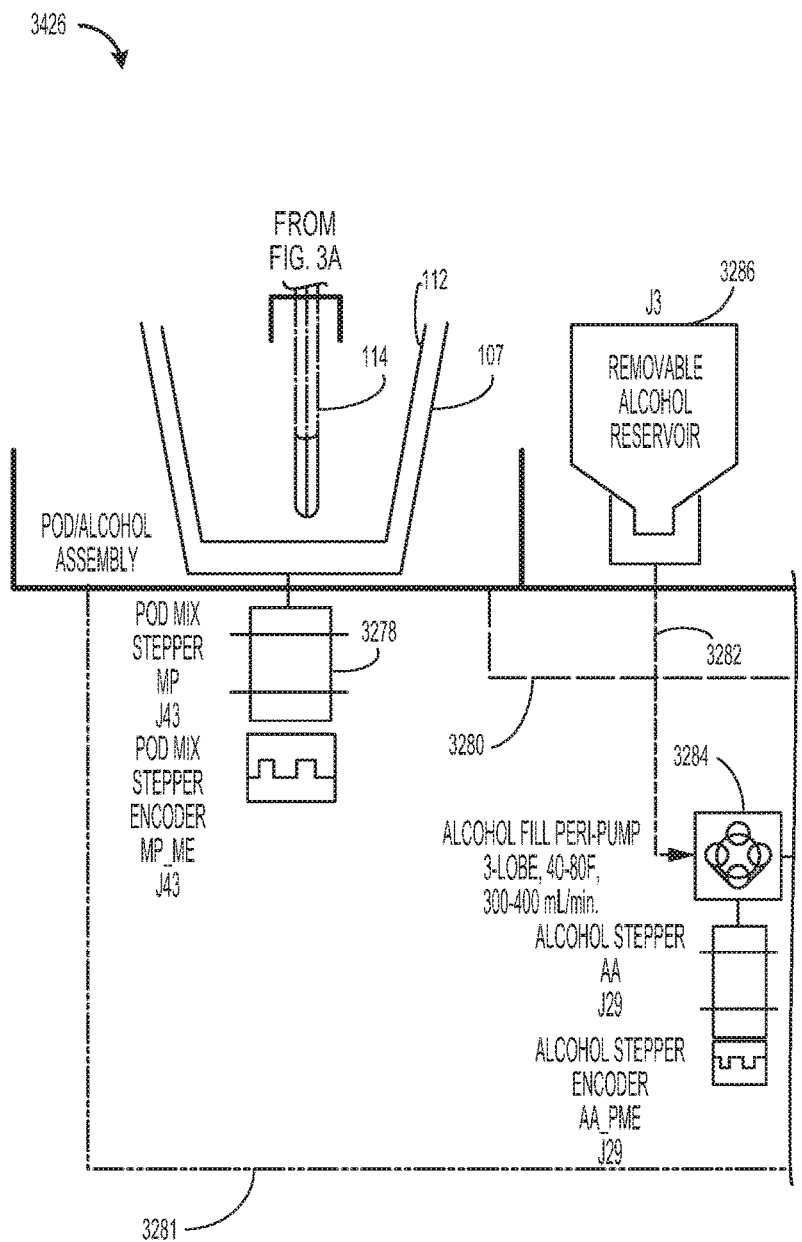
FIG. 3E shows a fifth partial view of the schematic flow diagram of the quick-prep and ready-to-eat device that produces a gelatin-based product in accordance with one or more embodiments of the present disclosure.
Figure 3F:
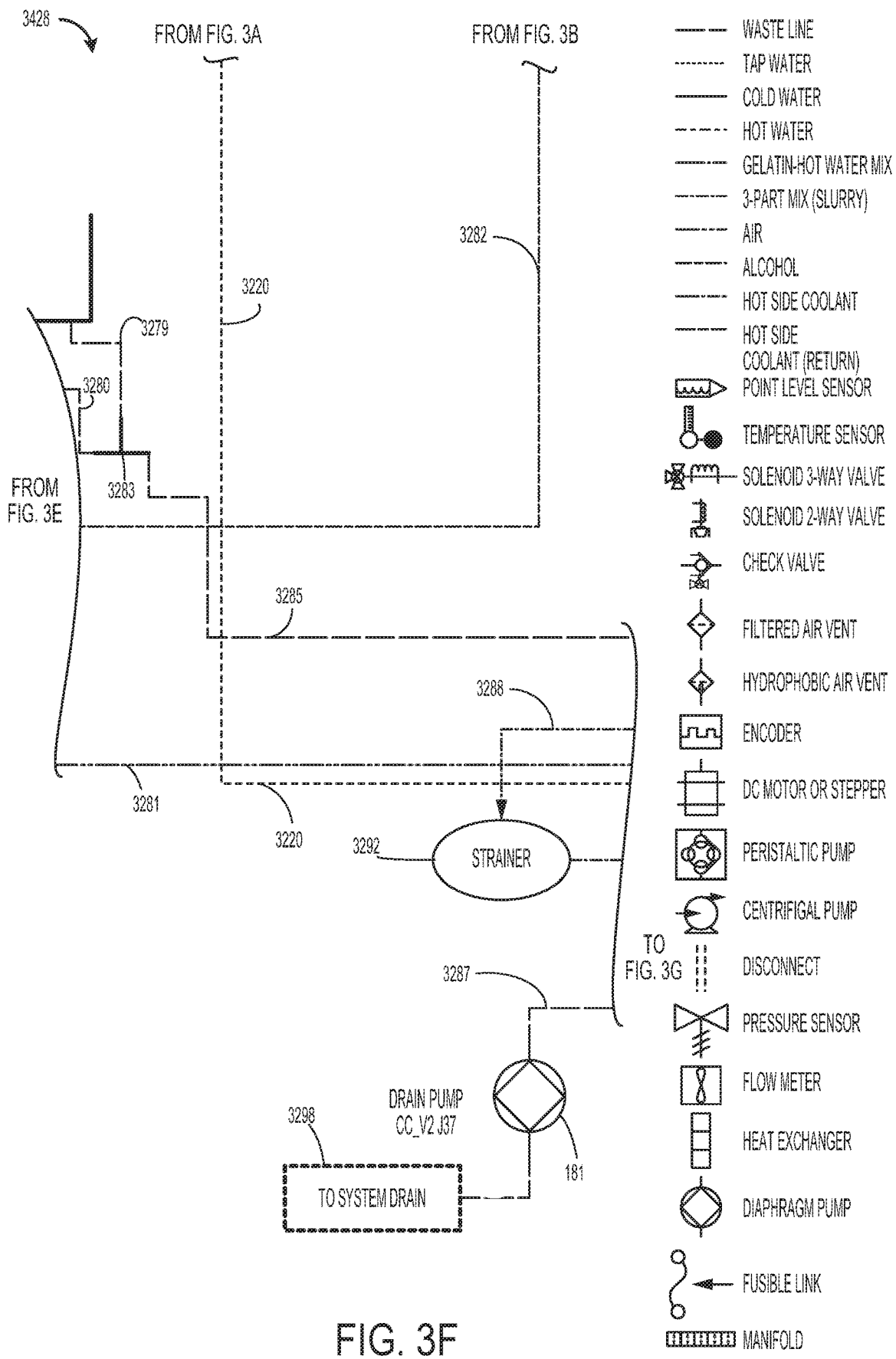
FIG. 3F shows a sixth partial view of the schematic flow diagram of the quick-prep and ready-to-eat device that produces a gelatin-based product in accordance with one or more embodiments of the present disclosure.

Regarding FIGS. 3E-3F, FIGS. 3E-3F comprises similar flow elements as shown in FIGS. 2A-2F as to a mix pod assembly and alcohol reservoir. In particular, FIG. 3E shows a fifth partial view of the schematic flow diagram of the quick-prep and ready-to-eat device that produces a gelatin-based product 3426 in accordance with one or more embodiments of the present disclosure. As shown, there are similar waste passages for draining overflow from the mix pod and alcohol assembly to a waste drain. Turning to FIG. 3F, FIG. 3F shows a sixth partial view of the schematic flow diagram of the quick-prep and ready-to-eat device that produces a gelatin-based product 3428 in accordance with one or more embodiments of the present disclosure. As can be seen in FIG. 3F, the alcohol waste passage 3279 and the second mix pod waste passage 3280 converge at junction 3283 to flow overflow via mixed waste passage 3285, similar to the device example shown in FIGS. 2A-2F. Furthermore, also similar to the device shown in FIGS. 2A-2F, the waste passages for draining overflow from the mix pod and alcohol assembly to a waste drain.

Figure 3G:
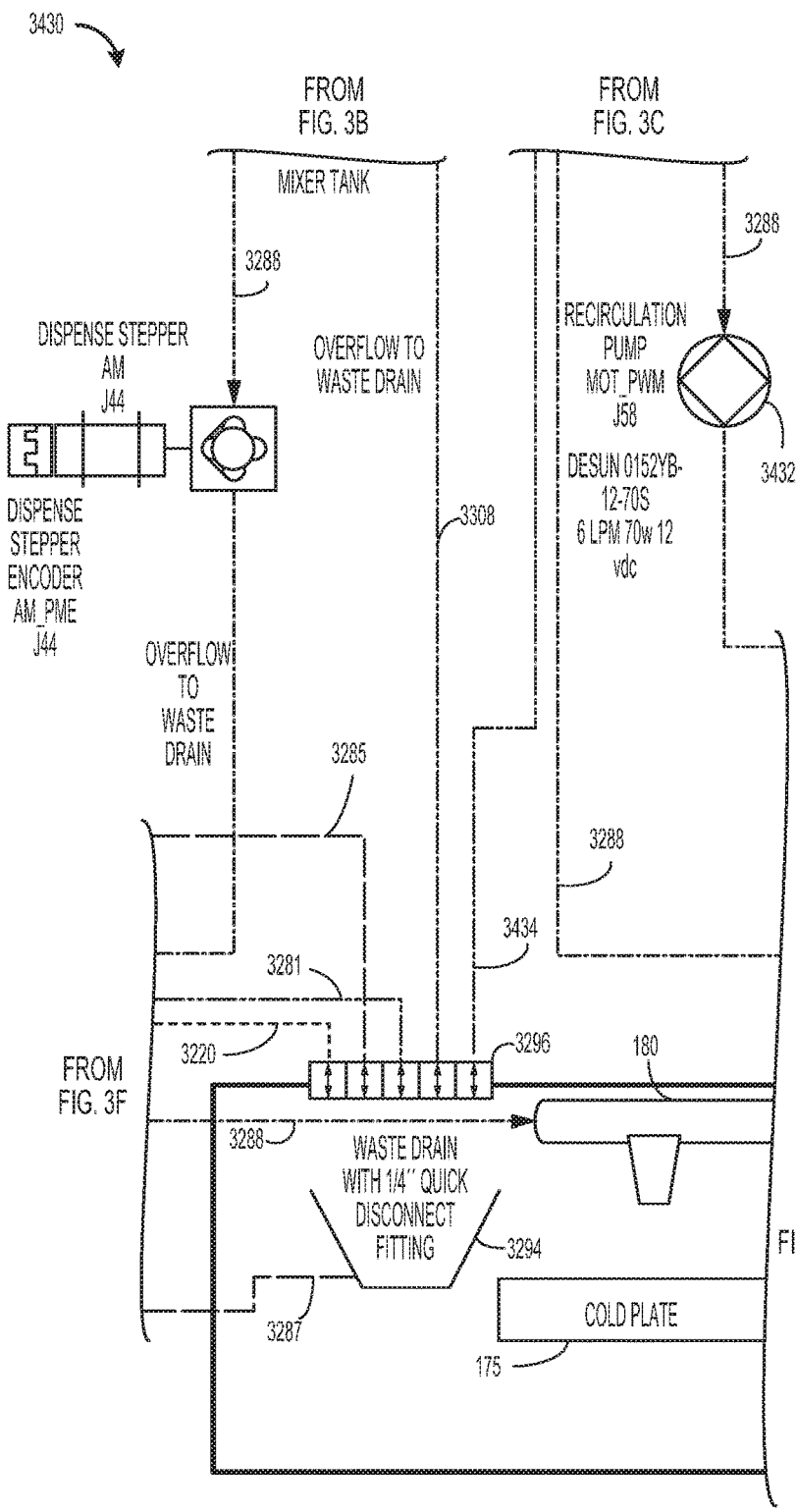
FIG. 3G shows a seventh partial view of the schematic flow diagram of the quick-prep and ready-to-eat device that produces a gelatin-based product in accordance with one or more embodiments of the present disclosure.

Turning to FIG. 3G, FIG. 3G shows a seventh partial view of the schematic flow diagram of the quick-prep and ready-to-eat device that produces a gelatin-based product 3430 in accordance with one or more embodiments of the present disclosure. As shown in FIG. 3G, gelatin chiller block pump 3432 pumps the gelatin slurry through the gelatin chiller block shown in FIG. 3H, then through gelatin slurry passage 3274 shown in FIG. 3G, back into the mix tank 3234 shown in FIG. 3B. Then, once the gelatin slurry is sufficiently cooled, the gelatin slurry is pumped out of the mix tank 3234, through strainer 3292, and through dispensing manifold 180. Overflow chiller block gelatin waste may be flowed to the waste drain 3294 via chiller block gelatin waste passage 3434. For example, in a case of power failure, pinch valve 3406 may be closed, and any gelatin that was being pumped through the chiller block may be drained via chiller block gelatin waste passage 3434.

Figure 3H:
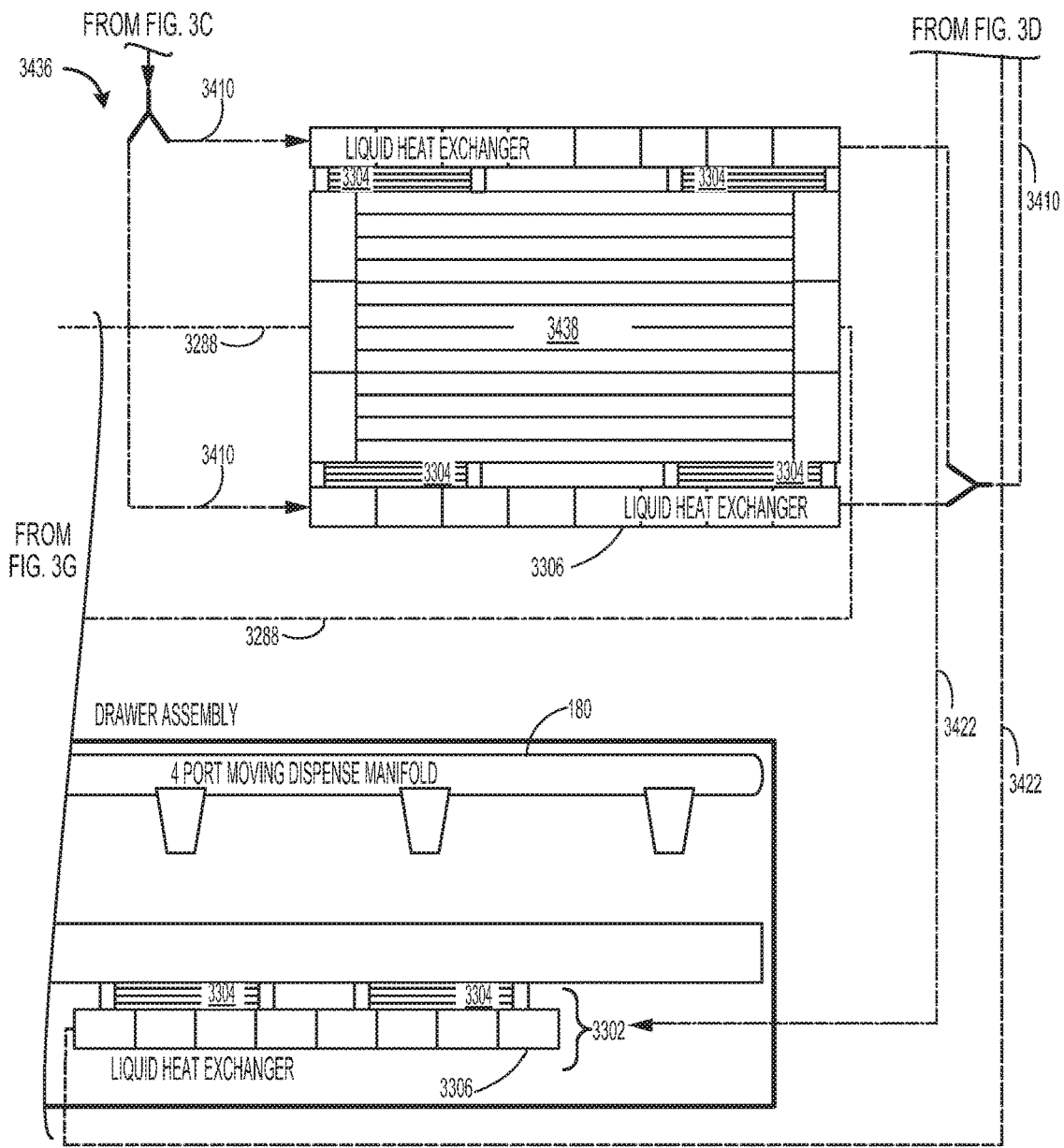
FIG. 3H shows an eighth partial view of the schematic flow diagram of the quick-prep and ready-to-eat device that produces a gelatin-based product in accordance with one or more embodiments of the present disclosure.

Moving now to FIG. 3H, FIG. 3H shows an eighth partial view of the schematic flow diagram of the quick-prep and ready-to-eat device that produces a gelatin-based product 3436 in accordance with one or more embodiments of the present disclosure. As shown in FIG. 3H, the gelatin slurry is circulated through gelatin chiller block 3438. The gelatin chiller block 3438 cools the gelatin slurry flowed through a final product passage 3288 that passes through the gelatin chiller block 3438. Then the gelatin slurry that has been chilled via the gelatin chiller block 3438 is flowed into the mix tank 3234 to then either be recirculated through the chiller block 3438 again or to then be flowed through a strainer 3292 and a dispensing manifold 180.

Similar to the cooling apparatus 3302, gelatin chiller block 3438 may utilize both a liquid heat exchanger 3306 and thermoelectric chips 3304. The liquid heat exchanger 3306 of the gelatin chiller block 3438 may be operated with coolant flowed through a chiller block radiator coolant passage 3410. Cooling the gelatin slurry via the gelatin chiller block 3438 may beneficially help to expedite the setting process of the gelatin-based product.

FIGS. 4-12 show the device 100 and its components in further detail. A description of a processes for preparing the gelatin-based shots is provided below with reference to FIGS. 13A-28. It is noted that the process for preparing the gelatin-based shots may be stored as computer readable instructions in non-transitory memory of the controller that are executable by a processor of the controller.

Turning now to FIGS. 4-12, they show schematics of the device 100 showing the relative sizes and positions of the components within the device. More specifically, the perspective views of the device 100 shown in FIGS. 4-12 may be three-dimensional axonometric projections of the device 100, showing the device 100 as viewed from a skew direction in order to reveal more than one side of the device 100. As such, components of the device 100 already introduced and described above with reference to FIG. 1 may not be reintroduced or described again in the description of FIGS. 4-12. FIGS. 4-12 are drawn to approximately to scale.

As such, FIGS. 4-12 show the relative positioning of various components of the shot-making device 100. If shown directly contacting each other, or directly coupled, then such components may be referred to as directly contacting or directly coupled, respectively, at least in one example. Similarly, components shown contiguous or adjacent to one another may be contiguous or adjacent to each other, respectively, at least in one example. As an example, components lying in face-sharing contact with each other may be referred to as in face-sharing contact or physically contacting one another. As another example, elements positioned apart from each other with only a space therebetween and no other components may be referred to as such, in at least one example.

As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 4:
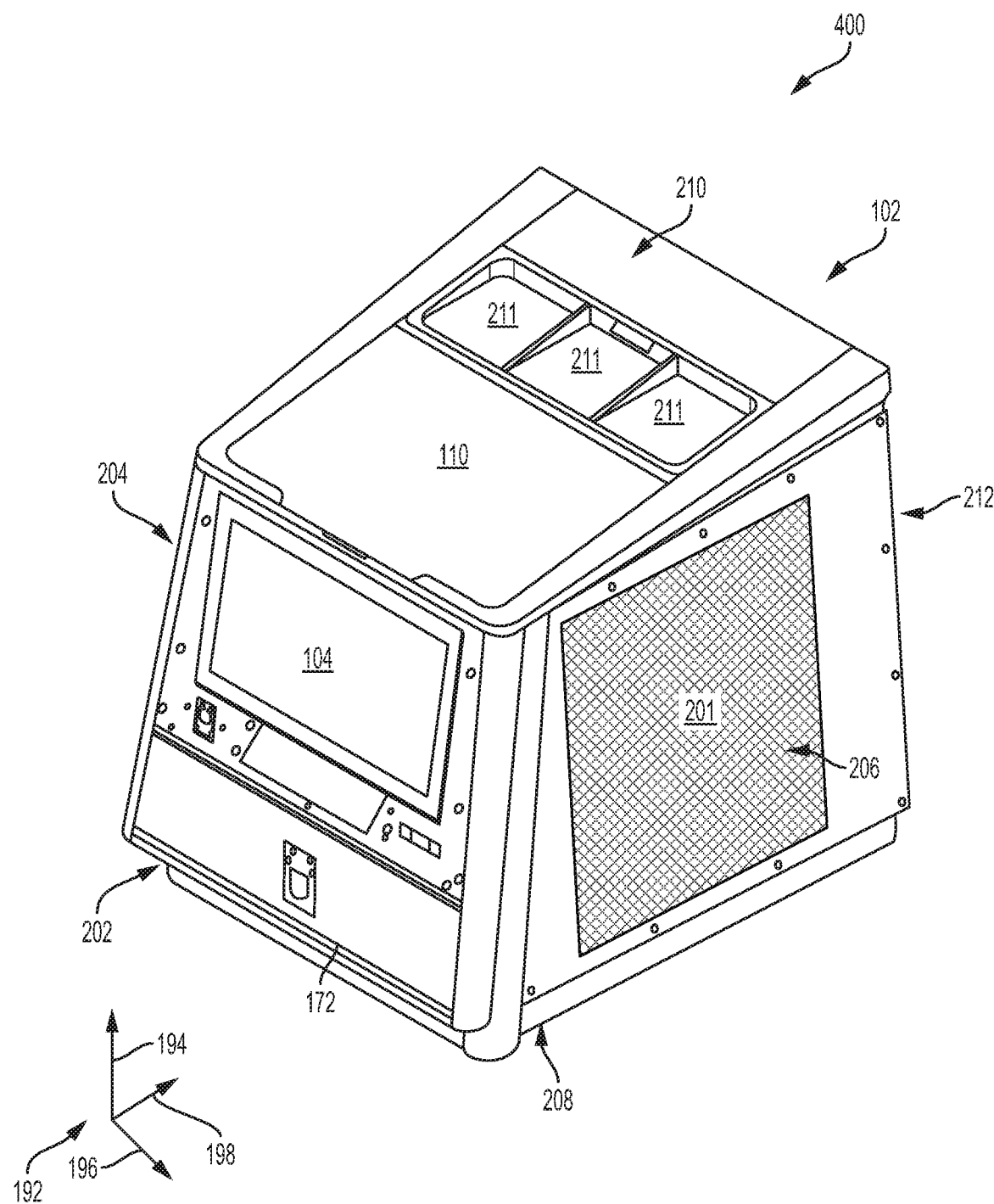

Focusing now on FIG. 4, it shows a first exterior front axonometric perspective view 400 of the device 100 shown above in FIG. 1. The device housing 102 comprises six substantially flat, planar walls, defining the exterior of the device 100. Specifically, the device housing 102 comprises a front wall 202 opposite a back wall 212, a first side wall 206 opposite a second side wall 204, and a bottom wall 208 opposite a top wall 210. In view 200, only the top wall 210, second side wall 206, and front wall 202 are visible. However, FIGS. 4-24 described below provide other views of the device 100.

The user interface 104 may be positioned on the front wall 202 of the housing 102. Further, the drawer 172 may be positioned on the front wall 202, and may be flush with the front wall 202. A user may pull the drawer 172, to slide the drawer 172 in and out of the device housing 102 to access a tray containing the cups 164 (not shown in FIGS. 4-8). A first side display 201 may be on the first side wall 206 of the housing. The side display 201 may display images of various alcohols and/or various advertisements loaded onto the controller 106 of the device 100. Additionally, the side display 201 may display a variety of advertisements stored remotely via a wireless connection and/or through cloud computing. In some examples, the first side display 201 may be configured to display a single static image. However, in other examples, the first side display 201 may be a display screen such as LCD, plasma, LED, etc., that may be configured to change the image it displays based on signals received from the controller 106 or remote device.

Door 110 may be positioned on the top wall 210 of the device 100 more proximate the front wall 202 than the back wall 212. Door 110 may open and close, and may be flush with the top wall 210 of the housing 102 when closed. In other examples, the door 110 may be recessed from the top wall 210 when closed. The door 110 is shown in the example of FIG. 4, to be closed. However, the door 110 may be opened to access the pod receptacle 107 (not shown in FIG. 4) and the alcohol reservoir 108 (not shown in FIG. 4). As such, the alcohol reservoir 108 may be removably coupled to the device 100. The reservoir 108 may have a complementary fluid coupling (e.g., valves or valve interfaces).

Further, the top wall 210 may include a recess 211 for holding various bottles containing alcohol or other fluids. The recess 211 may be positioned behind door 110 closer to the back wall 212 than to the front wall 202. Furthermore, in at least one example, the recesses may light-up, to form a lighting display on the top wall 210 of the device 400.

Figure 5:
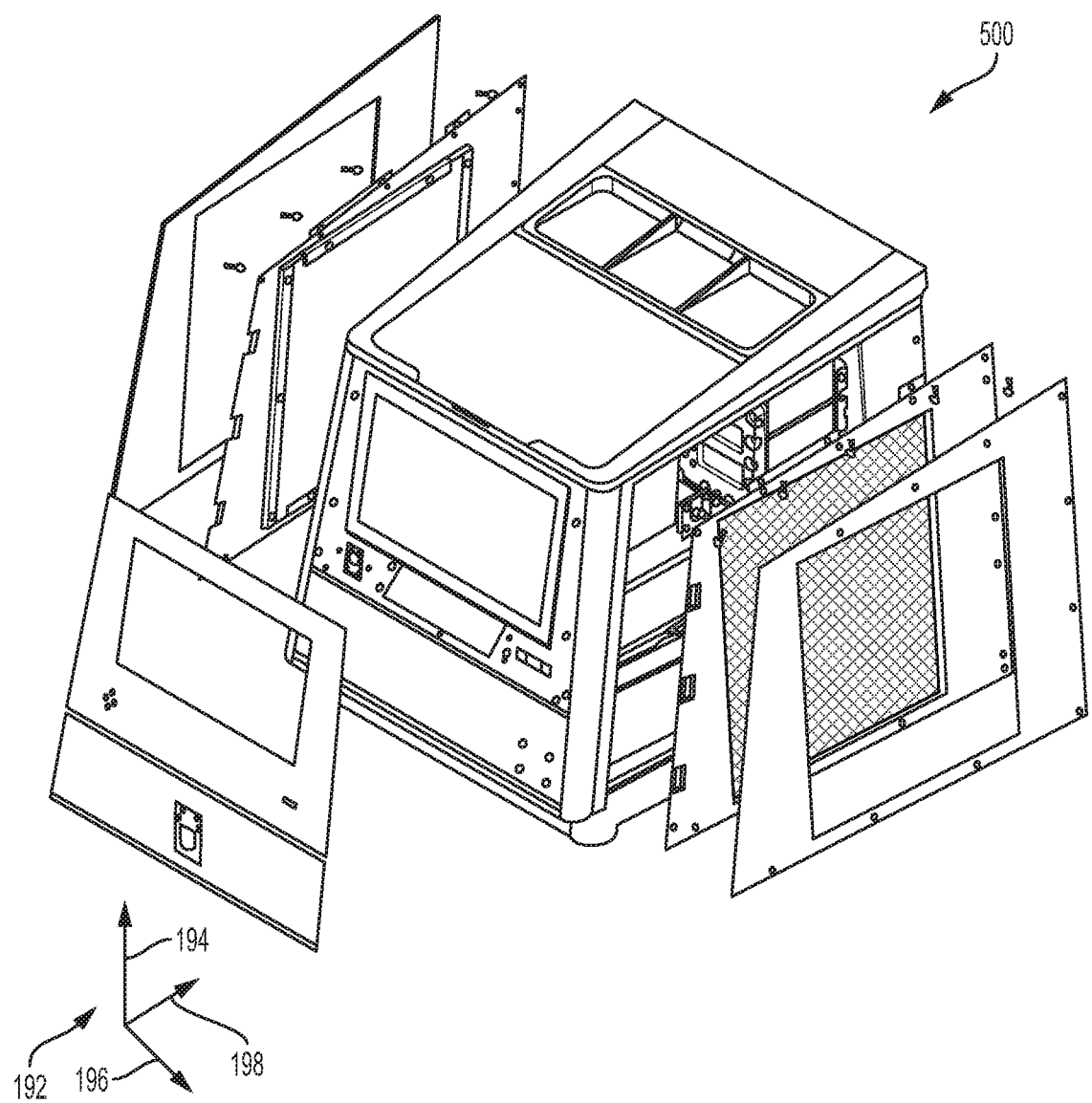
Figure 6:
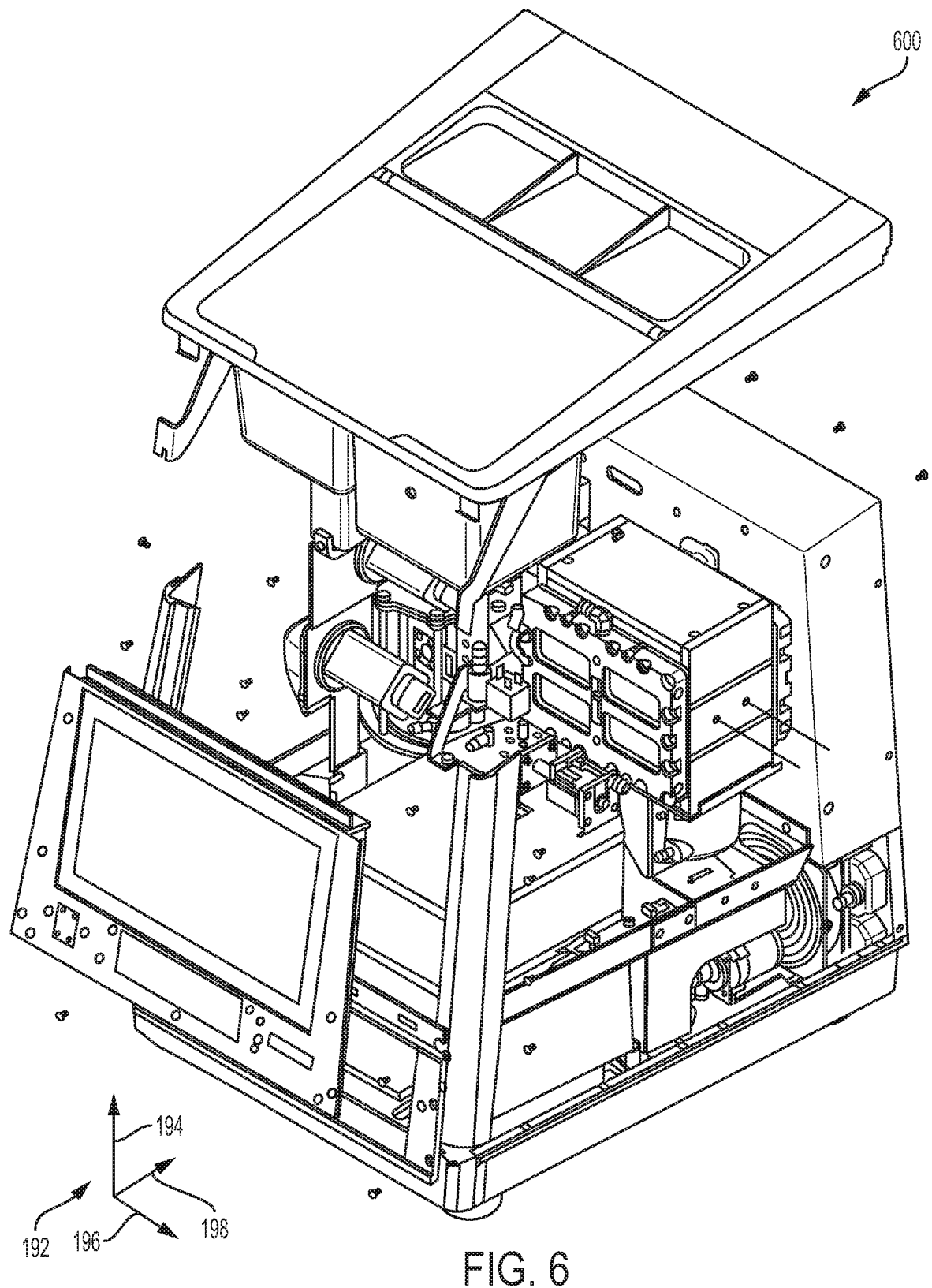

FIGS. 5 and 6 show a second and third exterior front axonometric perspective views, 500 and 600 respectively, of the device 100 shown above in FIG. 1 where the side walls 204, 206 and the front wall 202 of the housing 102 are moved to provide a different view of the device 100.

Figure 7:
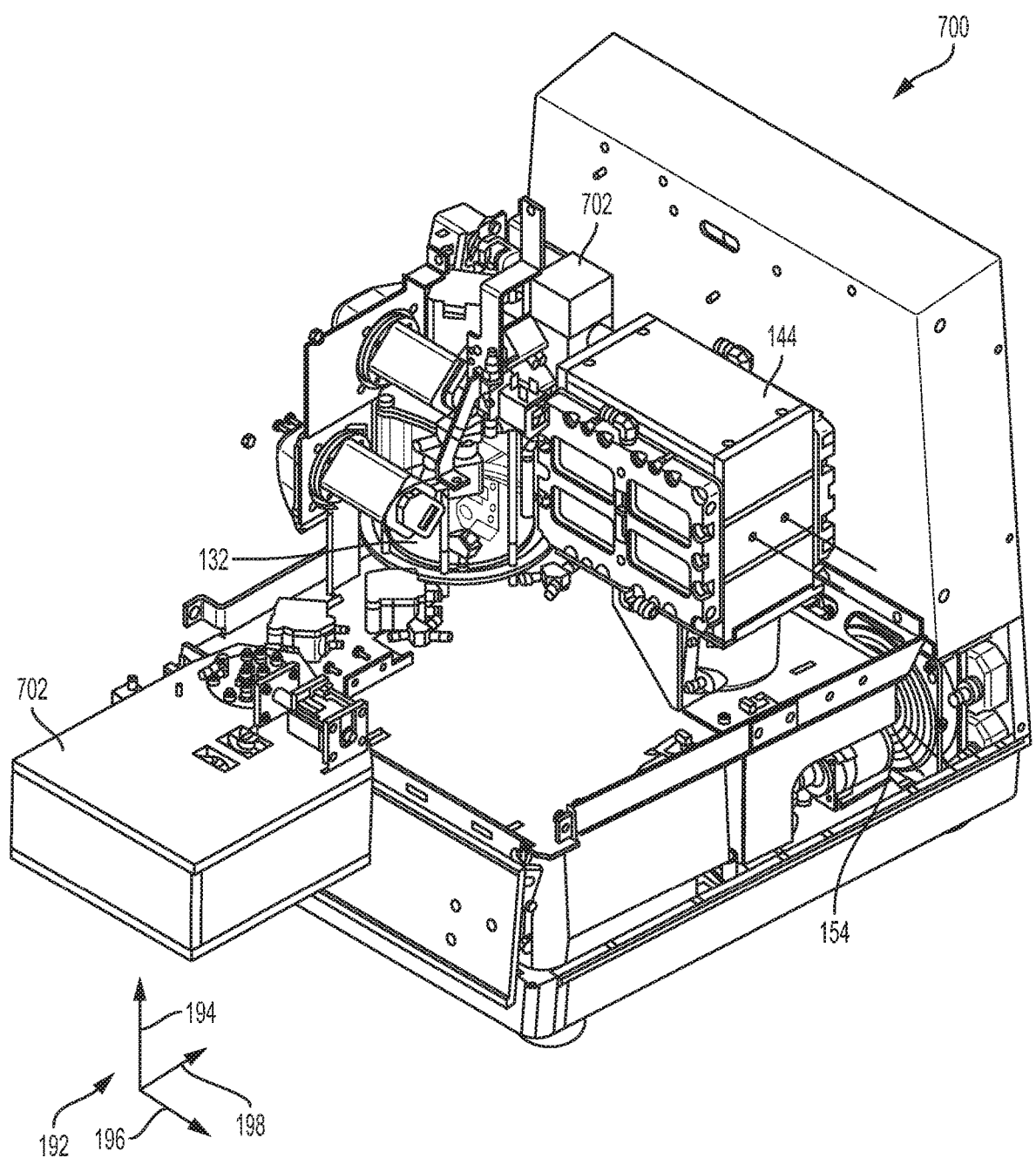

FIG. 7 shows a fourth exterior front axonometric perspective view 700 of the device 100 shown above in FIG. 1 where all of the walls of the housing have been removed to reveal components of the device that are surrounded by the housing 102. For example, fluid dispersion assembly 702, which pumps includes pumps to circulate the gelatin-based fluid through the cooling system comprising the chilling block 144, the mix tank 132, and a radiator fan 154 are viewable. As described above, the gelatin-based mixture may be circulated through the chiller module 144 in at least one example to reduce a temperature of the gelatin-based mixture. In the example shown in FIG. 7, the chilling module 144 includes a plurality of heat exchange assemblies, where each of the heat exchange assemblies include heat exchangers and a thermoelectric device.

Turning now to FIG. 8, FIG. 8 shows a back axonometric perspective view 800 of the device 100 shown above in FIG. 1 and a front axonometric perspective view 802 of the device 100 shown above in FIG. 1, where the housing 102, the mix tank 132, and the chilling block 144 are removed. Thus, the slideable drawer 172 is viewable in view 802, as well as the controller 106. Another view of the controller 106 is shown in view 800 as well as vents 804 for dispersing hot air from the cooling system of the device.

Regarding FIG. 9, FIG. 9 shows a front axonometric perspective view 900 of the pod and alcohol assembly 902 of the device 100. The pod and alcohol assembly 902 includes a pod receptacle 107 and an alcohol reservoir 108, and the pod and alcohol assembly 902 are configured to interlock with a top of the housing 102. The door 110 is a part of the pod and alcohol assembly 902, and the pod and alcohol assembly 902 is held in place by a frame. The door 110 may be rotatable about a hinge 904, which is shown in more detail later, and the door 110 may be in a closed position to cover a pod receptacle 107 and alcohol reservoir 108, or be in an open position to provide access to the pod receptacle 107 and alcohol reservoir 108. In the closed positioned, a lock 914 may engage with the pod spike assembly. In at least one example, this lock 914 may be used to ensure that the door 110 cannot be opened during a mixing step of gelatin production, so that the mixture being made in the pod does not spill outside of the device. The door 110 is shown in an open position in view 900. The pod receptacle 107 includes a back wall 906 and the pod spike 114 (not seen in FIG. 9) for puncturing a pod 112 may be attached to an inner surface of the back wall 906 via an arm 910 that rotates about a hinge. The arm 910 may include a handle portion 912 that is rounded, and the handle portion 912 may enable a user to adjust a height of the pod spike 114 (not seen in FIG. 9). When a position of the pod spike is in the engaged position, a splash guard 1014 of the pod spike assembly may engage with a top wall of a pod being held in the pod receptacle to hold the pod spike 114 in a desired position.

It is noted that the configuration of the pod spike 114 to be attached to a back wall 906 of the pod receptacle may make the pod spike 114 easier to adjust compared to other systems which may configure the pod spike 114 to be attached to the door, for example. The pod and alcohol assembly 902 further includes brackets 908 for attaching the pod and alcohol assembly 902 to the device.

Turning now to FIG. 9, FIG. 9 of the pod and alcohol assembly 902 of the device 100. An exploded view 1002 of view 1000 shows an assembly for the pod spike 114 in more detail. As discussed above, the pod spike 114 is not attached to the door 110 of the pod and alcohol assembly 902. Rather, the pod spike 114 is attached to a back wall of the pod receptacle 107 via a bracket 1004, where the bracket 1004 fits into a corresponding divot formed 1006 that is formed into the back wall of the pod receptacle 107. The assembly for the pod spike 114 includes an arm 1008 that may rotate about a hinge 1011 to adjust a position of the pod spike. For example, after opening the door 110, the arm 1010 of the pod spike assembly may be lifted to enable the pod 112 to be received in the pod receptacle 107. Then, after the pod 112 has been received in the pod receptacle 107, the arm 1010 of the pod spike assembly may be pressed downward until the pod spike 114 punctures the pod 112 through its label seal (i.e., the engaged position). In some examples, the pod spike assembly may lock into place in this engaged position by pushing the arm 1010 of the pod spike assembly downward until the pod spike assembly locks into place. Then, if other initiating criteria are satisfied, then the device 100 may proceed to produce gelatin-based products. To remove the pod 112 following placing the pod 112 in the pod receptacle 107 and adjusting the pod spike 114, the pod spike 114 may be re-positioned by lifting the arm 1010 via handle 1012 of the assembly to remove the pod spike 114 from the pod 112. The pod 112 may then be removed from the pod receptacle.

Turning now to FIG. 10A, FIG. 10A show a front axonometric perspective view 1000 of a pod spike 114. The pod spike punctures the gelatin flavor mix pod, adds hot or cold water into the mix pod, and removes the resulting gelatin mix or slurry from the pod. The pod spike further carries out these functions while simultaneously allowing the pod to rotate during the mixing process but not allowing gelatin to evacuate the pod.

When in the "up" position, where the pod spike is retracted away from the mix pod, the spike mechanism protects the spike tip from damage. When the pod spike is being actuated (inserted into the pod), the pod spike 114 moves in a substantially vertical fashion towards the mix pod and punctures the mix pod without creating a large tear in the pod's plastic seal. When the pod spike 114 is in a fully actuated position, the pod spike 114 may puncture a label seal of the mix pod, and at least a portion of the grooved vents 1016 of the outer tube 1006 may be surrounded by the label seal of the mix pod, and extend both above and below the pod label seal when the spike 114 is in the actuated position.

The pod spike is made up of three main components: the hub 1004, the outer tube 1006, and the inner tube 1008. In at least one embodiment, the inner tube 1008 may be hollow and the inner tube 1008 may be open at both ends. Furthermore, both the outer tube 1006 and the inner tube 1008 may be tapered at an end of the pod spike 114 opposite hub 1004 in order to ensure puncturing of a mix pod label seal while still forming a seal between the mix pod label and the exterior surface of the outer tube 1006 when the pod spike 114 is in an actuated position. Such tapering may further be beneficial to avoid removing a label of the mix pod getting stuck to the pod spike 114 upon retraction of the pod spike 114. The hub 1004 may comprise a hub body 1012 that is substantially T-shaped in cross section. Hub 1004 may further comprise at least one port 1013 for water flow into a mix pod. Additionally or alternatively, the at least one port 1013 of hub 1004 may be utilized for evacuating a mixture from the mix pod.

In at least one example, water from the water tank may be flowed into port 1013 of the hub 1004, out of outer tube 1006, and into the mix pod. It is noted that the water flowed into the mix pod may flow in between the outer tube 1006 and the inner tube 1008 in at least one example. The outer tube 1006 may surround the inner tube 1008 and may be approximately ⅓ the length of the inner tube 1008. Put another way, the outer tube 1006 may only surround a portion of a length of the inner tube 1008. The outer tube 1006 may be used to inject hot and cold water into the pod.

To assist in the injection of water into the mix pod, the vents 1016 on an external surface of the outer tube 1006 (which extend both above and below the pod's plastic seal/label) are vertical grooves formed into the outer tube 1006 of the pod spike 114. The vents 1016 permit air to be released or vented from the pod during a process of flowing water into the mix pod. These vertical grooves 1016 may beneficially prevent pressure build-up and explosion of the pod. The vents 1016 may also facilitate the extraction of gelatin mix from the pod.

Leaking or spraying may further be minimized via the splash guard 1014 mounted on top of the spike. Splash guard 1014 may extend outward from a central axis of the pod spike 114, and a diameter of the splash guard 1014 may be greater than a diameter of both the hub 1004 and the pod spike 114. In at least one example, the diameter of the splash guard 1014 may be approximately a same diameter as a mix pod. The splash guard 1014 may comprise grooves that encircle the splash guard 1014 about a circumference of the splash guard 1014. These grooves may advantageously improve a flexibility of the splash guard 1014. Moreover, a shaping of the splash guard 1014 may help to contain potential overflow within a mix pod holder. In at least one example, splash guard 1014 may comprise silicon or another similar material. Silicon or another similar material may be a beneficial material for the splash guard 1014, as such material may be able to withstand the heat of hot water that may be flowed into the mix pod via the pod spike 114 as well as form a seal against a top cover of a mix pod.

During a production cycle, the mix pod may retain a gelatin mixture, thus the water flowed into the mix pod through the pod spike assembly may be mixed with the gelatin mixture to form a gelatin slurry.

After flowing the water into the mix pod and carrying out a mixing process, the mixture in the mix pod (e.g., a gelatin slurry) may then be evacuated via the inner tube 1008 of the pod spike 114. In particular, the mixture within the pod following introduction of water into the mix pod and mixing within the mix pod may be suctioned out of the mix pod through the inner tube 1008. The mixture suctioned out of the mix pod through the inner tube 1008 may then be flowed to a mix tank for further processing.

Thus, the pod spike 114 may puncture the pod's plastic seal/label and create a small hole in the seal that will prevent or minimize water or gelatin mix from leaking or spraying from the pod during a flowing of water into the mix pod, mixing of the gelatin mix and water within the mix pod, and extraction of the mixed gelatin from the mix pod. The inner tube 1008 of the pod spike 114 is used initially to puncture the pod's plastic seal/label. The end of the inner tube 1018 is designed to create a cutting edge that will puncture the plastic seal/label but will not make a cut that would allow any part of the seal/label to fall into the pod. Then, when the pod mixing process is completed, the inner tube 1008 may be used to extract the resulting gelatin mix from the pod so that it can be transferred to the mix tank for further processing.

Turning to FIG. 10B, FIG. 10B shows a cut-away view 1002 of the pod spike 114. As shown in the cutaway view at FIG. 10B, the hub 1004 comprises a retention device 1020 (i.e., an easy fasten screw cap) to hold the spike in place during operation and to permit removal of the spike for cleaning.

Turning now to FIG. 11, a front axonometric view 2300 of a dispensing manifold of the device 100 is shown. The dispensing manifold 180 includes tubes 2302, 2304 at opposite ends of the dispensing manifold 180, and a plurality of dispensing heads 160 (also referred to as nozzles). Tube 2302 may attach the dispensing manifold 180 to dispensing line 158. Fluids, such as gelatin-based mixtures may be conveyed through the dispensing line 158 and introduced into the dispensing manifold 180 via tube 2302, and then the gelatin-based mixtures may travel through the dispensing manifold 180 and out of the dispensing heads 160 to be evenly distributed into fluid vessels 164 of the device 100. In at least one example, the dispensing manifold 180 may be detachably positioned within the slideable drawer 172, so that the dispensing manifold 180 may be easily removed for cleaning. Specifically, the tubes 2302 and 2304, couple the dispensing manifold 180 in a detachable manner to the device 100 within the drawer 172 to enable easy cleaning of the dispensing manifold 180.

Turning now to FIG. 12A, FIG. 12A shows another view 2400 of a dispensing manifold of the device 100 with the dispensing strainer 101 fixed to the dispensing manifold 180. An inlet port 2406 of the dispensing strainer 101 allows flow through the dispensing strainer 101 and then the flow exits via exit port 2408. The inlet port 2406 is approximately perpendicular relative to a length of the dispensing manifold 180 to which the dispensing strainer 101 is attached, and the exit port 2408 is approximately parallel to the length of the dispense manifold 180. Such a configuration of the dispensing strainer 101 may be advantageous to meet tight packaging constraints.

Turning to FIG. 12B, FIG. 12B shows another view 2402 of the dispensing strainer 101, where the dispensing strainer 101 is detached from the dispensing manifold 180 for viewing purposes.

Regarding FIG. 12C, FIG. 12C shows another view 2404 of the dispensing strainer 101, where the dispensing strainer 101 is detached from the dispense manifold 180 and taken apart for viewing purposes. As may be seen at FIG. 12C, the dispensing strainer 101 comprises a base plate 2416, the base plate including exit port 2408. The dispensing strainer 101 further comprises a filter 2414. Filter 2414 comprises a mesh material for preventing the formation and passage of gummies through the dispensing manifold 180. The filter 2414 is positioned between the base plate 2416 and exterior plate 2410 of the filter 2414. A gasket 2412 is further positioned between the base plate 2416 and the exterior plate 2410 for sealing purposes. As shown in view 2404, the exterior plate 2406 comprises the entry port 2406.

Turning to FIGS. 13A-18, methods are shown for that may be carried out by a device, such as device 101. In at least one example, the methods may be included as non-transitory instructions stored in a memory of a controller of the device, such as controller 106.

In regards to method 2500, method 2500 shows a method for preparing a gelatin-based product (e.g., shots) using a device, such as device 100 shown in FIG. 1 and FIGS. 4-12. As described above, the gelatin based product may be a formed gelatin product including alcohol and referred to herein as a "shot". In other examples, the gelatin based product may not include alcohol. The gelatin-based shot may be formed in a cup or alternative container positioned within the shot-making device, as described above. In one example, instructions for executing method 2500 may be stored on a memory of a controller, such as controller 106 shown in FIG. 1. As such, the controller may execute method 2500 in order to operate the device 100 and prepare the gelatin-based shots.

Method 2500 begins at 2502 by determining if a consumable (e.g., contained in a pod or pod, such as pod 112 shown in FIG. 1) has been loaded into the device. As discussed above, the pod (also referred to herein as a mix pod) may include an indicator, identifier tag, or other electronic label (e.g., microchip) readable by the controller via a scanner mounted within the device (such as scanner 115). Upon scanning a specific pod at the device, the controller may determine that the pod is coupled to the device. For example, upon scanning the pod and then inserting a pod into a pod receptacle (e.g., pod receptacle 107) the controller may receive a signal that the pod has been loaded into the device. In an alternate example, the controller may determine that the pod has been loaded into the device after receiving a signal from a user interface (e.g., user interface 104) indicating that a user has loaded the pod into the device. For example, the signal may include a selection of a recently used pod, a selection from a list of available pods, and/or a manual input of the pod to be loaded into the device. The signal may additionally or alternatively include a selection from the user interface confirming that the pod has been loaded into the device.

If the pod is loaded, the method continues on to 2504 to read the consumable data. The method at 2504 may include analyzing the data read from the identifier tag on a side, bottom, or top of the pod upon scanning the pod. The identifier tag may include information such as the volume of the pod (and how many shots may be made from the pod), the contents of the pod (e.g., flavor), date of manufacture, use by date, and/or the manufacturer. In another example, the identifier tag may provide a way of authenticating the type and manufacturer of the pod. For example, as part of an authentication process, should a pod be determined not to be made by an approved manufacturer, the method may be ended. Such authentication may advantageously ensure that only pods and gelatin mixtures which are known to be compatible with the device may be used, and damage that may occur due to ill-fitting or undesirably formulated gelatin mixes (e.g., mixes that are too sticky to be cleaned by the cleaning modes of the device) may be avoided. In another example, the method at 2504 may include analyzing data stored within a memory of the controller for the selected pod.

Following 2504, method 2500 moves to step 2505 where it is determined whether an operating mode selection has been received. However, it is noted that in examples where a device may only operate to produce gelatin-based products in one mode, step 2505 may not be included. Selection of an operating may be received via a user input. The user input may be received via any one or combination of the manners described above. For example, in some examples, the device may have different operation modes such as a quick prep mode and a ready-to-eat mode.

The quick prep mode, as described above, may be a mode of operating the device that quickly produces the gelatin-based products that are partially set or in a liquid state upon completion of the quick prep operating cycle. The gelatin-based products that are produced by a quick prep mode of the device may then be set in an external device. For example, gelatin-based products that are produced by a quick prep mode of the device may be removed from the device and placed in an external chiller or refrigerator to complete the setting process until the gelatin-based products are ready to eat. A quick prep mode may be advantageous for rapidly producing large quantities of gelatin-based products, as the gelatin-based products are not set within the device and the quick prep cycle may be shortened.

The ready-to-eat mode, as described above, may be a mode operating the device that quickly produces gelatin-based products that are set upon completion of the ready-to-eat operation cycle. Thus, gelatin-based products that are removed from the device that is producing gelatin-based products with a ready-to-eat mode may be gelled and may not require further chilling.

If an operating mode selection has not been received at 2505, then method 2500 includes displaying a request to select an operating mode at step 2507. For example, in embodiments where the device may be operated in a quick prep mode or a ready-to-eat mode when producing gelatin-based products, step 2507 may include displaying a quick prep mode and a ready-to-eat mode as options for selection.

After receiving the operating mode selection at step 2505, at 2506, the method includes determining if the controller has received an alcohol selection from a user via the user interface of the device. In at least one example, the alcohol selection options may include a "no alcohol" option. Thus, a user may utilize the device to make a gelatin-based product that does not have alcohol in it.

If the alcohol selection has not been received, the method may display a request via the user interface display of the device to select an alcohol at 2508. In one example, the device may display a list of available alcohol selections and/or the current type of alcohol loaded into the device.

Responsive to receiving an alcohol selection at step 2506, method 2500 may include pumping alcohol and/or water into the mix tank at step 2509. Following pumping alcohol and/or water into the mix tank at step 2509, method 2500 may include monitoring whether a predetermined total volume of alcohol and/or water has been pumped into the mix tank at step 2510. The predetermined total volume of alcohol and/or water may be based on the user selection at step 2506, as well as information detected from the pod. The volume of alcohol and/or water that has actually been pumped into the mix tank may be based on a pump output of the alcohol pump. For example, a pump such as pump 140 may be used to monitor whether the predetermined total volume has been achieved at step 2510.

If it is detected via the pump that less than the predetermined total volume amount for alcohol and/or water has been pumped into the mix tank at step 2510, method 2500 may proceed to continue filling the mix tank with the alcohol and/or water by continuing to pump the alcohol and/or water into the mix tank at step 2511.

Once the total predetermined volume of alcohol and/or water has been pumped into the mix tank at step 2510, if operating in ready-to-eat mode, method 2500 includes pumping the alcohol and the water from the mix tank through a chilling module and back into the mix tank at step 2512. For example, the alcohol and/or the water may be pumped through a chiller block circuit.

The process of pumping the alcohol and the water from the mix tank, through the chilling module, and back into the mix tank may be part of a pre-chilling process. This pre-chilling process may cool down the alcohol and water to be introduced into the mix tank prior to introducing a gelatin slurry into the mix tank. The pre-chilling process may beneficially both reduce a production cycle time, as well as reduce an amount of bubbles that may form during the mixing process with the gelatin slurry. It is noted that pre-chilling may only be carried out when preparing the gelatin-based product in a ready-to-eat mode.

As a part of the pre-chilling process, method 2500 may include monitoring a temperature of the alcohol and water to determine whether the alcohol and/or water is less than a threshold temperature at step 2513. For example, the first chilling module may comprise a temperature sensor to detect whether or not the alcohol and/or water temperature is less than the threshold temperature. Responsive to determining that the alcohol and/or water temperature is greater than the threshold temperature at step 2513, method 2500 may continue pumping the alcohol and/or water through the first chilling module at step 2514. However, responsive to determining that the alcohol and/or water temperature is equal to or less than the threshold temperature, method 2500 may include pumping the alcohol and/or water back into the mix tank at step 2515.

Moving back to step 2510, responsive to the predetermined total volume being achieved at step 2510, method 2500 may additionally carry out step 2516, which includes determining whether the mix tank is less than a predetermined temperature or whether greater than a threshold period of time has elapsed since the selection at step 2506.

If the mix tank has not reached less than the predetermined threshold temperature and if less than the threshold period of time has elapsed since the selection at step 2506, then method 2500 may include continuing to wait at step 2517 until either of the two conditions at 2516 are met.

Responsive to the tank being less than the predetermined temperature or if greater than the threshold period of time has elapsed since the selection at step 2506, then method 2500 may include adding heated water to a mix pod at step 2518 until a total predetermined volume of heated water has been delivered to the mix pod. The predetermined volume of heated water may be based on information read from the consumable pod. Additionally, the predetermined volume of heated water may be further based on the alcohol selection received at step 2506 of method 2500. The heated water may be added via the pod spike. For example, the heated water may be introduced into the mix pod via an outer tube of the pod spike.

A total volume of heated water added to the mix pod may be monitored at step 2518. Once the predetermined total volume of heated water has been added to the mix pod, mixing may be initiated at 2520. Otherwise, the heated water may be continued to be added to the mix pod at step 2521 until the predetermined total volume of heated water has been added to the mix pod.

Initiating the mixing at step 2520 may include agitating, spinning, or other manipulations of the mix pod to aid in dissolving the gelatin-based mixture held by the mix pod with the heated water. In some examples, the mixing may include rotating the pod.

Rotating the pod may include rotating the pod according to a pre-determined agitation profile for duration. For example, the controller may rotate the pod receptacle which holds the pod via a stepper motor directly coupled to the pod receptacle. In one example, the rotating may include rotating the pod receptacle back and forth at a rotation angle less than 360 degrees, without continuously and repeatedly rotating the pod receptacle by 360 degrees. Further, as described above, a pod may include internal fins positioned along internal sides of the pod to facilitate the mixing and dissolving of the pod dry ingredients with the heated water.

Mixing may be carried out at steps 2522 and 2523 until a predetermined mixing time has expired. The predetermined mixing time may vary based on the pod information captured at step 2504 as well as user input.

Following step 2522, once the predetermined mixing time has expired, the liquid gelatin mixture may be extracted from the mix pod at step 2524. For example, the liquid gelatin mixture (e.g., alcohol and/or water, gelatin-based mixture) may be extracted through the pod spike. The pod spike may comprise an inner tube, for example, and the liquid gelatin mixture may be suctioned through the pod spike via pump assistance.

As mentioned above, the predetermined heated water, water, alcohol, mixing time, etc may be based on information read at step 2504. It is noted that these above parameters may be included in a stored recipe that may be read at step 2504 and may include an amount of water (heated water and/or a combination of heated water and cooler water) for filling the pod and dissolving the dry ingredients. A flow meter attached to a fluid line coupled to the pod spike may measure an amount of water injected into the pod/mixing tank and alcohol flowed into the mixing tank, for example. Alternatively, a pump may be used to directly monitor amounts of liquid pumped throughout the device, as opposed to using a flow meter. As such, the controller may monitor the volume of liquids being moved throughout the device The liquid gelatin mixture extracted from the mix pod at step 2524 may be pumped to the mix tank at step 2525, and method 2500 at step 2525 may further include mixing the liquid gelatin mixture from the pod, the water, and the alcohol together within the mix tank. As one example, the mixing may include actuating a mixing element (such as mixing element 142) disposed within an interior of the mix tank for a duration to mix and combine the fluids within the mix tank to form a mixed liquid gelatin mixture. In another example, the mixing may include flowing the three fluids sent the mix tank around one or more stationary tubes or mixing elements positioned within the mix tank in order to combine the fluids to form the mixed liquid gelatin mixture.

Figure 13A:
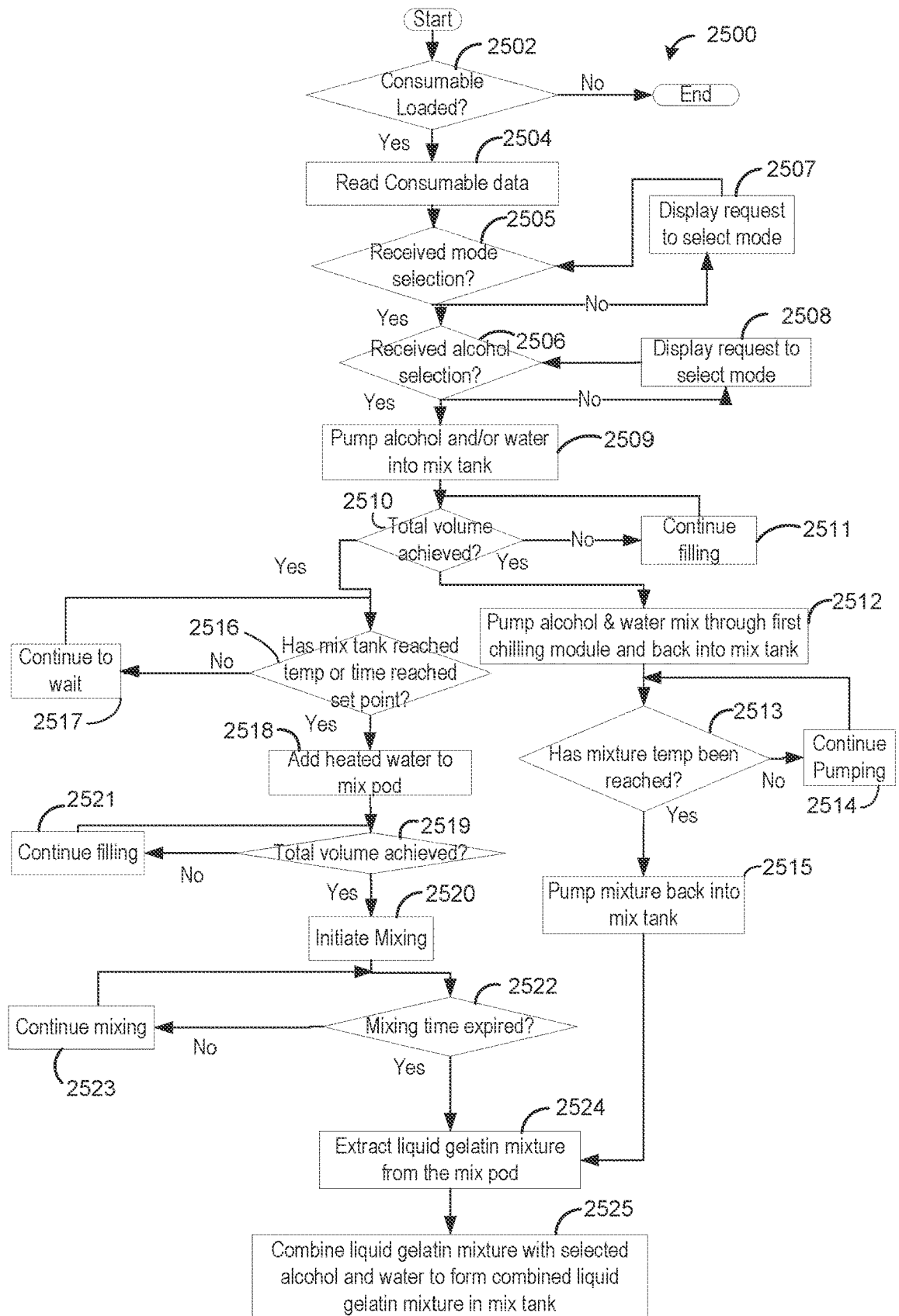
Figure 13B:
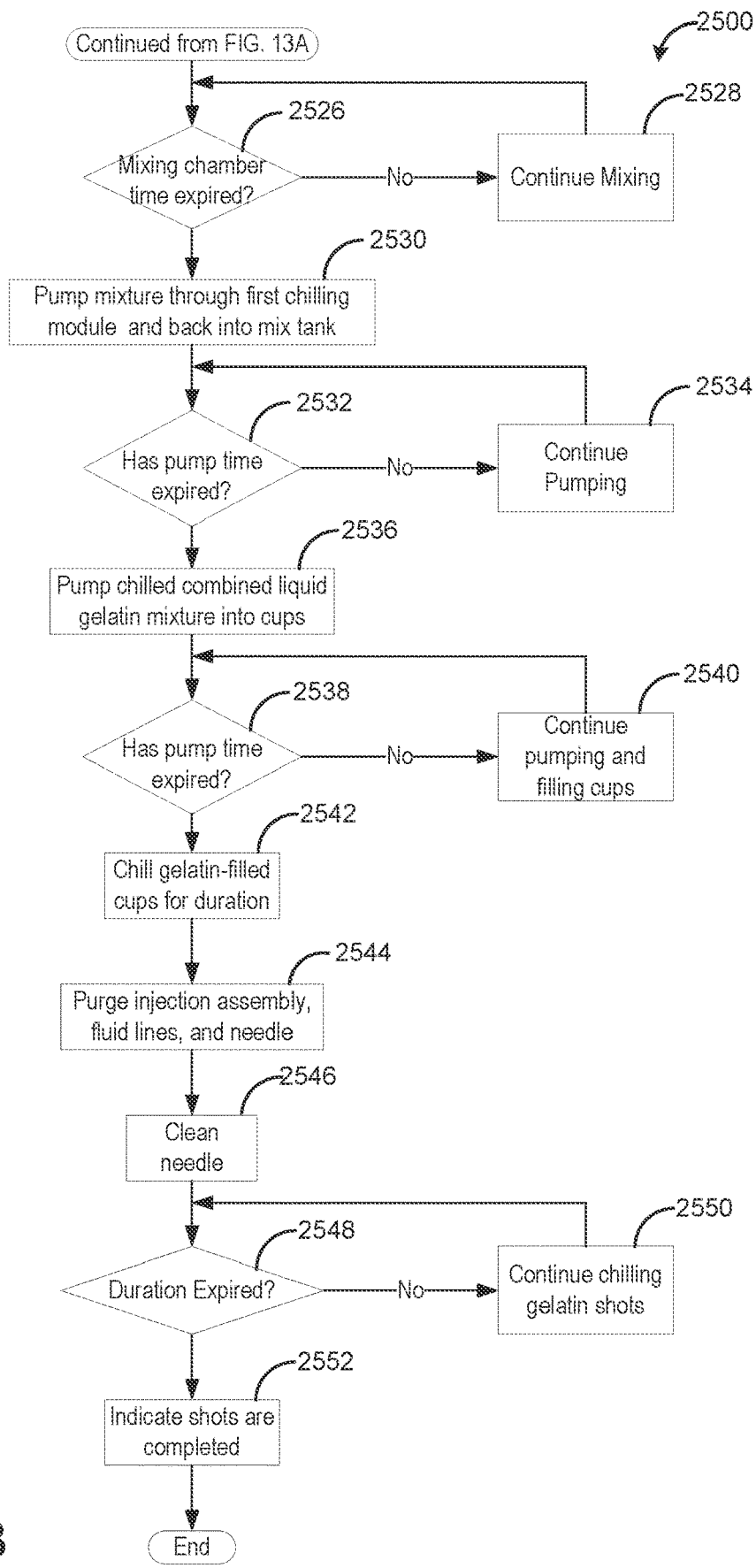
FIG. 13B shows a flow chart that is a continuation of the example method shown at FIG. 13A.

The method then continues to 2526 (as shown in FIG. 13B) to determine if the duration or the mix tank time (for mixing the liquid gelatin mixture from the pod, the water, and the alcohol) has expired. As one example, the mix tank time may be a pre-set value stored within the memory of the controller. As another example, the mix tank time may be selected by the user and/or based on the selected pod (e.g., the contents of the pod and type of alcohol/no alcohol). In this way, mixing times may be adjusted for different types of alcohol. If the mix tank time has not expired, the method continues to 2528 to continue mixing the fluids within the mix tank (e.g., via circulating fluid through the mix tank or continuously actuating the mixing element).

However, if the controller determines that the mix tank time (or duration for mixing) has expired, the method continues to 2530 to pump (e.g., flow via a pump) the combined (e.g., mixed) liquid gelatin mixture through a first chilling module in a ready-to-eat mode. As one example, the first chilling module may include the first chilling module 147 shown in FIG. 1. The method at 2530 may include recirculating the mixing liquid gelatin mixture through a chilling block (e.g., chilling block 144 shown in FIG. 1) of the first chilling module for a duration, or set pump time, using a first pump. The recirculating may include pumping the mixture through the chilling block and back into the mix tank continuously for the duration. At 2532, the method includes determining if the set pump time of the first pump (or duration) has expired. If the pump time has not expired, the method continues to 2534 to continue recirculating the mixture and continue pumping with the first pump. At 2532, if the first pump time has expired, the method continues to 2536 to pump the chilled liquid gelatin mixture to a dispensing manifold (e.g., dispensing manifold 180 shown in FIGS. 1, 11-12C) and into a plurality of cups via the dispensing manifold. Pumping the chilled liquid gelatin mixture to the dispensing manifold 180 may include pumping the chilled liquid gelatin mixture through a dispensing strainer, where the dispensing strainer is positioned upstream of the dispensing manifold 180. Pumping the chilled liquid gelatin mixture through the dispensing strainer prior to the chilled liquid gelatin mixture being conveyed through the dispensing manifold may be advantageous to prevent gelatin gummies from sticking to the components of the device and causing blockages within the device, for example.

As described above, the plurality of cups may be positioned within a tray, the tray removably coupled to a slideable drawer of the device (e.g., tray 168 and drawer 172 shown in FIG. 1). As explained above in reference to FIG. 1, the dispensing manifold may include one or more dispensing heads arranged therein. The dispensing heads may include apertures aligned over a top of the plurality of cups and the liquid gelatin mixture may be flowed (e.g., pumped) into the cups for a fill duration or pump time.

At 2538, the method includes determining if the fill duration of pump time for filling the cups has expired. The fill duration may be based on a size of each cup and/or a number of cups within the cup tray. If the pump time has not expired at 2538, the method continues to 2540 to continue pumping the liquid gelatin mixture into the cups and continue filling the cups. However, if the pump time has expired at 2538, the method continues to 2542 to chill the plurality of gelatin-filled cups for duration. Chilling may include transferring heat from the cups and cup tray via a second chilling module (e.g., chilling module 175) disposed vertically below the drawer.

After the duration for chilling has expired, the method continues to 2544 to purge all fluid from the injection assembly (e.g., dispensing manifold), fluid lines, and/or pod spike (e.g., pod spike of the pod receptacle) of the device and into a drain tank (e.g., drain tank 184) of the device. The method then continues to 2546 to clean the pod spike of the pod receptacle.

At 2548, the method includes determining if the second chilling duration has expired (e.g., determining if a chilling timer has expired). If the chilling timer has not expired, the method continues to 2550 to continue chilling the shots via the second chilling module. Once the chilling duration is complete, the method proceeds to 2552 to indicate that the gelatin-based shots in the cups are complete. The indicating may include displaying a visual indicating on the display screen (e.g., user interface 104 from FIG. 1) of the device and/or emitting an audible signal indicating the shots are complete and ready for consumption.

It is noted that the above method relates to a ready-to-eat mode of operating the device. In examples where the device is operated in a quick-prep mode instead of a ready-to-eat mode, method 2500 may be carried out substantially the same. However, in the quick-prep mode, the mixture at step 2530 may not be pumped through a chilling block. Rather, method 2500 may move from step 2526 directly to step 2536 when operated in a quick-prep mode. Moreover, when operated in a quick-prep mode, the chilling duration at step 2542 may be less than the comparative chilling duration for a ready-to-eat mode.

Figure 14:
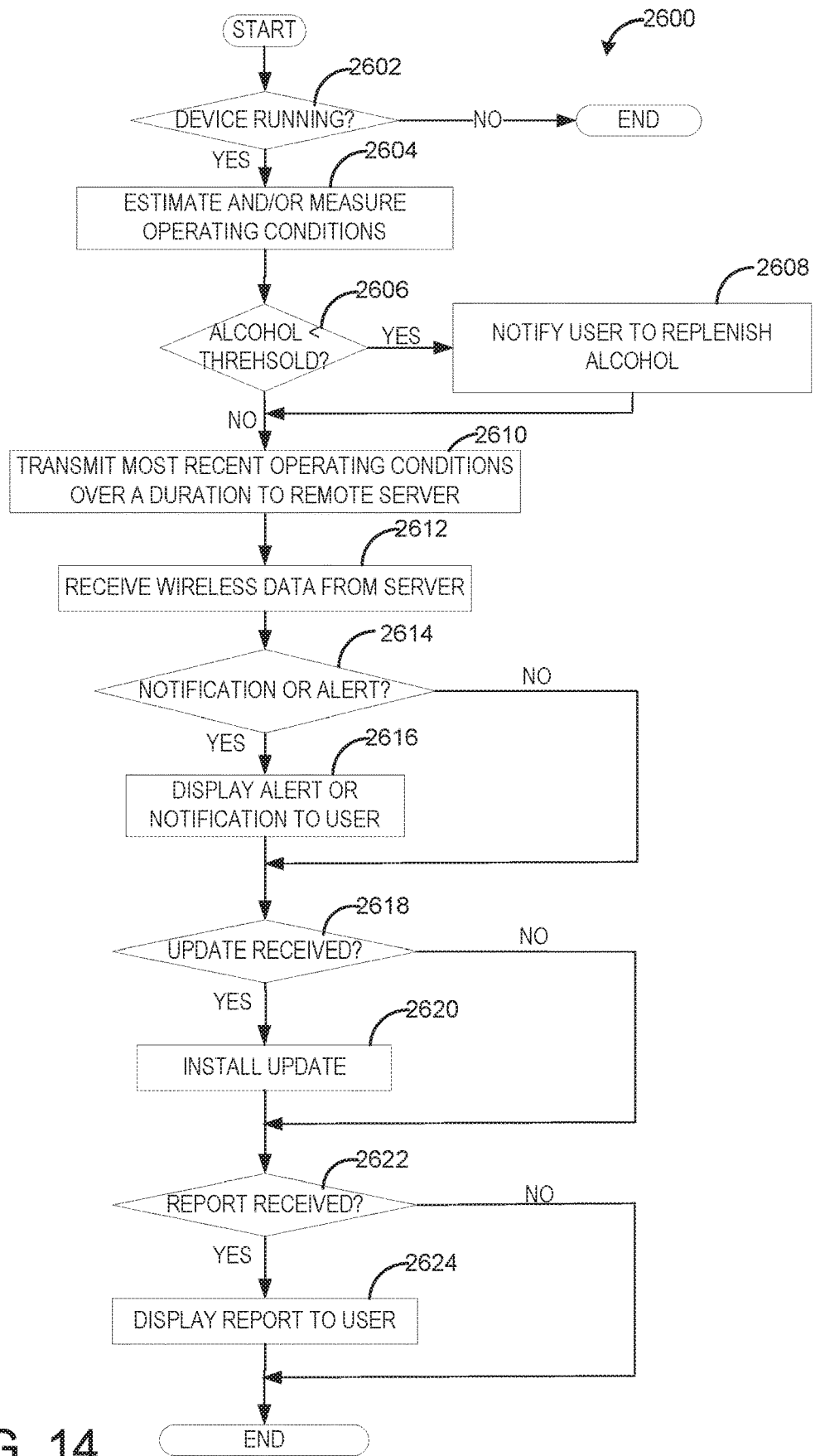

FIG. 14 shows a method 2600 for tracking usage of the device for preparing gelatin-based shots (e.g., device 100). Instructions for executing method 2600 may be stored on the memory of the controller (e.g., controller 106). As such, the controller may execute method 2600 in order to operate the device 100 and track device usage.

Method 2600 begins at 2602 by determining whether the device is currently running (e.g., powered on and/or currently running a shot-making routine, such as the routine described above with reference to FIGS. 13A-13B). If the device is not running, the method ends. Otherwise, if the device is running, the method continues to 2604 to estimate and/or measure engine operating conditions of the device. Operating conditions may include a power-on time of the device, various temperatures received from temperature sensors of the device, various flow rates received from one or more flow meters of the device, positions of device components, and/or liquid levels of one or more liquid reservoirs of the device. Operating conditions may additionally or alternatively include usage data of the device, such as a number of shot-making cycles run, a number of cleaning cycles run, pod usage (e.g., number and types of pods used), an amount and type of each alcohol used, an amount of water used by the device, a number of gelatin-based shots made per day or over a duration, etc.

At 2606, the method optionally includes determining whether the amount of alcohol within the alcohol reservoir is less than a threshold amount or level. As one example, the threshold may be a non-zero threshold that is less than an amount required to make a batch of shots. If the amount or level of alcohol within the alcohol reservoir is less than the threshold, the method continues to 2608 to notify a user to replenish (e.g., fill) the alcohol reservoir. In one example, the notification may include a visual indication delivered via the user interface of the device. In another example, the notification may additionally or alternatively include an audible signal and/or a light indicator on the device.

Alternatively at 2606, if the alcohol level is not below the threshold, the method continues to 2610 to transmit the most recent device operating conditions (which may include the device usage data) to a remote server. As explained above, the remote server may be a remote computer or server, separate from the device that is in wireless communication with the device. The remote server may monitor the functioning and usage of the device through the wireless connection. The remote server may receive and analyze the sent data and may track usage data of the device, as explained above. The remote server may also monitor health and/or functionality data sent via the controller of the device.

At 2612, the method includes receiving wireless data from the server. The data received at the controller from the server may include a notification or alert to replace or repair one or more components of the device, a notification or alert to clean one or more components of the device, a notification or alert request to order one or more fluids or pods for the device, etc. At 2614, the method includes determining whether the controller has received a notification or alert, as described above, from the server. If no notification or alert has been received the method continues to 2618. However, if one or more notifications or alerts are received, the method first continues to 1916 to display the notification or alert to the user via the user interface of the device. The method then continues to 2618 to determine if an update has been received at the controller from the remote server. If an update, or a request to update the device, is received, the method continues to 2620 to install the received update. The update may include an update to instructions for operating the device or an update to one or more parameters for operating the device, stored within the memory of the controller.

At 2622, the method includes determining whether a report has been received at the controller from the remote server. The report may include one or more of an activity or usage report generated by the server based on the operating conditions and/or usage data sent to the server from the device. For example, the report may include details to the duration of use of the device, a number of batches of shots (or total shots) prepared by the device over a duration (e.g., per day, week, month, etc.), an amount of each type of alcohol used, a number of each type (e.g., flavor and/or size) of pod used by the device, etc. If the report is received at 2622, the method continues to 2624 to display the report to the user (e.g., via the interface). In this way, a user may track the usage of the device and may make informed decisions on ordering components, pods, and/or fluids for use with the device. This may increase an ease of use and efficiency of use for an owner of the device.

Figure 15:
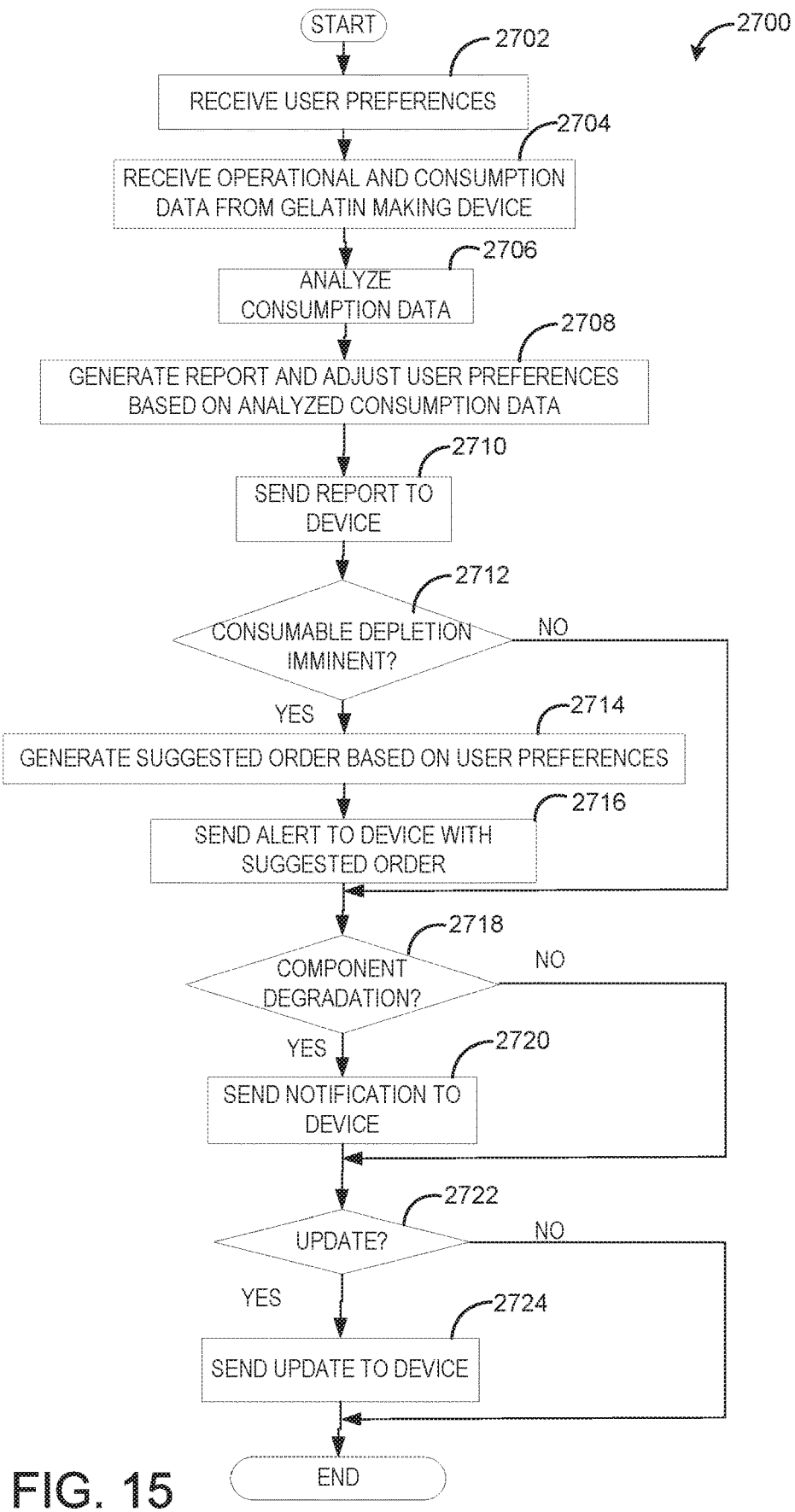

Turning to FIG. 15, a method 2700 is shown for analyzing usage data of a device, such as device 100 described above. Method 2700 may be executed by a processor of a remote server device (e.g., such as a remote computer, as introduced above in the description of FIG. 14) in electronic communication with the shot-making device. Method 2700 begins at 2702 where the remote server receives one or more user preferences. The server may receive the user preferences directly from a user or from the shot-making device via the user interface of the device. The user preferences may include a desired alcohol type, a desired final percentage alcohol of the shots, a desired pod flavor, etc. At 2704, the server received operational and consumption data (e.g., usage data), such as the operational and usage data described above with reference to FIG. 15, for the gelatin shot making device. At 2706, the method includes analyzing the received consumption data (e.g., usage data). The method at 2708 includes generating a report based on the received data and adjusting user preferences based on the analyzed consumption data. As explained above, the report may include one or more of an activity or usage report generated by the server based on the operating conditions and/or usage data sent to the server from the device. For example, the report may include details to the duration of use of the device, a number of batches of shots (or total shots) prepared by the device over a duration (e.g., per day, week, month, etc.), an amount of each type of alcohol used, a number of each type (e.g., flavor and/or size) of pod used by the device, etc. The method then proceeds to 2710 to send the generated report(s) to the shot-making device.

At 2712, the method includes determining whether a consumable depletion is imminent. For example, based on the received usage data and stored inventory information (e.g., an amount of pods and/or alcohol available for use in the gelatin shot-making device), the server may determine whether an inventory of pods or alcohol (e.g., certain types of alcohol) are running low and need to be re-ordered. If consumable depletion of one or more of the consumables used in the device is imminent, the method continues to 2714 to generate a suggested order based on user preferences. At 2716, the method includes sending an alert (e.g., via sending an indication to the user interface or an audible alert) to the device with a suggested order.

At 2718, the method includes determining whether one or more of the components of the gelatin shot-making device are degraded. The server may determine degradation of one or more of the device components based on the received operation and/or usage data from the device. For example, the server may receive various temperature, pressure, and flow rate signals from the device that may indicate a level of component degradation. If component degradation is indicated, the method continues to 2720 to send a degradation notification to the device.

At 2722, the method includes determining whether an update to the device is available and/or whether the device has been updated since a last available update. If an update is available or needed, the method continues to 2724 to send an update to the device.

In one representation, a device for preparing a gelatin-based product may comprise a mix tank, a first liquid reservoir fluidly coupled to the mix tank that delivers a first liquid to the mix tank, a second liquid reservoir fluidly coupled to the mix tank that delivers a second liquid to the mix tank, and a dispensing manifold that receives the first liquid and the second liquid from the mix tank and dispenses the first liquid and the second liquid received from the mix tank into one or more fluid vessels. The device of claim 1, where the first liquid is a gelatin slurry. In one embodiment, the gelatin slurry comprises a mixture of water and a gelatin-based powder. Additionally or alternatively, the first liquid reservoir may be a mix pod. In another example device which may include any one or combination of the above features, the first liquid and the second liquid that are mixed in the mix tank are conveyed through a dispensing strainer prior to the first liquid and the second liquid that are mixed in the mix tank being dispensed to the one or more fluid vessels.

Figure 16:
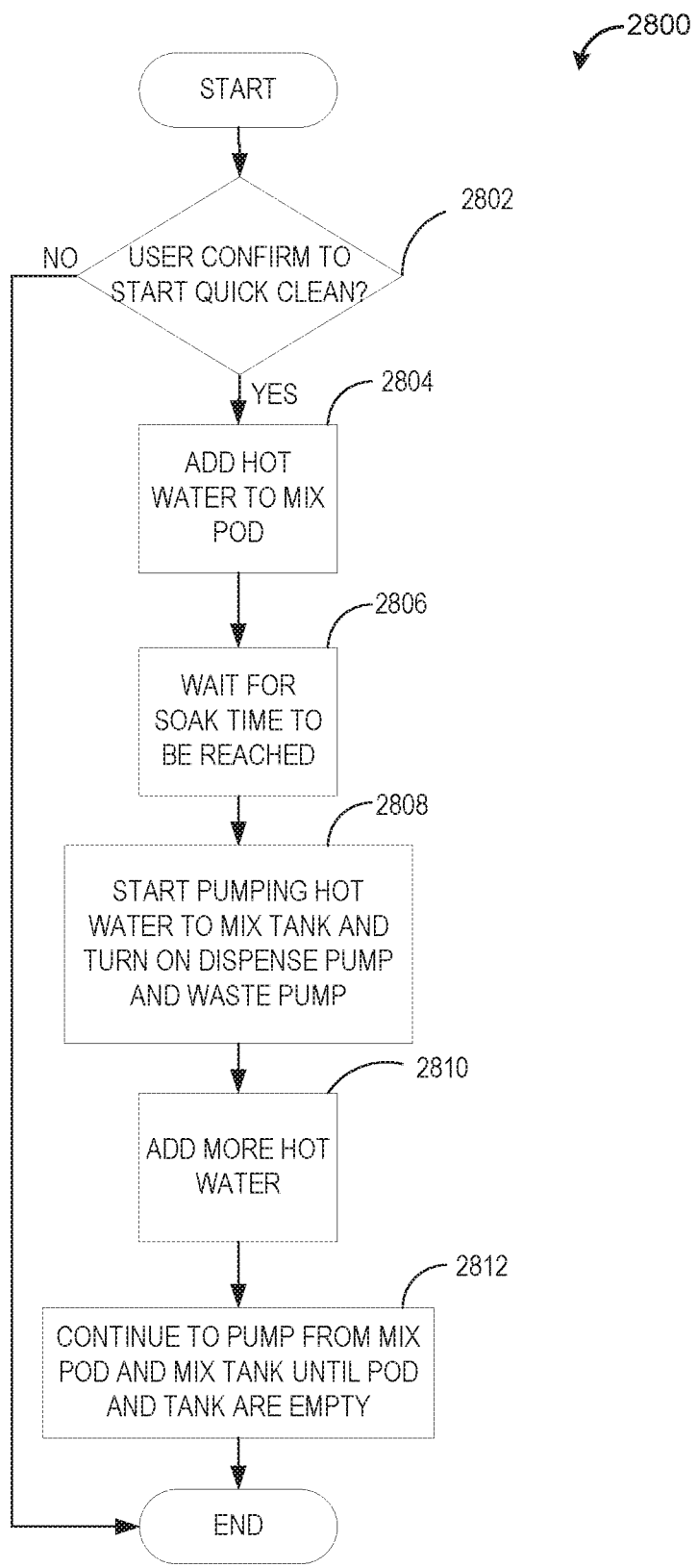
Figure 17:
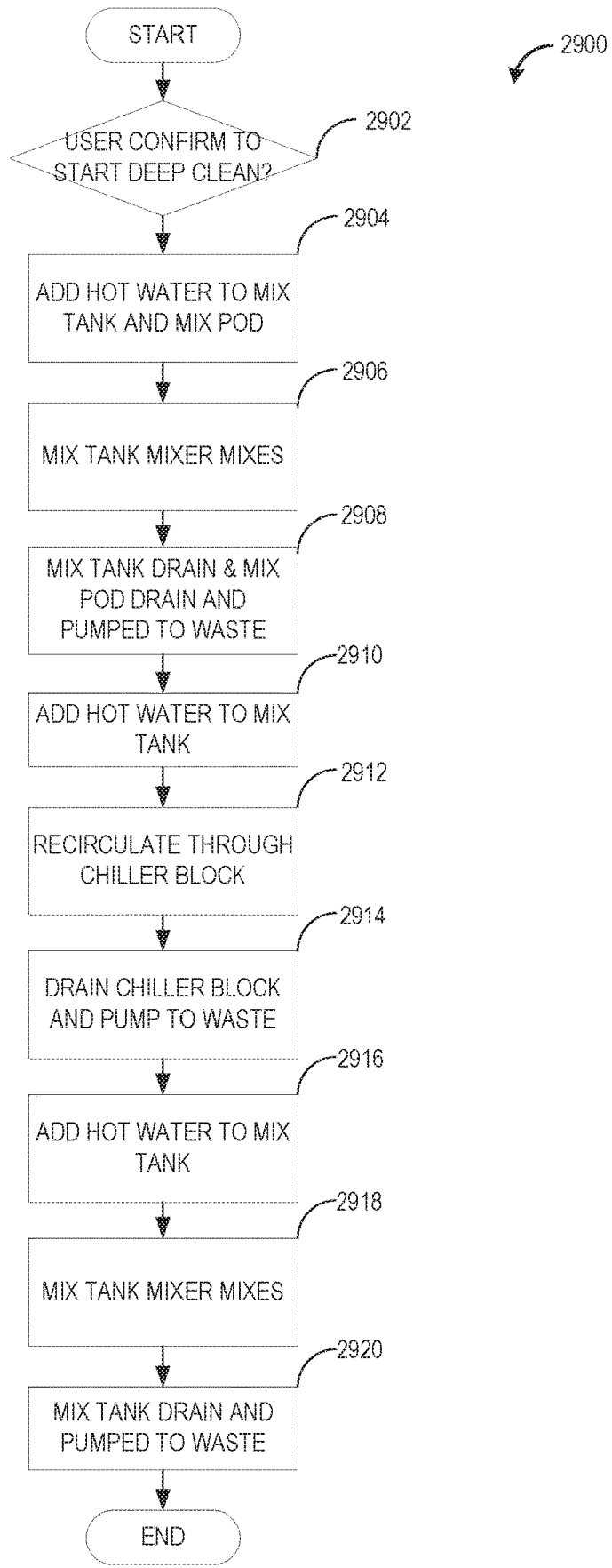
Figure 18:
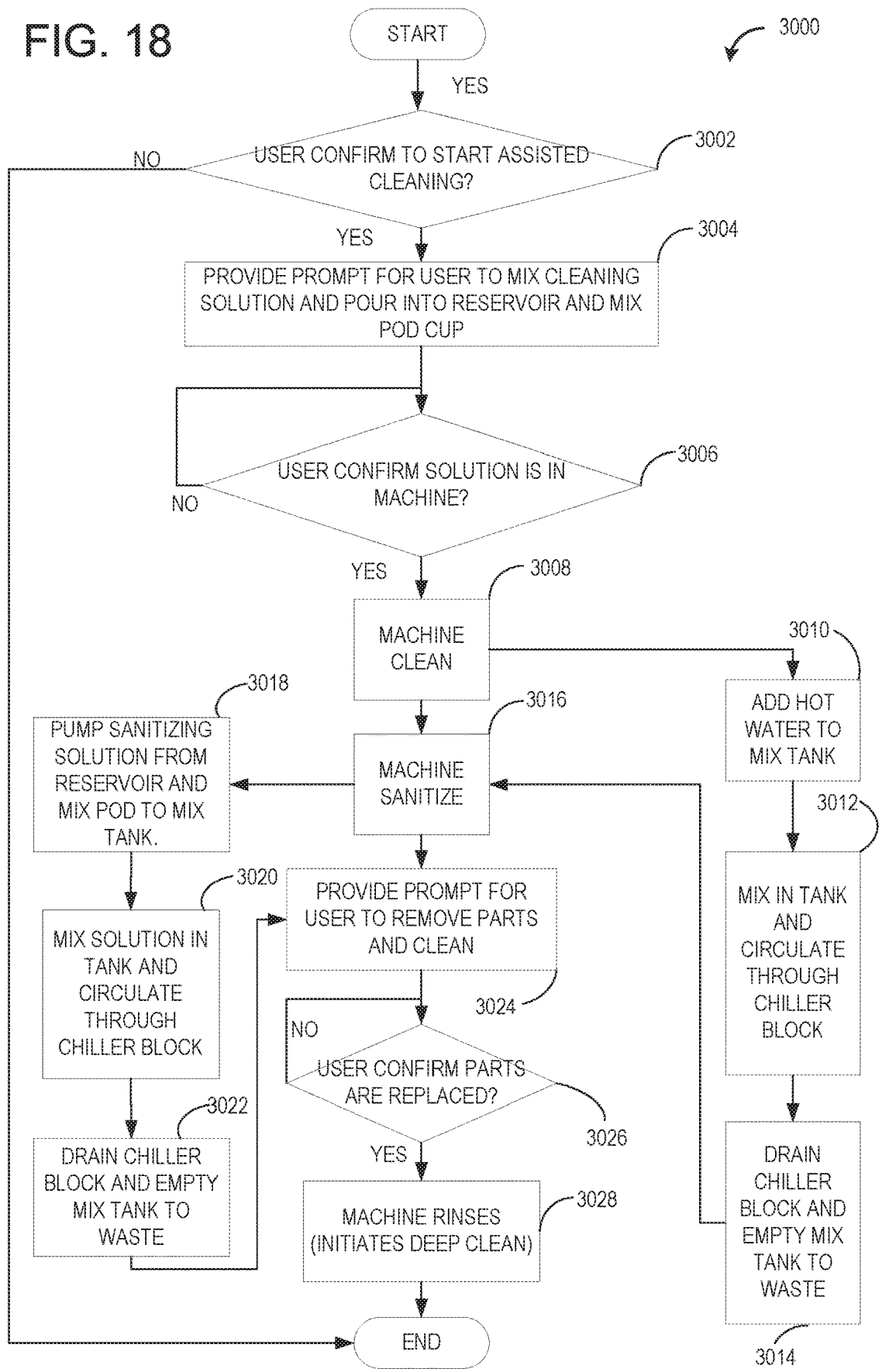

Turning now to FIGS. 16-18, FIGS. 16-18 show flow charts for various cleaning methods that may be carried out by the device. As in the methods shown at FIGS. 13A-15, the methods may be stored as instructions in non-transitory memory of a controller of the device, such as controller 106.

The device as described herein may store instructions for several different cleaning sequences. Some of these different cleaning sequences may occur as an integrated part of the gelatin making process, whereas others may be standalone operations. Examples of different cleaning sequences may include a deep cleaning sequence, an assisted cleaning sequence, a quick cleaning sequence, failover cleaning sequences, a quick-prep cleaning sequence, and a ready-to-eat cleaning sequence.

It is noted that the temperatures of the water, as well as the time thresholds (e.g., soak time thresholds) may be adjusted based on various factors. For example, a temperature of the water used in the cleaning sequences and/or the time thresholds may be adjusted based upon a particular flavor of a mix pod that has been used since the last cleaning process. Thus, a temperature and time thresholds of a quick cleaning sequence may vary based upon a flavor of a mix pod used in the quick cleaning sequence, for example. The ability to alter the time thresholds and/or the temperature of the water used may advantageously ensure that any residual flavor that may have been imparted from a mix pod is removed while still avoiding using excess heat or time in for flavors that may not impart as strong of a flavor. Additionally or alternatively, the time thresholds and/or the temperature of the water used may be adjusted depending upon an alcohol type used in the device for a production cycle.

For example, a deep cleaning may be a full internal system clean to remove any solid materials from the system without sterilizing the system. Performing a deep clean of the device without sterilizing the device may provide a manner in which to clean the device in an energy efficient manner, since sterilization temperatures are substantially high. A deep cleaning sequence can be initiated by the user via the maintenance menu displayed on a display of the device, in at least one example. The deep cleaning sequence may be automatically initiated at each machine shutdown if the machine has been used for making shots and has not been otherwise cleaned using a deep cleaning or an assisted cleaning sequence.

An assisted cleaning sequence may be initiated by the user via the maintenance menu displayed via the display of the device and may be designed to clean and sterilize all the food contacting surfaces and splash zones. The user may be prompted to remove specific parts to clean and sterilize and to wipe down the splash zone surfaces with cleaning/sterilizing solution as a part of the assisted cleaning sequence.

A quick cleaning sequence may clean/clear out the pod spike and rinse the mix tank. The quick cleaning sequence may beneficially help to prevent gelatin blocking or restricting the pod spike or tube from the pod spike to the mix tank, while being carried out in a short period of time. In at least one example, a quick cleaning sequence may be carried out automatically following a quick-prep production cycle. During a quick cleaning sequence, hot water is not circulated through a chiller block.

On the other hand, during a deep cleaning sequence, the pod spike, the mix tank, and the chiller block are all cleaned. Further, a water temperature used in a deep cleaning sequence is higher in temperature than a water temperature used in a quick cleaning sequence to ensure the removal of gelatin residue. A deep cleaning sequence may be performed automatically following a ready-to-eat production cycle, in at least one example.

Failover cleaning sequences may be cleaning sequences that occur in the event of operational failure, such as operational failure during a production cycle. Operational failure may include one or more of power loss, user error, or component degradation (e.g., pump failure or clogging in the passages).

In at least one example, operational failure due to component degradation may be determined based upon detected water pressure within the device, where the water pressure may be detected via one or more pressure sensors positioned within flow passages of the device that may provide an output to a controller of the device. For example, if a pump is degraded, then water pressure within the device may decrease below a desired threshold even when the pump is being operated. As another example, if clogging has occurred within a passage or filter of the device, then a detected water pressure may be greater than a desired threshold.

There may be multiple failover, or abort, cleaning sequences that may occur in the event of an operational failure such as user error or power loss. For example, there may be a quick prep failover sequence, a ready-to-eat failover sequence, and a ready-to-eat failover sequence that are adapted to clean the device in case of a failure during these different production cycles.

The failover cleaning sequences may beneficially purge all gelatin material from the machine and to clear the pathways enough so that the machine can perform a deep clean or an assisted clean once the failover event has been cured. Moreover, a power failure cleaning sequence is triggered during a ready-to-eat sequence if power is interrupted and the chiller block needs to be cleared. Otherwise, the normal abort cleaning sequence is initiated. Furthermore, in at least one example, during idle time, the dispensing manifold is positioned above the waste tray so that in the event of a sequence or power failure the dispensing manifold does not need to move to allow evacuation of cleaning waste into the waste tray.

In addition to the above example cleaning sequences, there may also be cleaning sequences built into both the quick prep and the ready-to-eat production sequences. For example, the cleaning sequence at the end of the quick prep sequence may maintain clear pathways and clear residual gelatin slurry/mix to avoid flavor contamination when making successive gelatin batches using different gelatin flavors.

Regarding the ready-to-eat cleaning sequence, similar to the quick prep cleaning sequence, the ready-to-eat cleaning sequence may maintain clear pathways, clear residual gelatin slurry/mix to avoid flavor contamination, and prepare the system for the next ready-to-eat sequence. However, in comparison to the quick-prep mode, the ready-to-eat cleaning sequence includes a full flushing of the device that is more thorough than the quick-prep mode, as the ready-to-eat mode is more prone to clogging because the gelatin-based shots are fully chilled. Moreover, the ready-to-eat cleaning sequence may generate significant heat build-up in the system due to the chilling step. Thus, the ready-to-eat cleaning sequence includes steps to dissipate this heat. The ready-to-eat cleaning sequence also provides the time required for the dispensed gelatin to set to an acceptable "ready to serve". Moreover, during the ready-to-eat cleaning sequence, cleaning the chiller block may lead to the generation of bubbles. Thus, water is periodically sprayed into the mix tank during a ready-to-eat production cycle to reduce an amount of bubbles.

Turning now to FIG. 16, FIG. 16 shows a flow chart of a quick clean method 2800. Method 2800 begins at step 2802, where a user confirms whether or not to proceed with a quick clean mode. In at least one example, the user may confirm whether or not to proceed with a quick clean mode by providing an input to the device. However, in other examples, method 2800 may not include step 2802, and the quick clean mode may instead be carried out automatically without receiving a user input. For example, the device may automatically carry out the quick clean mode following each gelatin product cycle or following a threshold number of gelatin product cycles. In another example, the device may automatically carry out the quick clean mode responsive to exceeding a threshold time period. The quick clean mode may clean/clear out the pod spike and to rinse the mix tank. This may help to prevent gelatin blocking or restricting the pod spike or tube from the pod spike to the mix tank.

Following step 2802, method 2800 may include adding hot water to the mix pod. After step 2802, method 2800 may include waiting for a soak time to be reached at step 2806. During step 2806, where a soak time is waiting to be reached, the hot water that was added to the mix pod at step 2804 may not be pumped out of the mix pod. Rather, the hot water may be contained within the mix pod in order to dissolve residual product that be remaining in the mix pod from a previous production cycle.

Once the soak time has exceeded a threshold soak time at step 2806, method 2800 may include pumping the hot water from the mix pod to the mix tank and turning on the dispense pump and the waste pump to flush the lines in the device that are in contact with the gelatin mixture during a production cycle at step 2808. In at least one example, the hot water may be at approximately 190° F. It is noted that the activation of the dispense pump and the waste pump causes the hot water being pumped out of the mix pod to be directed to a waste tray. Additionally or alternatively, the activation of the dispense pump and the waste pump may cause the hot water being pumped out of the mix pod to be directed to a waste drain, where the hot water flowed to the waste drain is flowed out of the device and into a waste system.

As the hot water from the mix pod is starting to be pumped to the mix tank and out of the device via one or more of a waste tray and a waste drain via activation of the dispense pump and the waste pump, more hot water may be added to the mix pod at 2810.

The addition of more hot water to the mix pod at step 2810 may ensure that the device is thoroughly flushed.

Following step 2810, step 2812 of method 2800 may include continuing to pump the hot water from the mix pod and the mix tank until the mix pod and the mix tank are empty.

Turning now to FIG. 17, FIG. 17 shows a flowchart of a deep clean method 2900. Method 2900 may include where a user confirms whether or not to proceed with a deep clean mode. In at least one example, the user may confirm whether or not to proceed with a deep clean mode by providing an input to the device. However, in other examples, method 2900 may not include step 2902, and the deep clean mode may instead be carried out automatically without receiving a user input. For example, the device may automatically carry out the deep clean mode following a threshold number of gelatin product cycles. In another example, the device may automatically carry out the deep clean mode responsive to exceeding a threshold time period. It is noted that in examples where the deep clean mode is carried out automatically, the threshold number of gelatin product cycles that are carried out prior to triggering the deep clean mode is greater than the threshold number of gelatin product cycles that would be required to carry out a quick clean mode. The threshold time period for automatically carrying out a deep clean of the device would also be greater than the threshold time period for automatically carrying out a quick clean of the device.

Following step 2902, step 2904 of method 2900 may include adding hot water to the mix tank and the mix pod of the device. In at least one example, the temperature of the hot water may be approximately 170° F. The hot water may be pumped to the mix tank and the mix pod of the device from the water tank, for example. After adding the hot water to the mix tank and to the mix pod at step 2904, method 2900 may include performing mixing in the mix tank at step 2906.

In particular, at step 2906, the hot water that was pumped into the mix tank is agitated via a mixer of the mix tank. Thus, gelatin residue from previous production cycles may be better dissolved for removal.

Following step 2906, step 2908 of method 2900 includes draining the mix tank and the mix pod by pumping the hot water out of the mix tank and the mix pod to waste (e.g., a waste drain or a waste tray). Then, after draining the hot water out of the mix tank and the mix pod to waste, method 2900 may include adding hot water to the mix tank again at step 2910. For example, hot water may be pumped to the mix tank from the water tank to the mix tank at step 2910. Then, after the hot water has been re-introduced to the mix tank at step 2910, method 2900 may recirculate the hot water from the mix tank through the chiller block at step 2912. In at least one example, hot water from the mix tank may only be recirculated through the chiller block after steps 2904-2910 of method 2900, with no gelatin production between steps 2904-2910 and the step of recirculating water from the mix tank to the chiller block. This may help to prevent gelatin from being carried out of the mix tank and into the chiller block, which could block the passages in the chiller block.

Following step 2914, hot water from the chiller block is pumped to waste. Then, following step 2914, hot water is added once again to the mix tank at step 2916, the mix tank mixes the hot water received at step 2916 at step 2918, and then the hot water from the mix tank is drained and pumped to waste at step 2920. By performing a third flushing cycle with the mix tank, following circulation of hot water between the chiller block and the mix tank may beneficially act as a final cleaning step for the mix tank to ensure that there is no residual gelatin.

Turning now to FIG. 18, FIG. 18 shows a flowchart of a method for an assisted cleaning mode 3000. The assisted cleaning sequence may be initiated by the user via a maintenance menu provided via a display of the device and may clean and sterilize all the food contacting surfaces and splash zones of the device. As part of the assisted cleaning sequence, the user may be prompted to remove specific parts to clean and sterilize and to wipe down the splash zone surfaces with cleaning/sterilizing solution. In at least one example, the sterilizing chemical solution used in the sequence may consist of quaternary ammonium (Stermine—1-G tablets, dimethyl benzyl ammonium chloride dihydrate). This cleaning agent may be advantageous in that it does not attack a coating that may be used on aluminum of the device and in that it does not impart any flavor to the gelatin mix.

During the assisted clean, the user is prompted to mix the cleaning solution and add it to the alcohol reservoir and to the pod receptacle. The machine performs an initial normal cleaning sequence and then uses the cleaning solution to sterilize itself before a final rinse cycle (e.g., using the deep clean sequence). During the assisted clean sequence, the user is prompted to remove specified items from the machine for further cleaning and sterilization.

Method 3000 may begin at step 3002, where a user may confirm whether or not to start the assisted cleaning mode. For example, a display may be provided via the device asking a user to confirm whether or not to proceed with a user assisted cleaning mode. The user may confirm via a user input received at the device (e.g., via a touchscreen) whether or not to proceed with the assisted cleaning mode. If the user does no confirm to proceed with the assisted cleaning mode, then method 3000 may proceed to end. If the user does confirm to proceed with the assisted cleaning mode, then method 3000 may include providing a display at 3004 asking a user to mix cleaning solution and pour the mixed cleaning solution into a reservoir (e.g., the alcohol reservoir of the device) and pod receptacle of the device.

The device may continue to display the request for the user to mix cleaning solution and pour the mixed cleaning solution into a reservoir and pod receptacle of the device until receiving a user input. The display may further include a selection option for a user to either confirm that the mixed solution is in the machine (e.g., that the mixed solution is in the reservoir and the pod receptacle) or to cancel the assisted cleaning.

Following step 3004, user confirmation that the solution is in the machine (e.g., in the reservoir and in the mix pod cup) may be received at step 3006. Following receiving user confirmation that the solution is in the machine at step 3006, method 3000 may initiate a machine clean, which includes adding hot water to the mix tank at step 3010, mixing the hot water in the mix tank and circulating the hot water through the chiller block at step 3012, and then draining the chiller block and emptying the mix tank to waste at step 3014.

Following draining the chiller block and emptying the mix tank to waste at step 3014, method 3000 may include initiating a machine sanitizing cycle at step 3016. During the machine sanitizing cycle, sanitizing solution is pumped from the reservoir and the mix pod to the mix tank at step 3018, the solution is mixed in the mix tank and circulated through the chiller block at step 3020, and then the chiller block and the mix tank are emptied to waste at step 3022. Thus, both the mixing tank and the chilling block may be advantageously cleaned in place without requiring a user to remove these components of the device for cleaning purposes.

Following step 3022 of method 3000, method 3000 may include providing a display asking a user to remove and clean parts of the machine. In particular, the user may be prompted to remove, clean, and replace any one or combination of the pod spike, pod receptacle, alcohol reservoir, shot tray holder, waste tray, and the dispensing manifold.

After prompting the user to remove, clean, and replace parts at step 3024, method 3000 may include providing a prompt asking a user to confirm that the parts are replaced at step 3026. Following receiving confirmation from the user that the parts have been replaced at step 3026, method 3000 may include performing a machine rinse at step 3028, which includes carrying out the sequence described at method 2900 for performing a deep clean.

As discussed above, a power management system may be in the form of instructions stored in non-transitory memory of the controller of the device, and the power management system may optimize a usage of power for sub-systems that consume power.

In one representation, a device for preparing a gelatin-based product may comprise a pod receptacle adapted to receive a removable pod and including a door with a pod spike coupled to an interior surface of the door, a mix tank spaced away from the pod receptacle and fluidly coupled to the pod spike and a first liquid reservoir, a first chilling module fluidly coupled to the mix tank, a slideable drawer including a tray including a plurality of slots for receiving a plurality of fluid vessels, and a dispensing manifold fluidly coupled to the first chiller module and positioned vertically above the drawer. The above device may further comprise a second chilling module positioned below the drawer and may include a chilling device and a heat exchanger. In any one or more combinations of the above embodiments of the device, the first chilling module may include a chilling device and a heat exchanger, where the heat exchanger may be positioned on a first side of the chilling device and where the chilling device may be positioned between the heat exchanger and a liquid gelatin interface on a second side of the chilling device. In any one or more combinations of the embodiments of the above device, the chilling device may include a plurality of thermoelectric chips. In any of one or more combinations of the above embodiments of the device, the first chilling module may further include a first pump fluidly coupled with the mix tank and a second pump fluidly coupled with the dispensing manifold. Any one or more combinations of the above embodiments of the device may further comprise a hot water tank positioned on a side of the mix tank opposite the first chilling module. In any one or more combinations of the embodiments of the above device, the pod receptacle may be rotatable via a motor coupled to the pod receptacle. Any one or more combinations of the embodiments of the above device may further comprise a housing enclosing the pod receptacle, mix tank, first chilling module, drawer, and dispensing manifold within an interior of the housing. In any one or more combinations of the embodiments of the above device, the dispensing manifold may be removable from the device via a front access door positioned above the drawer. In any one or more combinations of the embodiments of the above device, the housing may include a user interface coupled to an exterior wall of the housing.

In another representation, a device for preparing a gelatin-based product may comprise a pod receptacle adapted to receive a removable pod, a first chilling module fluidly coupled to the pod receptacle, a slideable drawer including a tray including a plurality of slots for receiving a plurality of fluid vessels, a dispensing manifold fluidly coupled to the first chilling module and positioned vertically above the drawer, and a second chilling module directly coupled to a bottom exterior surface of the drawer. In one example the above device may further comprise a mix tank positioned between the first chilling device and a hot water tank. In any one or more combinations of the embodiments of the above device, the pod receptacle may include a door with a pod spike coupled to an interior surface of the door and wherein the pod receptacle may be rotatable via a motor coupled to the pod receptacle. Any one or more combinations of the embodiments of the above device may further comprise a motor coupled to the dispensing manifold for adjusting the dispensing manifold between a dispensing position where a gelatin mixture is dispensed into the fluid vessels from the dispensing manifold, and a cleaning position where a fluid mixture entering the dispensing manifold is drained to a drain tank. In yet another representation, a method for preparing a gelatin-based product may comprise injecting heated water into a pod pre-loaded into a pod receptacle of a device and mixing the injected heated water with gelatin contents of the pod to form a first liquid gelatin mixture, transporting the first liquid gelatin mixture and a first liquid through a first chilling module to form a chilled second liquid gelatin mixture, transporting the chilled second liquid gelatin mixture to a dispensing manifold of the device, the dispensing manifold including one or more dispensing heads, injecting, via the dispensing manifold, the chilled second liquid gelatin mixture into a plurality of cups, and chilling the plurality of cups with a second chilling module to form a hardened gelatin mixture within each cup of the plurality of cups. In one example, the above method may further comprise, before transporting the first liquid gelatin mixture and the first liquid through the first chilling module, transporting the first liquid gelatin mixture and the first liquid into a mix tank and mixing to form a mixed second liquid gelatin mixture, and then transporting the second liquid gelatin mixture through the first chilling module. In any one or more combinations of the embodiments of the above method, transporting the second liquid gelatin mixture through the first chilling module may be performed via a first pump and wherein transporting the chilled second liquid gelatin mixture to the dispensing manifold may be performed via a second pump. Any one or more combinations of the embodiments of the above method may further comprise, prior to injecting the heated water into the pod, puncturing a top surface of the pod with a pod spike attached to a bottom side of a door of the pod receptacle and wherein the injecting heater water may include injecting heated water from a heated water tank of the device, through the pod spike, and into the pod. In any one or more combinations of the embodiments of the above method, mixing the injected heated water with gelatin contents of the pod may include actuating a motor coupled with the pod receptacle to agitate the pod receptacle about a central axis of the pod receptacle. Any one or more combinations of the embodiments of the above method may further comprise tracking an amount of the first liquid dispensed via the device over duration of use of the device and generating data including the amount of the first liquid dispensed over the duration of use of the device. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other device hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the device control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of operating a pod spike of a device for preparing gelatin-based products, comprising:
   puncturing a pod with the pod spike, the pod spike having a hub, an outer tube, where a first end of the outer tube is coupled to the hub, and an inner tube, where a first end of the inner tube is coupled to the hub, wherein puncturing the pod with the spike includes an end of the inner tube forming a cutting edge that punctures the pod.

2. The method of claim 1, wherein the outer tube surrounds the inner tube for a portion of a length of the inner tube.

3. The method of claim 2 wherein the outer tube is tapered at a second end of the outer tube, where the second end of the outer tube is opposite the first end of the outer tube.

4. The method of claim 3, wherein the pod spike further comprises a splash guard that surrounds and is coupled to the outer tube, and wherein a diameter of the splash guard is greater than a diameter of the hub.

5. The method of claim 4, wherein the splash guard comprises silicon.

6. The method of claim 2, wherein the outer tube comprises one or more vertical grooves.

7. The method of claim 3, wherein the hub comprises at least one port, the at least one port fluidly coupled to a hot water tank.

8. The method of claim 1, further comprising rotating the pod.

9. The method of claim 1, wherein the pod retains a gelatin-based material, the method further comprising transferring heated water into the pod via the outer tube of the pod spike with the pod spike inserted into the pod, and wherein the outer tube surrounds the inner tube for a portion of a length of the inner tube.

10. The method of claim 9, wherein a splash guard is coupled to the outer tube of the pod spike, the splash guard flaring outward from a central axis of the pod spike, and wherein the splash guard comprises one or more grooves about a circumference of the splash guard.

11. The method of claim 10, further comprising automatically executing a production cycle of the device to produce a gelatin-based product responsive to both detecting that the mix pod is positioned in a pod receptacle of the device and a user input.

12. The method of claim 11, wherein transferring heated water into the pod dissolves the gelatin-based material and forms a gelatin slurry, and wherein the production cycle further comprises evacuating the gelatin slurry via the inner tube.

* * * * *